United States Patent
Tonami

(10) Patent No.: US 7,626,914 B2
(45) Date of Patent: Dec. 1, 2009

(54) METHOD FOR REPRODUCING HOLOGRAPHIC INFORMATION FROM AN OPTICAL INFORMATION RECORDING MEDIUM

(75) Inventor: Junichiro Tonami, Kanagawa (JP)

(73) Assignee: Victor Company of Japan, Ltd., Yokohama (JP)

( * ) Notice: Subject to any disclaimer, the term of this patent is extended or adjusted under 35 U.S.C. 154(b) by 520 days.

(21) Appl. No.: 11/446,301

(22) Filed: Jun. 5, 2006

(65) Prior Publication Data

US 2006/0285469 A1 Dec. 21, 2006

(30) Foreign Application Priority Data

| Jun. 17, 2005 | (JP) | 2005-177777 |
| Jun. 27, 2005 | (JP) | 2005-186243 |
| Jun. 27, 2005 | (JP) | 2005-186244 |

(51) Int. Cl.
*G11B 7/00* (2006.01)

(52) U.S. Cl. .................. 369/103

(58) Field of Classification Search ............ None
See application file for complete search history.

(56) References Cited

U.S. PATENT DOCUMENTS

| 4,224,480 A | * | 9/1980 | Satoh et al. | 369/47.48 |
| 4,779,145 A | * | 10/1988 | Lemelson | 360/2 |
| 5,963,513 A | * | 10/1999 | Lemelson | 369/14 |
| 6,229,774 B1 | * | 5/2001 | Yasuda | 369/47.28 |
| 7,382,712 B2 | * | 6/2008 | Cherubini et al. | 369/126 |
| 7,403,468 B2 | * | 7/2008 | Maeda et al. | 369/126 |
| 7,483,363 B2 | * | 1/2009 | Albrecht | 369/126 |

FOREIGN PATENT DOCUMENTS

| JP | 2004-310957 | 11/2004 |
| JP | 2005-141879 | 6/2005 |

OTHER PUBLICATIONS

"Introduction to Computer Image Processing", pp. 149-151, 1985.

* cited by examiner

*Primary Examiner*—Peter Vincent Agustin
(74) *Attorney, Agent, or Firm*—Louis Woo

(57) ABSTRACT

An XY array of sync bits and information bits is recorded in a recording medium through the use of holography. The sync bits are in parallel Y-direction-extending groups having an X-direction minimum inversion interval of 2 or more. The information bits are placed between the parallel Y-direction-extending groups of the sync bits. One of the parallel Y-direction-extending groups of the sync bits and ones of the information bits neighboring said one of the parallel Y-direction-extending groups of the sync bits are scanned to reproduce a Y-direction sync bit sequence and at least one Y-direction information bit sequence. The reproduced Y-direction sync bit sequence is re-sampled through the use of a digital phase locked loop to obtain corrected Y-direction sync bit frequency and phase. The Y-direction information bit sequence is re-sampled in response to the corrected Y-direction sync bit frequency and phase. The Y direction is vertical, horizontal, or halfway therebetween.

4 Claims, 36 Drawing Sheets

OUTPUT VALUE/INPUT VALUE (A-4)

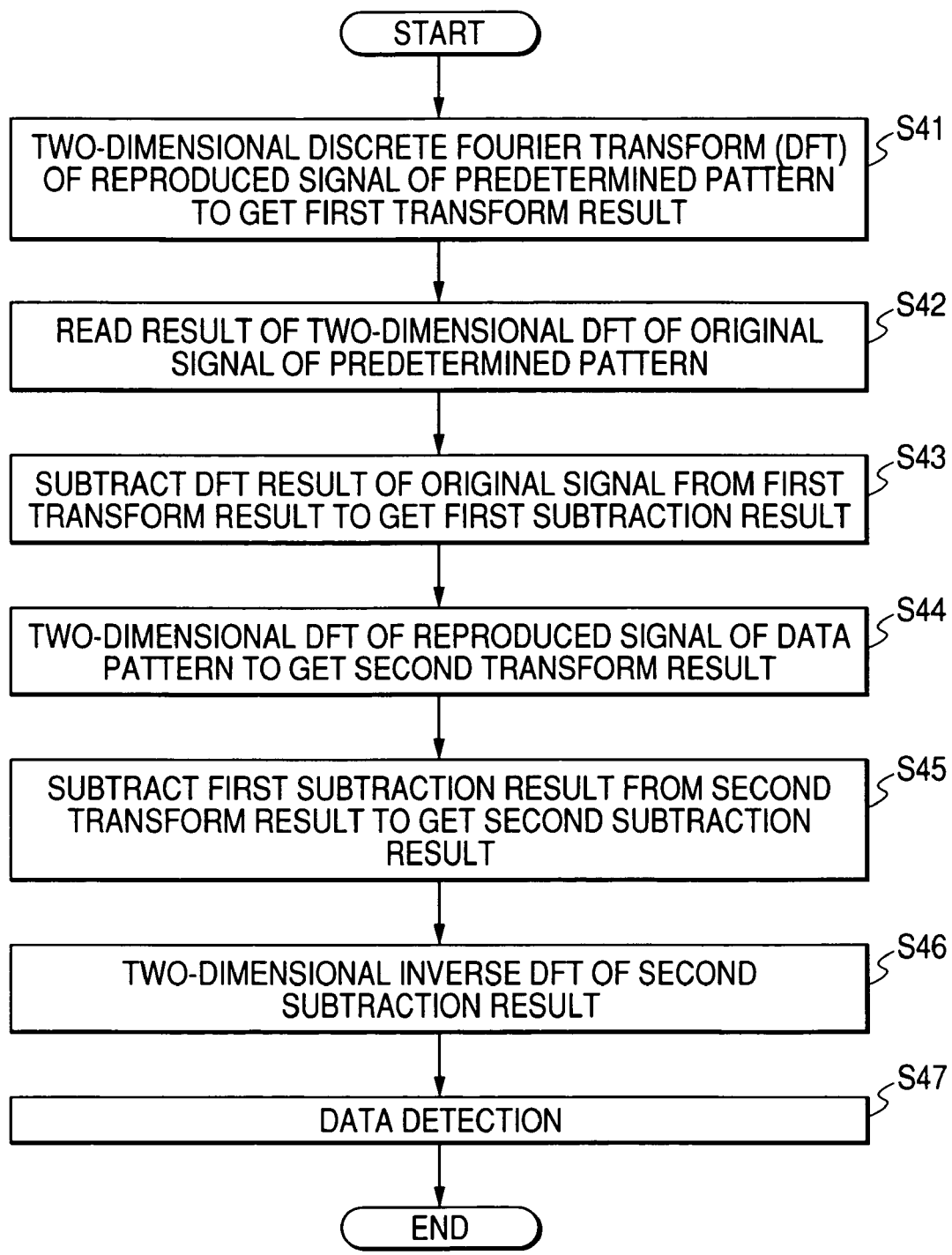

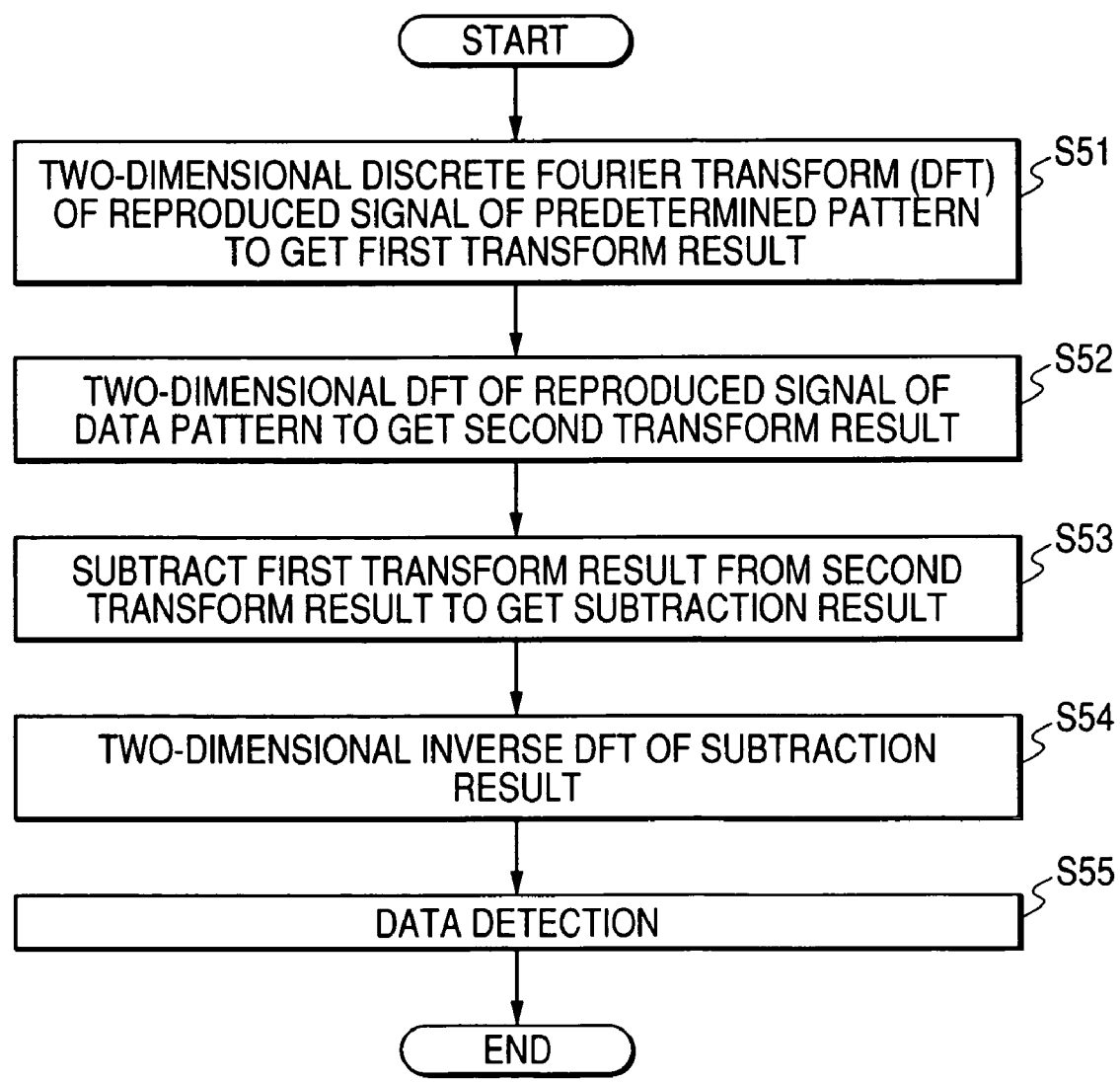

METHOD FOR REPRODUCING HOLOGRAPHIC INFORMATION FROM AN OPTICAL INFORMATION RECORDING MEDIUM

BACKGROUND OF THE INVENTION

1. Field of the Invention

This invention generally relates to an optical information reproducing method and an optical information reproducing apparatus. This invention particularly relates to a method and an apparatus for optically reproducing, from an optical information recording medium, information which has been recorded through the use of holography. Furthermore, this invention relates to an optical information recording and reproducing apparatus through the use of holography.

2. Description of the Related Art

Holographic recording means recording information in a recording medium through the use of holography. In general, the holographic recording is performed as follows. Information light which carries image information is generated. Reference light is also generated. The information light and the reference light are superimposed on each other in the recording medium, causing an interference pattern (a holographic pattern) therein. The interference pattern is written into the recording medium. The writing of the interference pattern involves the recording of the image information. The image information is reproduced from the recording medium as follows. The recording medium is irradiated with the reference light. The interference pattern in the recording medium diffracts the reference light. The resultant diffracted light carries the image information. The image information is extracted from the diffracted light.

In recent years, volume holography, or digital volume holography in particular, has been developed and is attracting attention in practical fields for ultra-high density optical recording. The volume holography is a method of writing a three-dimensional interference pattern by making positive use of a recording medium in a direction of this thickness as well. The features of the volume holography are that the diffraction efficiency can be enhanced by increasing the thickness of the recording medium, and a greater recording capacity can be achieved by employing multiplex recording.

The digital volume holography is a computer-oriented holographic recording method which uses the same recording medium and recording method as with the volume holography, whereas the image information to be recorded is limited to binary digital patterns. In the digital volume holography, analog image information such as a picture is once digitized and developed into two-dimensional digital pattern information. Then, the digital pattern information is recorded in the recording medium as image information. For reproduction, the digital pattern information is read from the recording medium before being decoded to restore the original image information for display. Even if the signal-to-noise (the S/N ratio) during reproduction is poor, it is possible to reproduce the original information with extremely high fidelity by performing differential detection and employing an encoding decoding scheme inclusive of error correction.

Such two-dimensional digital pattern information recorded in a recording medium contains a sync code for a positioning purpose. A corresponding sync code is provided on an image detector including a CCD (charge coupled device) array or a COM (complementary metal oxide semiconductor) array. An image of the recording medium which carries the digital pattern information is captured by the image detector. Matching is taken between the sync code on the image detector and the sync code in the captured image. The matching means finding the position of the sync code in the captured image or making the two sync codes positionally coincide with each other. As a result of the matching, the positioning of the captured image is performed.

A typical example of two-dimensional digital pattern information contains a plurality of sync codes arranged at equal intervals in horizontal and vertical directions.

Japanese book entitled "Introduction to Computer Image Processing", published in 1985, discloses template matching in which a small image is placed over a portion of a large image (a source image). The small image is referred to as a template which represents an object to be detected in the large image (the source image). During the template matching, the template is moved through different positions relative to the large image. For each of the different positions, the similarity is calculated between the template and the portion of the large image which overlaps the template. The maximum similarity is selected from the calculated similarities corresponding to the respective different positions. One of the different positions which corresponds to the maximum similarity is used as an indication of the position of the object to be detected in the large image. Alternatively, one of the calculated similarities which exceeds a threshold value may be found. In this case, one of the different positions which corresponds to the found similarity is used as an indication of the position of the object to be detected in the large image. The calculated similarities are expressed by, for example, calculated correlation values. The maximum similarity corresponds to the maximum one of the correlation values.

The template matching can be utilized for taking the previously-mentioned matching between the sync code on the image detector and the sync code in the captured image. The two-dimensional digital pattern information recorded in the recording medium is referred to as page data. In the template matching, a reproduced image obtained through the image detector and representing the page data is used as a source image while the sync code on the image detector is defined as a template representing an object to be detected in the source image. During the template matching, the template is moved through different positions relative to the source image. For each of the different positions, calculation is made as to the value of a correction between the template and the portion of the large image which overlaps the template. The maximum correlation value is selected from the calculated correlation values corresponding to the respective different positions. One of the different positions which corresponds to the maximum correlation value is used as an indication of the position of the object (the sync code) to be detected in the source image. The calculation of the correlation value for each of the different positions is implemented according to a prescribed equation which requires vast numbers of calculation steps. Accordingly, there occur drawbacks as follows. Hardware for implementing the template matching tends to be complicated in structure. In addition, the implementation of the template matching tends to take a long time.

Japanese patent application publication number 2004-310957 discloses an optical information reproducing apparatus designed to remove the above-mentioned drawbacks. The apparatus of Japanese application 2004-310957 serves to optically reproduce, from an optical information recording medium, information which has been recorded through the use of holography. The optical information recording medium has a recording layer holding the recorded information. The recorded information includes a sync code composed of pixels having a same value.

The apparatus of Japanese application 2004-310957 includes a light source for generating a light beam, a device for generating a reproduction-purpose reference light from the light beam generated by the light source, and a device for applying the reference light to the recording layer in the optical information recording medium. Reproduction light occurs as the reference light is applied to the recording layer. The reproduction light contains a reproduced image representing the recorded information. The apparatus further includes a device for collecting the reproduction light, and a detector for the collected light. The detector obtains the reproduced image from the collected light. The detector is provided with a sync code for positioning the reproduced image.

The apparatus of Japanese application 2004-310957 carries out improved template matching as follows. The sync code in the detector is composed of pixels having a same value. The sync code is used as a template while the reproduced image is used as a source image. The template is placed over a portion of the reproduced image (the source image). The template is moved through different positions relative to the reproduced image. The different positions are in a two-dimensional array. Specifically, the template is moved in an XY plane (a two-dimensional plane) of the reproduced image. First, the template is moved along only an X direction while the value of a correlation between the template and the portion of the reproduced image which overlaps the template is calculated for each of positions in an X-direction row of the array of the different positions. Second, the template is repetitively moved along a Y direction while the value of a correlation between the template and the portion of the reproduced image which overlaps the template is calculated for each of the different positions except the above-mentioned positions in the X-direction row. The maximum correlation value is selected from the calculated correlation values. One of all the different positions which corresponds to the maximum correlation value is used as an indication of the best positional matching between the template and the reproduced image.

The template matching in the apparatus of Japanese application 2004-310957 requires a less number of calculation steps due to the following factors. A sync code is composed of pixels having a same value. During the calculation of correlation values for the different positions, the template is moved along only an X direction before being repetitively moved along a Y direction.

A typical example of an optical information recording medium is an optical disc. An unevenness in the thickness of an optical disc, an irregularity of the plane thereof, and an eccentricity thereof result in a rotation, a curve, and a distortion of data reproduced from the optical disc.

The apparatus of Japanese application 2004-310957 can not deal with such a rotation, a curve, and a distortion of a two-dimensional digital pattern information (page data) reproduced from an optical information recording medium. Therefore, it tends to be difficult to detect the correct positions of bits constituting the two-dimensional digital pattern information.

SUMMARY OF THE INVENTION

It is a first object of this invention to provide an optical information reproducing method which can deal with a rotation, a curve, and a distortion of data reproduced from an optical information recording medium.

It is a second object of this invention to provide an optical information reproducing apparatus which can deal with a rotation, a curve, and a distortion of data reproduced from an optical information recording medium.

It is a third object of this invention to provide an optical information recording and reproducing apparatus which can deal with a rotation, a curve, and a distortion of data reproduced from an optical information recording medium.

A first aspect of this invention provides a method of reproducing information from an optical information recording medium, comprising the steps of applying reproduction-purpose reference light to the optical information recording medium including an information recording layer on which the information has been recorded through the use of holography, and detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel Y-direction-extending groups having an X-direction minimum inversion interval of 2 or more, the information bits being between the parallel Y-direction-extending groups of the sync bits. The method further comprises a first step of collecting the reproduction light caused in the information recording layer by the application of the reproduction-purpose reference light, and detecting the collected reproduction light to reproduce the information; a second step, provided in the first step, of scanning one of the parallel Y-direction-extending groups of the sync bits and ones of the information bits neighboring said one of the parallel Y-direction-extending groups of the sync bits to reproduce a Y-direction sync bit sequence and at least one Y-direction information bit sequence; a third step of re-sampling the reproduced Y-direction sync bit sequence through the use of a digital phase locked loop to obtain corrected Y-direction sync bit frequency and phase; and a fourth step of re-sampling said at least one Y-direction information bit sequence in response to the corrected Y-direction sync bit frequency and phase.

A second aspect of this invention provides a method of reproducing information from an optical information recording medium, comprising the steps of applying reproduction-purpose reference light to an optical information recording medium including an information recording layer on which the information has been recorded through the use of holography, and detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel X-direction-extending groups having an X-direction minimum inversion interval of 2 or more, the information bits being between the parallel X-direction-extending groups of the sync bits. The method further comprises a first step of collecting the reproduction light caused in the information recording layer by the application of the reproduction-purpose reference light, and detecting the collected reproduction light to reproduce the information; a second step, provided in the first step, of scanning one of the parallel X-direction-extending groups of the sync bits and ones of the information bits neighboring said one of the parallel X-direction-extending groups of the sync bits to reproduce an X-direction sync bit sequence and at least one X-direction information bit sequence; a third step of re-sampling the reproduced X-direction sync bit sequence through the use of a digital phase locked loop to obtain corrected X-direction sync bit frequency and phase; and a fourth step of re-sampling said at least one X-direction information bit sequence in response to the corrected X-direction sync bit frequency and phase.

A third aspect of this invention provides a method of reproducing information from an optical information recording medium, comprising the steps of applying reproduction-purpose reference light to an optical information recording medium including an information recording layer on which the information has been recorded through the use of holography, and detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel Y-direction-extending groups having an X-direction minimum inversion interval of 2 or more, the information bits being between the parallel Y-direction-extending groups of the sync bits. The method further comprises a first step of collecting the reproduction light caused in the information recording layer by the application of the reproduction-purpose reference light, and detecting the collected reproduction light to reproduce the information; a second step, provided in the first step, of scanning one of the parallel Y-direction-extending groups of the sync bits and ones of the information bits neighboring said one of the parallel Y-direction-extending groups of the sync bits to reproduce a Y-direction sync bit sequence and at least one Y-direction information bit sequence; a third step of detecting a DC component of the reproduced Y-direction sync bit sequence, and subjecting the reproduced Y-direction sync bit sequence to DC control to make the detected DC component constant and generate DC control information including information about the DC control; and a fourth step of subjecting said at least one Y-direction information bit sequence to DC control responsive to the generated DC control information.

A fourth aspect of this invention provides a method of reproducing information from an optical information recording medium, comprising the steps of applying reproduction-purpose reference light to an optical information recording medium including an information recording layer on which the information has been recorded through the use of holography, and detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel Y-direction-extending groups having an X-direction minimum inversion interval of 2 or more, the information bits being between the parallel Y-direction-extending groups of the sync bits. The method further comprises a first step of collecting the reproduction light caused in the information recording layer by the application of the reproduction-purpose reference light, and detecting the collected reproduction light to reproduce the information; a second step, provided in the first step, of scanning one of the parallel Y-direction-extending groups of the sync bits and ones of the information bits neighboring said one of the parallel Y-direction-extending groups of the sync bits to reproduce a Y-direction sync bit sequence and at least one Y-direction information bit sequence; a third step of detecting a level of the reproduced Y-direction sync bit sequence, and subjecting the reproduced Y-direction sync bit sequence to gain control to make the detected level constant and generate gain control information including information about the gain control; and a fourth step of subjecting said at least one Y-direction information bit sequence to gain control responsive to the generated gain control information.

A fifth aspect of this invention provides an apparatus for reproducing information from an optical information recording medium, comprising means for applying reproduction-purpose reference light to the optical information recording medium including an information recording layer on which the information has been recorded through the use of holography, and means for detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel Y-direction-extending groups having an X-direction minimum inversion interval of 2 or more, the information bits being between the parallel Y-direction-extending groups of the sync bits. The apparatus further comprises first means for collecting the reproduction light caused in the information recording layer by the application of the reproduction-purpose reference light, and detecting the collected reproduction light to reproduce the information; second means provided in the first means for scanning one of the parallel Y-direction-extending groups of the sync bits and ones of the information bits neighboring said one of the parallel Y-direction-extending groups of the sync bits to reproduce a Y-direction sync bit sequence and at least one Y-direction information bit sequence; third means for re-sampling the reproduced Y-direction sync bit sequence through the use of a digital phase locked loop to obtain corrected Y-direction sync bit frequency and phase; and fourth means for re-sampling said at least one Y-direction information bit sequence in response to the corrected Y-direction sync bit frequency and phase.

A sixth aspect of this invention provides an apparatus for reproducing information from an optical information recording medium, comprising means for applying reproduction-purpose reference light to an optical information recording medium including an information recording layer on which the information has been recorded through the use of holography, and means for detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel X-direction-extending groups having an X-direction minimum inversion interval of 2 or more, the information bits being between the parallel X-direction-extending groups of the sync bits. The apparatus further comprises first means for collecting the reproduction light caused in the information recording layer by the application of the reproduction-purpose reference light, and detecting the collected reproduction light to reproduce the information; second means provided in the first means for scanning one of the parallel X-direction-extending groups of the sync bits and ones of the information bits neighboring said one of the parallel X-direction-extending groups of the sync bits to reproduce an X-direction sync bit sequence and at least one X-direction information bit sequence; third means for re-sampling the reproduced X-direction sync bit sequence through the use of a digital phase locked loop to obtain corrected X-direction sync bit frequency and phase; and fourth means for re-sampling said at least one X-direction information bit sequence in response to the corrected X-direction sync bit frequency and phase.

A seventh aspect of this invention is based on the first aspect thereof, and provides a method wherein the sync bits are in the parallel Y-direction-extending groups and parallel X-direction-extending groups, and the information bits are between the parallel Y-direction-extending groups of the sync bits and the parallel X-direction-extending groups of the sync bits. The method further comprises a fifth step, provided in the first step, of scanning one of the parallel X-direction-extending groups of the sync bits and ones of the information bits neighboring said one of the parallel X-direction-extending groups of the sync bits to reproduce an X-direction sync bit sequence and at least one X-direction information bit sequence; a sixth step of re-sampling the reproduced X-direction sync bit sequence through the use of a digital phase locked loop to obtain corrected X-direction sync bit frequency and phase; and a seventh step of re-sampling said at least one X-direction information bit sequence in response to the corrected X-direction sync bit frequency and phase.

An eighth aspect of this invention is based on the first aspect thereof, and provides a method further comprising a fifth step, provided in the first step, of scanning a first X-direction line of the information bits and at least one second X-direction line of the information bits neighboring the first X-direction line of the information bits to reproduce a first X-direction information bit sequence and at least one second X-direction information bit sequence; a sixth step of re-sampling the reproduced first X-direction sync bit sequence through the use of a digital phase locked loop; and a seventh step of re-sampling said at least one reproduced second X-direction information bit sequence.

A ninth aspect of this invention provides an apparatus for reproducing information from an optical information recording medium, comprising means for applying reproduction-purpose reference light to an optical information recording medium including an information recording layer on which the information has been recorded through the use of holography, and means for detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel Y-direction-extending groups having an X-direction minimum inversion interval of 2 or more, the information bits being between the parallel Y-direction-extending groups of the sync bits. The apparatus further comprises first means for collecting the reproduction light caused in the information recording layer by the application of the reproduction-purpose reference light, and detecting the collected reproduction light to reproduce the information; second means provided in the first means for scanning one of the parallel Y-direction-extending groups of the sync bits and ones of the information bits neighboring said one of the parallel Y-direction-extending groups of the sync bits to reproduce a Y-direction sync bit sequence and at least one Y-direction information bit sequence; third means for detecting a DC component of the reproduced Y-direction sync bit sequence, and subjecting the reproduced Y-direction sync bit sequence to DC control to make the detected DC component constant and generate DC control information including information about the DC control; and fourth means for subjecting said at least one Y-direction information bit sequence to DC control responsive to the generated DC control information.

A tenth aspect of this invention provides an apparatus for reproducing information from an optical information recording medium, comprising means for applying reproduction-purpose reference light to an optical information recording medium including an information recording layer on which the information has been recorded through the use of holography, and means for detecting reproduction light caused in the information recording layer by the application of the reproduction-purpose reference light to reproduce the information. The information recording layer in the optical information recording medium has an XY plane to which the reproduction-purpose reference light is applied, and information bits and sync bits are arranged in the XY plane, the sync bits being in parallel Y-direction-extending groups having an X-direction minimum inversion interval of 2 or more, the information bits being between the parallel Y-direction-extending groups of the sync bits. The apparatus further comprises first means for collecting the reproduction light caused in the information recording layer by the application of the reproduction-purpose reference light, and detecting the collected reproduction light to reproduce the information; second means provided in the first means for scanning one of the parallel Y-direction-extending groups of the sync bits and ones of the information bits neighboring said one of the parallel Y-direction-extending groups of the sync bits to reproduce a Y-direction sync bit sequence and at least one Y-direction information bit sequence; third means for detecting a level of the reproduced Y-direction sync bit sequence, and subjecting the reproduced Y-direction sync bit sequence to gain control to make the detected level constant and generate gain control information including information about the gain control; and fourth means for subjecting said at least one Y-direction information bit sequence to gain control responsive to the generated gain control information.

An eleventh aspect of this invention provides a method of reproducing information from an optical information recording medium, comprising the steps of applying reproduction-purpose reference light to the optical information recording medium including an information recording layer on which the information has been recorded through the use of holography, and detecting reproduction light caused in the information recording layer by the application of the reproduction-purpose reference light to reproduce the information. A predetermined pattern has been recorded in the information recording layer through the use of first reference light, and a data pattern has been recorded in the information recording layer through the use of second reference light different from the first reference light. The method further comprises a first step of applying the first reference light to the information recording layer, and collecting first reproduction light caused in the information recording layer by the application of the first reference light and obtaining a detected signal of the predetermined pattern from the collected first reproduction light; a second step of subjecting the detected signal of the predetermined pattern to equalization, and obtaining equalization-purpose information in response to a result of the equalization; a third step of applying the second reference light to the information recording layer, and collecting second reproduction light caused in the information recording layer by the application of the second reference light and obtaining a detected signal of the data pattern from the collected second reproduction light; and a fourth step of subjecting the detected signal of the data pattern to equalization in response to the equalization-purpose information to reduce inter-symbol-interference components of the detected signal of the data pattern and thereby obtain an after equalization signal of the data pattern.

A twelfth aspect of this invention provides a method of reproducing information from an optical information recording medium, comprising the steps of applying reproduction-purpose reference light to the optical information recording medium including an information recording layer on which the information has been recorded through the use of holography, and detecting reproduction light caused in the information recording layer by the application of the reproduction-purpose reference light to reproduce the information. The information recording layer has recorded blocks including a first recorded block of a predetermined pattern and a second recorded block of a data pattern. The method further comprises a first step of collecting first reproduction light caused in the first recorded block in the information recording layer by the application of the reproduction-purpose reference light, and obtaining a detected signal of the predetermined pattern from the collected first reproduction light; a second step of subjecting the detected signal of the predetermined pattern to equalization, and obtaining equalization-purpose information in response to a result of the equalization; a third step of collecting second reproduction light caused in the second recorded block in the information recording layer by the application of the reproduction-purpose reference light, and obtaining a detected signal of the data pattern from the collected second reproduction light; and a fourth step of subjecting the detected signal of the data pattern to equalization in response to the equalization-purpose information to reduce inter-symbol-interference components of the detected signal of the data pattern and thereby obtain an after equalization signal of the data pattern.

A thirteenth aspect of this invention provides an apparatus for reproducing information from an optical information recording medium, comprising means for applying reproduction-purpose reference light to the optical information recording medium including an information recording layer on which the information has been recorded through the use of holography, and means for detecting reproduction light caused in the information recording layer by the application of the reproduction-purpose reference light to reproduce the information. A predetermined pattern has been recorded in the information recording layer through the use of first reference light, and a data pattern has been recorded in the information recording layer through the use of second reference light different from the first reference light. The apparatus further comprises first means for applying the first reference light to the information recording layer, and collecting first reproduction light caused in the information recording layer by the application of the first reference light and obtaining a detected signal of the predetermined pattern from the collected first reproduction light; second means for subjecting the detected signal of the predetermined pattern to equalization, and obtaining equalization-purpose information in response to a result of the equalization; third means for applying the second reference light to the information recording layer, and collecting second reproduction light caused in the information recording layer by the application of the second reference light and obtaining a detected signal of the data pattern from the collected second reproduction light; and fourth means for subjecting the detected signal of the data pattern to equalization in response to the equalization-purpose information to reduce inter-symbol-interference components of the detected signal of the data pattern and thereby obtain an after equalization signal of the data pattern.

A fourteenth aspect of this invention provides an apparatus for reproducing information from an optical information recording medium, comprising means for applying reproduction-purpose reference light to the optical information recording medium including an information recording layer on which the information has been recorded through the use of holography, and means for detecting reproduction light caused in the information recording layer by the application of the reproduction-purpose reference light to reproduce the information. The information recording layer has recorded blocks including a first recorded block of a predetermined pattern and a second recorded block of a data pattern. The apparatus further comprises first means for collecting first reproduction light caused in the first recorded block in the information recording layer by the application of the reproduction-purpose reference light, and obtaining a detected signal of the predetermined pattern from the collected first reproduction light; second means for subjecting the detected signal of the predetermined pattern to equalization, and obtaining equalization-purpose information in response to a result of the equalization; third means for collecting second reproduction light caused in the second recorded block in the information recording layer by the application of the reproduction-purpose reference light, and obtaining a detected signal of the data pattern from the collected second reproduction light; and fourth means for subjecting the detected signal of the data pattern to equalization in response to the equalization-purpose information to reduce inter-symbol-interference components of the detected signal of the data pattern and thereby obtain an after equalization signal of the data pattern.

A fifteenth aspect of this invention provides an apparatus for recording and reproducing information in and from an optical information recording medium including an information recording layer designed to store information through the use of holography, comprising means for causing information light containing the information and reference light to interfere with each other in the optical information recording medium to make an interference pattern, means for writing the interference pattern in the information recording layer to record the information, means for applying reproduction-purpose reference light to the optical information recording medium, and means for detecting reproduction light caused in the information recording layer by the application of the reproduction-purpose reference light to reproduce the information. The apparatus further comprises first means for recording a predetermined pattern in the information recording layer through the use of information light containing the predetermined pattern and first reference light; second means for recording a data pattern in the information recording layer through the use of information light containing the data pattern and second reference light different from the first reference light; third means for applying the first reference light to the information recording layer, and collecting first reproduction light caused in the information recording layer by the application of the first reference light and obtaining a detected signal of the predetermined pattern from the collected first reproduction light; fourth means for subjecting the detected signal of the predetermined pattern to equalization, and obtaining equalization-purpose information in response to a result of the equalization; fifth means for applying the second reference light to the information recording layer, and collecting second reproduction light caused in the information recording layer by the application of the second reference light and obtaining a detected signal of the data pattern from the collected second reproduction light; and sixth means for subjecting the detected signal of the data pattern to equalization in response to the equalization-purpose information to reduce inter-symbol-interference components of the detected signal of the data pattern and thereby obtain an after equalization signal of the data pattern.

A sixteenth aspect of this invention provides an apparatus for recording and reproducing information in and from an optical information recording medium including an information recording layer designed to store information through the use of holography, comprising means for causing information light containing the information and reference light to interfere with each other in the optical information recording medium to make an interference pattern, means for writing the interference pattern in the information recording layer to record the information, means for applying reproduction-purpose reference light to the optical information recording medium, and means for detecting reproduction light caused in the information recording layer by the application of the reproduction-purpose reference light to reproduce the information. The apparatus further comprises first means for recording a predetermined pattern in a first block in the information recording layer through the use of information light containing the predetermined pattern and recording-purpose reference light; second means for recording a data pattern in a second block in the information recording layer through the use of information light containing the data pattern and the recording-purpose reference light; third means for collecting first reproduction light caused in the first block in the information recording layer by the application of the reproduction-purpose reference light, and obtaining a detected signal of the predetermined pattern from the collected first reproduction light; fourth means for subjecting the detected signal of the predetermined pattern to equalization, and obtaining equalization-purpose information in response to a result of the equalization; fifth means for collecting second reproduction light caused in the second block in the information recording layer by the application of the reproduction-purpose reference light, and obtaining a detected signal of the data pattern from the collected second reproduction light; and sixth means for subjecting the detected signal of the data pattern to equalization in response to the equalization-purpose information to reduce inter-symbol-interference components of the detected signal of the data pattern and thereby obtain an after equalization signal of the data pattern.

A seventeenth aspect of this invention provides a method of reproducing information from an optical information recording medium, comprising the steps of applying reproduction-purpose reference light to the optical information recording medium including an information recording layer on which the information has been recorded through the use of holography, and detecting reproduction light caused in the information recording layer by the application of the reproduction-purpose reference light to reproduce the information. A predetermined pattern has been recorded in the information recording layer through the use of first reference light, and a data pattern has been recorded in the information recording layer through the use of second reference light different from the first reference light. The method further comprises a first step of applying the first reference light to the information recording layer, and collecting first reproduction light caused in the information recording layer by the application of the first reference light and obtaining a reproduced signal of the predetermined pattern from the collected first reproduction light; a second step of implementing one of (1) two-dimensional discrete Fourier transform and (2) discrete cosine transform of the reproduced signal of the predetermined pattern to generate a first transform result; a third step of implementing one of (1) two-dimensional discrete Fourier transform and (2) discrete cosine transform of the predetermined pattern to generate a second transform result; a fourth step of implementing subtraction between the first transform result and the second transform result to obtain a first subtraction result; a fifth step of applying the second reference light to the information recording layer, and collecting second reproduction light caused in the information recording layer by the application of the second reference light and obtaining a first reproduced signal of the data pattern from the collected second reproduction light; a sixth step of implementing one of (1) two-dimensional discrete Fourier transform and (2) discrete cosine transform of the first reproduced signal of the data pattern to generate a third transform result; a seventh step of subtracting the first subtraction result from the third transform result to obtain a second subtraction result being a second reproduced signal of the data pattern from which influence of a transmission system has been removed; an eighth step of implementing one of (1) two-dimensional inverse discrete Fourier transform and (2) inverse discrete cosine transform of the second subtraction result to generate a fourth transform result; and a ninth step of subjecting the fourth transform result to data detection.

An eighteenth aspect of this invention provides a method of reproducing information from an optical information recording medium, comprising the steps of applying reproduction-purpose reference light to the optical information recording medium including an information recording layer on which the information has been recorded through the use of holography, and detecting reproduction light caused in the information recording layer by the application of the reproduction-purpose reference light to reproduce the information. A predetermined pattern corresponding to an isolated waveform has been recorded in the information recording layer through the use of first reference light, and a data pattern has been recorded in the information recording layer through the use of second reference light different from the first reference light. The method further comprises a first step of applying the first reference light to the information recording layer, and collecting first reproduction light caused in the information recording layer by the application of the first reference light and obtaining a reproduced signal of the predetermined pattern from the collected first reproduction light; a second step of implementing one of (1) two-dimensional discrete Fourier transform and (2) discrete cosine transform of the reproduced signal of the predetermined pattern to generate a first transform result; a third step of applying the second reference light to the information recording layer, and collecting second reproduction light caused in the information recording layer by the application of the second reference light and obtaining a first reproduced signal of the data pattern from the collected second reproduction light; a fourth step of implementing one of (1) two-dimensional discrete Fourier transform and (2) discrete cosine transform of the first reproduced signal of the data pattern to generate a second transform result; a fifth step of subtracting the first transform result from the second transform result to obtain a subtraction result being a second reproduced signal of the data pattern from which influence of a transmission system has been removed; a sixth step of implementing one of (1) two-dimensional inverse discrete Fourier transform and (2) inverse discrete cosine transform of the subtraction result to generate a third transform result; and a seventh step of subjecting the third transform result to data detection.

A nineteenth aspect of this invention provides an apparatus for reproducing information from an optical information recording medium, comprising means for applying reproduction-purpose reference light to the optical information recording medium including an information recording layer on which the information has been recorded through the use of holography, and means for detecting reproduction light caused in the information recording layer by the application of the reproduction-purpose reference light to reproduce the information. A predetermined pattern has been recorded in the information recording layer through the use of first reference light, and a data pattern has been recorded in the information recording layer through the use of second reference light different from the first reference light. The apparatus further comprises first means for applying the first reference light to the information recording layer, and collecting first reproduction light caused in the information recording layer by the application of the first reference light and obtaining a reproduced signal of the predetermined pattern from the collected first reproduction light; second means for implementing one of (1) two-dimensional discrete Fourier transform and (2) discrete cosine transform of the reproduced signal of the predetermined pattern to generate a first transform result; third means for implementing one of (1) two-dimensional discrete Fourier transform and (2) discrete cosine transform of the predetermined pattern to generate a second transform result; fourth means for implementing subtraction between the first transform result and the second transform result to obtain a first subtraction result; fifth means for applying the second reference light to the information recording layer, and collecting second reproduction light caused in the information recording layer by the application of the second reference light and obtaining a first reproduced signal of the data pattern from the collected second reproduction light; sixth means for implementing one of (1) two-dimensional discrete Fourier transform and (2) discrete cosine transform of the first reproduced signal of the data pattern to generate a third transform result; seventh means for subtracting the first subtraction result from the third transform result to obtain a second subtraction result being a second reproduced signal of the data pattern from which influence of a transmission system has been removed; eighth means for implementing one of (1) two-dimensional inverse discrete Fourier transform and (2) inverse discrete cosine transform of the second subtraction result to generate a fourth transform result; and ninth means for subjecting the fourth transform result to data detection.

A twentieth aspect of this invention provides an apparatus for reproducing information from an optical information recording medium, comprising means for applying reproduction-purpose reference light to the optical information recording medium including an information recording layer on which the information has been recorded through the use of holography, and means for detecting reproduction light caused in the information recording layer by the application of the reproduction-purpose reference light to reproduce the information. A predetermined pattern corresponding to an isolated waveform has been recorded in the information recording layer through the use of first reference light, and a data pattern has been recorded in the information recording layer through the use of second reference light different from the first reference light. The apparatus further comprises first means for applying the first reference light to the information recording layer, and collecting first reproduction light caused in the information recording layer by the application of the first reference light and obtaining a reproduced signal of the predetermined pattern from the collected first reproduction light; second means for implementing one of (1) two-dimensional discrete Fourier transform and (2) discrete cosine transform of the reproduced signal of the predetermined pattern to generate a first transform result; third means for applying the second reference light to the information recording layer, and collecting second reproduction light caused in the information recording layer by the application of the second reference light and obtaining a first reproduced signal of the data pattern from the collected second reproduction light; fourth means for implementing one of (1) two-dimensional discrete Fourier transform and (2) discrete cosine transform of the first reproduced signal of the data pattern to generate a second transform result; fifth means for subtracting the first transform result from the second transform result to obtain a subtraction result being a second reproduced signal of the data pattern from which influence of a transmission system has been removed; sixth means for implementing one of (1) two-dimensional inverse discrete Fourier transform and (2) inverse discrete cosine transform of the subtraction result to generate a third transform result; and seventh means for subjecting the third transform result to data detection.

BRIEF DESCRIPTION OF THE DRAWINGS

FIG. 36 is a flowchart of a segment of a control program for the signal processing circuit in FIG. 35.

FIG. 37 is a flowchart of a segment of a control program for a signal processing circuit in a twenty-first embodiment of this invention.

DETAILED DESCRIPTION OF THE INVENTION

First Embodiment

Figure 1:
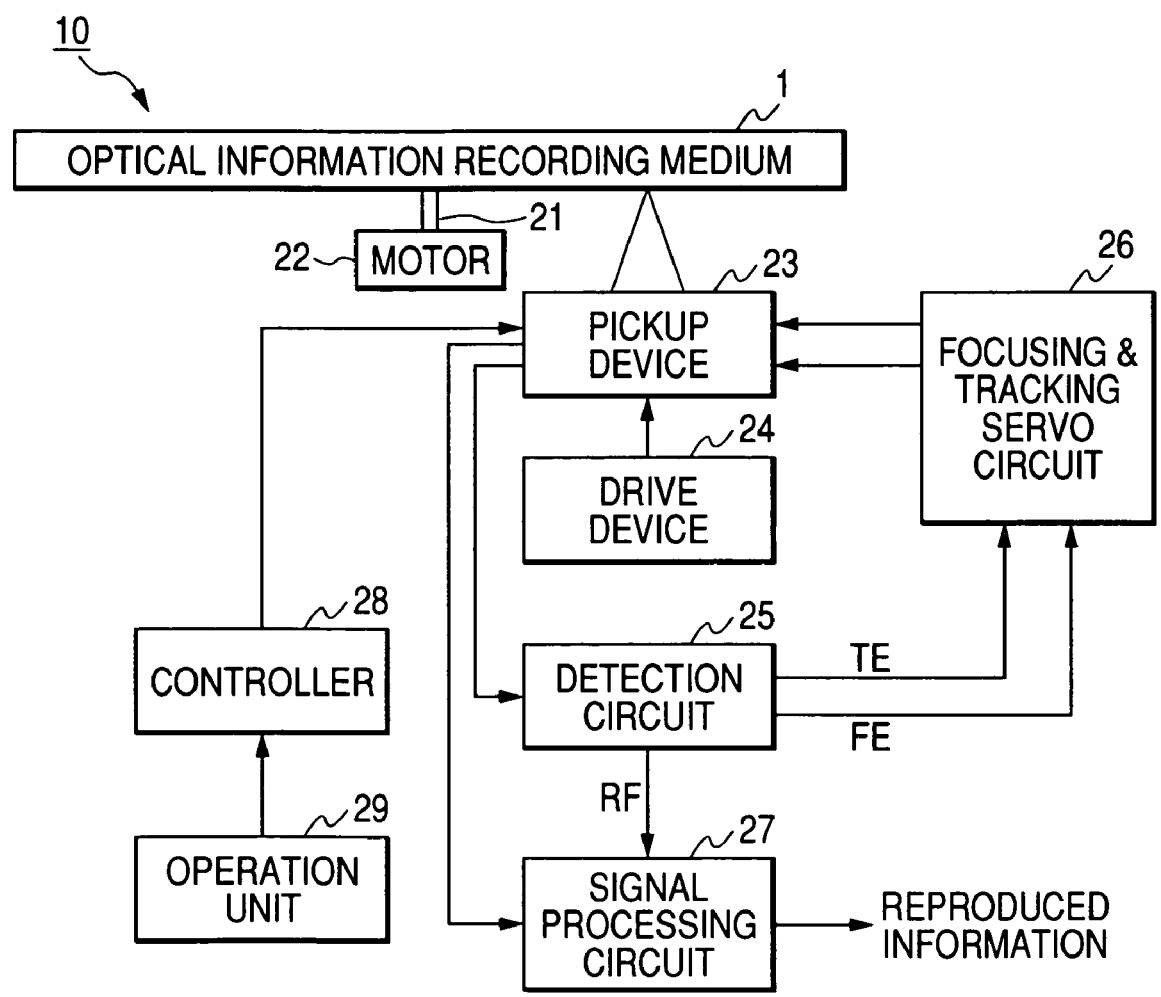
FIG. 1 is a block diagram of an optical information reproducing apparatus according to a first embodiment of this invention.

FIG. 1 shows an optical information reproducing apparatus 10 according to a first embodiment of this invention. The reproducing apparatus 10 includes a spindle 21, a spindle motor 22, a pickup device 23, and a drive device 24.

An optical information recording medium (for example, an optical disc) 1 is connected to the spindle 21. The spindle motor 22 serves to rotate the spindle 21. The recording medium 1 rotates together with the spindle 21. The recording medium 1 can be disconnected from the spindle 21. The recording medium 1 stores information in the form of an interference pattern. The pickup device 23 applies a beam of reproduction-purpose reference light to the recording medium 1. The applied reference light is diffracted by the interference pattern in the recording medium 1, causing diffracted light being reproduction light. The reproduction light contains the information recorded on the recording medium 1. The reproduction light returns toward the pickup device 23 from the recording medium 1. The pickup device 23 receives the reproduction light, and converts the received light into first and second electric signals. The pickup device 23 outputs the first and second electric signals. The drive device 24 serves to feed the pickup device 23 in a radial direction with respect to the recording medium 1.

The reproducing apparatus 10 further includes a detection circuit 25, a focusing and tracking servo circuit 26, a signal processing circuit 27, a controller 28, and an operation unit 29.

The detection circuit 25 generates a focusing error signal FE, a tracking error signal TE, and a reproduced signal RF from the first output signal of the pickup device 23. The detection circuit 25 outputs the focusing error signal FE and the tracking error signal TE to the focusing and tracking servo circuit 26. The detection circuit 25 outputs the reproduced signal RF to the signal processing circuit 27.

The focusing and tracking servo circuit 26 moves an objective lens in the pickup device 23 in response to the focusing error signal FE along a thickness-wise direction with respect to the recording medium 1 to focus the reference light beam onto the recording medium 1. The focusing and tracking servo circuit 26 moves the objective lens in the pickup device 23 in response to the tracking error signal TE along a radial direction with respect to the recording medium 1 to make a spot of the reference light beam follow a track on the recording medium 1.

The signal processing circuit 27 processes the reproduced signal RF and the second output signal of the pickup device 23. The signal processing circuit 27 outputs the processing-result signals.

The controller 28 implements control of the devices and circuits in the reproducing apparatus 10. Thereby, the controller 28 carries out control of the whole of the reproducing apparatus 10.

The operation unit 29 can be actuated by a user. The operation unit 29 generates various commands in accordance with the actuation by the user, and outputs the generated commands to the controller 28.

The reproducing apparatus 10 further includes a slide servo circuit (not shown) and a spindle servo circuit (not shown). The slide servo circuit controls the drive device 24 in response to the tracking error signal TE and a command from the controller 28, thereby implementing slide servo which feeds the pickup device 23 in the radial direction with respect to the recording medium 1. The spindle servo circuit controls the rotation of the spindle motor 22 (that is, the rotation of the spindle 21) in response to a command from the controller 28.

The controller 28 receives a basic clock signal and address information from the signal processing circuit 27. The controller 28 implements control of the pickup device 23 and the various servo circuits (the focusing and tracking servo circuit 26, the slide servo circuit, and the slide servo circuit) in response to the basic clock signal and the address information.

The controller 28 includes a computer having a combination of a CPU (central processing unit), a ROM (read only memory), a RAM (random access memory), and an input/output port. The ROM stores computer programs called control programs. The CPU executes the control programs while using the RAM as a work area to perform the functions of the controller 28.

The pickup device 23 includes an image sensor such as a CMOS sensor or a CCD array. The image sensor receives the reproduction light, and converts the received light into electric image data. The image data is sent from the image sensor to the signal processing circuit 27 as the previously-mentioned second output signal of the pickup device 23.

The signal processing circuit 27 decodes the image data from the pickup device 23 to reproduce the original data (the original information) recorded on a data area of the recording medium 1. The signal processing circuit 27 reproduces the basic clock signal from the reproduced signal RF. The signal processing circuit 27 determines addresses (on-recording-medium addresses) in response to the reproduced RF signal to generate the address information.

Figure 2:
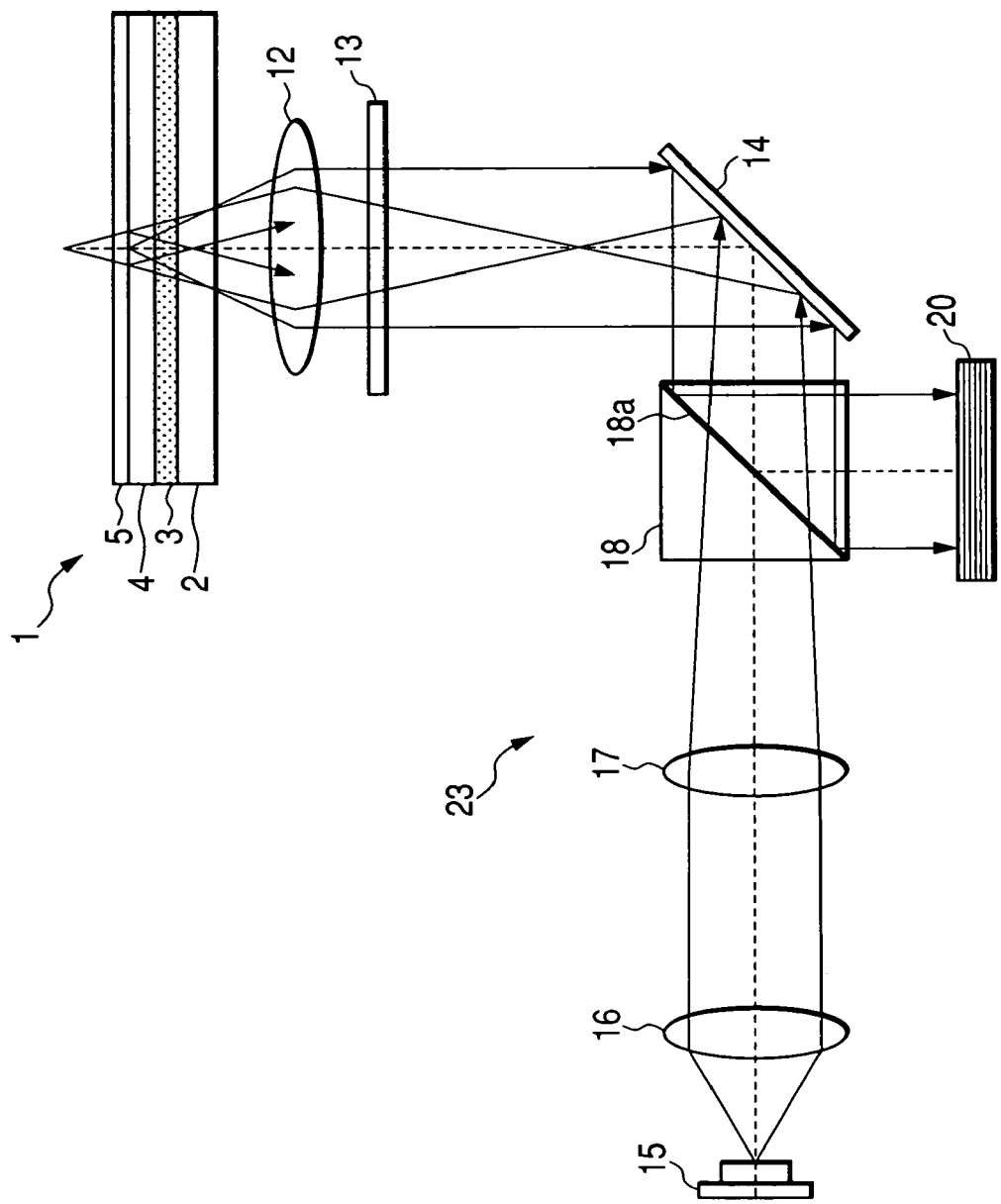
FIG. 2 is a sectional diagram of a pickup device and a recording medium in FIG. 1.

As shown in FIG. 2, the recording medium 1 has a laminate of a transparent substrate 2, an information recording layer 3, a transparent substrate 4, and a reflective film 5 which are arranged in that order. The information recording layer 3 is a hologram recording layer in which information is recorded through the use of volume holography. The transparent substrate 4 serves as a protective layer. The reflective layer 5 is made of aluminum. The transparent substrate 4 uses a substrate with addresses which is formed by, for example, injection. The transparent substrate 4 or the interface between the transparent substrate 4 and the reflective film 5 is provided with radially-extending address servo areas spaced at prescribed angular intervals. The address servo areas serve as positioning areas. Data areas extend between the address servo areas. The information recording layer 3 is made of a known hologram material which varies, when irradiated with light, in its optical characteristics such as refractive index, permittivity, and reflectance depending on the intensity of the light.

The pickup device 23 includes an objective lens 12, a quarter-wave plate 13, a mirror 14, a light source 15, a collimator lens 16, a defocusing convex lens 17, a polarization beam splitter 18, and a photodetector array (an image sensor) 20. The photodetector array 20 includes, for example, a CMOS sensor or a CCD array.

The objective lens 12 faces the transparent substrate 2 of the recording medium 1. The quarter-wave plate 13 is located between the objective lens 12 and the mirror 14.

The light source 15 emits light which is incident to the collimator lens 16. The collimator lens 16 converts the incident light into a parallel light beam. The parallel light beam travels from the collimator lens 16 to the defocusing convex lens 17. The defocusing convex lens 17 defocuses the parallel light beam to get a defocused light beam. The defocused light beam travels from the defocusing convex lens 17 to the polarization beam splitter 18. The P-polarized components of the defocused light beam pass through a polarization beam splitter surface 18a of the device 18 before reaching the mirror 14 and being reflected by the mirror 14. The reflected P-polarized light beam travels from the mirror 14 to the quarter-wave plate 13. The quarter-wave plate 13 converts the reflected P-polarized light beam into a circularly-polarized light beam. The circularly-polarized light beam travels from the quarter-wave plate 13 to the objective lens 12. The objective lens 12 projects the circularly-polarized light beam onto the recording medium 1 as a beam of reproduction-purpose reference light. The reproduction-purpose reference light is the same as recording-purpose reference light which has been used for recording the information on the recording medium 1. Specifically, the objective lens 12 focuses the reproduction-purpose light beam into a spot on the recording medium 1. An actuator (not shown) in the pickup device 23 serves to move the objective lens 12 in a thickness-wise direction and a radial direction with respect to the recording medium 1.

The reproduction-purpose reference light beam successively passes through the transparent substrate 2, the information recording layer 3, and the transparent substrate 4 before meeting the reflective film 5 and being reflected by the reflective film 5 in the recording medium 1. The information recorded on the recording medium 1 takes a form of an interference pattern. In the recording medium 1, the reproduction-purpose reference light is diffracted by the interference pattern, causing a diffracted light beam being a reproduction light beam containing the information recorded on the recording medium 1. The reproduction light beam returns from the recording medium 1 to the objective lens 12. The reproduction light beam passes through the objective lens 12, and then reaches the quarter-wave plate 13. It should be noted that the reproduction light beam is circularly-polarized. The quarter-wave plate 13 converts the circularly-polarized reproduction light beam into an S-polarized reproduction light beam. The S-polarized reproduction light beam travels from the quarter-wave plate 13 to the mirror 14. The S-polarized reproduction light beam is reflected by the mirror 14 before reaching the polarization beam splitter 18. The S-polarized reproduction light beam is reflected by the polarization beam splitter surface 18a of the device 18, and then travels from the device 18 to the photodetector array 20. The photodetector array 20 converts the S-polarized reproduction light beam into a corresponding electric signal (image data). The photodetector array 20 outputs the electric signal (the image data) to the signal processing circuit 27.

Figure 3:
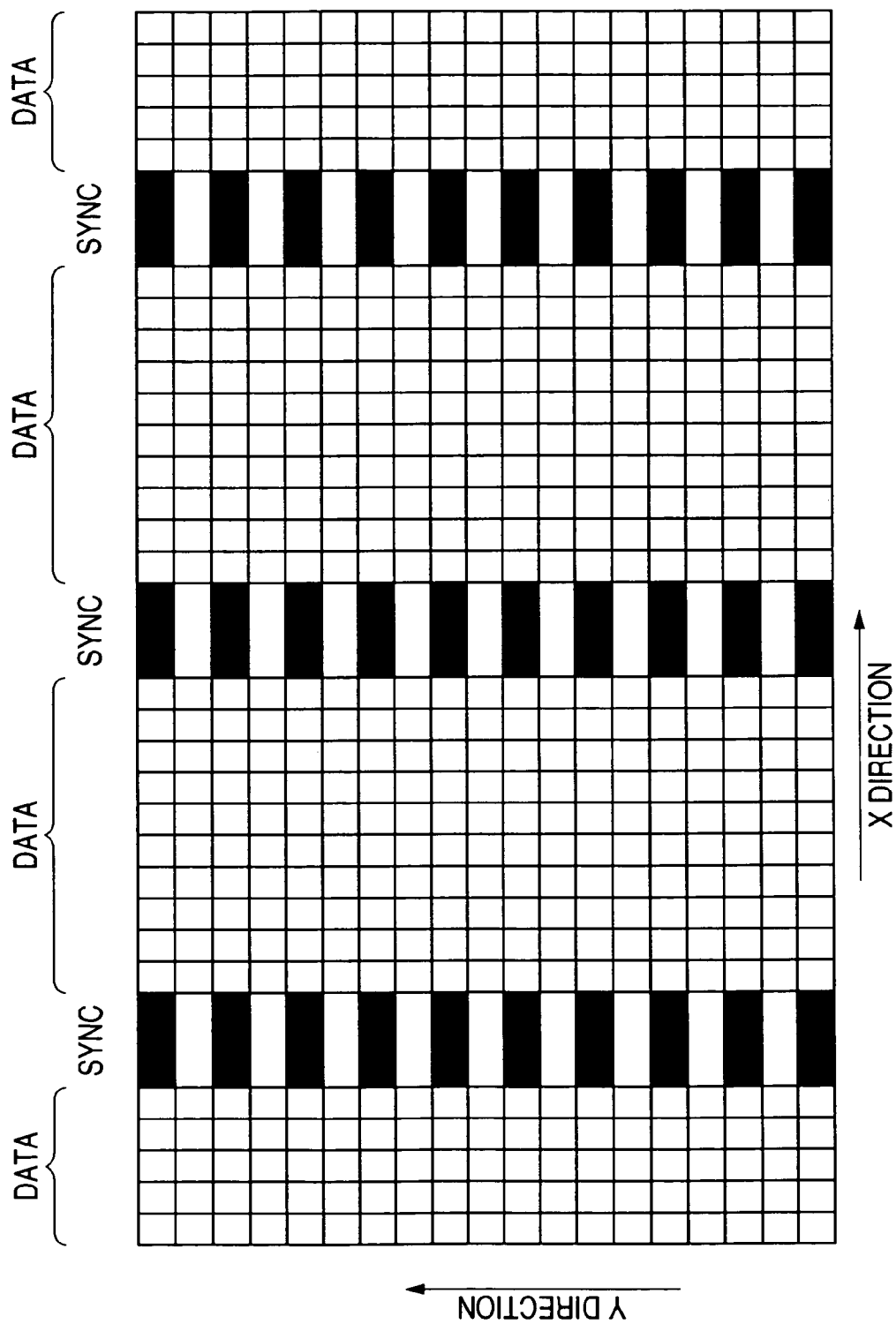
FIG. 3 is a diagram of a two-dimensional pattern of a portion of page data in the first embodiment of this invention.

The information recorded in the recording medium 1 is in the form of a two-dimensional page. FIG. 3 shows a portion of the page which is in a region covered by a spot of the reproduction-purpose reference light. As shown in FIG. 3, the page portion is divided into sync zones and data zones. The page portion has a two-dimensional array (a matrix array) of bits arranged in an X direction and a Y direction perpendicular to each other. The sync zones are filled with sync bits (sync data) while the data zones are occupied by information bits (information data). Each of the sync zones extends in parallel with the Y direction, and has an X-direction width of a prescribed number of bits (3 bits in FIG. 3). Thus, these sync zones are also referred to as the Y-direction sync zones. It should be noted that the X direction is horizontal, vertical, or arbitrarily halfway between horizontal and vertical while the Y direction is perpendicular to the X direction. Regarding each of the sync zones, every X-direction row of bits in the sync zone has a minimum inversion interval corresponding to 2 bits or more. In FIG. 3, first alternate ones of X-direction rows of bits in each sync zone are the same in contents while second alternate ones thereof are the same in contents. Thus, in each sync zone, alternately-equal-contents X-direction bit sequences which have a minimum inversion interval corresponding to 2 bits or more are located in parallel to each other. The first alternate ones of the X-direction rows of bits in each sync zone are different in contents from the second alternate ones thereof. According to a first example, 3 bits in each of the first alternate ones of the X-direction rows are "111" while 3 bits in each of the second alternate ones of the X-direction rows are "000". According to a second example, 3 bits in each of the first alternate ones of the X-direction rows are "000" while 3 bits in each of the second alternate ones of the X-direction rows are "111". On the other hand, every Y-direction column of bits in each sync zone has repetitions of inversion at a prescribed period. The sync zones in the page portion are spaced at equal intervals along the X direction. In FIG. 3, ones of the data zones extend between the sync zones. One of the data zones extends leftward of the leftmost sync zone. One of the data zones extends rightward of the rightmost sync zone.

The sync zones may have one of various bit patterns. According to a first example, each of the sync zones has an address corresponding to the X-direction position thereof. According to a second example, each of the sync zone has a Y-direction inversion-repetition period corresponding to one bit, two bits, or more bits. According to a third example, each of the sync zones has Y-direction inversion repetitions with a duty factor different from 50% or a variable duty factor. According to a fourth example, each of the sync zones has Y-direction inversion repetitions resulting from modulation. The bit pattern taken by the sync zones is designed so that the frequency and phase in the Y direction can be identified or detected on a bit-by-bit basis.

The information data (the information bits) in the data zones is, for example, a baseband signal or a modulation-resultant signal. The information data may be a signal of a run-length-limited code such as one used in a CD, a DVD, a BD (Blu-ray disc), or another optical information recording medium.

The information data (the information bits) in the data zones may be one of a signal resulting from LDPC (low-density parity check code) modulation of original data, a signal resulting from run-length modulation of the LDPC-modulation-resultant signal, a signal resulting from rearranging segments or bits of the LDPC-modulation-resultant signal, a signal resulting from run-length modulation of the rearranged LDPC-modulation-resultant signal, a signal resulting from turbo encoding of the original data, a signal resulting from run-length modulation of the turbo-encoded signal, a signal resulting from rearranging segments or bits of the turbo-encoded signal, and a signal resulting from run-length modulation of the rearranged turbo-encoded signal.

The information data (the information bits) in the data zones may be generated by the following sequence of steps. First, original data is subjected to run-length modulation. The run-length-modulation-resultant data is subjected to LDPC modulation or turbo encoding to generate parities and LDPC-modulation-resultant data or turbo-encoded data inclusive of the generated parities. Only the parity portions of the LDPC-modulation-resultant data or turbo-encoded data are subjected to run-length modulation again.

For example, a stream of sync bits and information bits constituting a recorded page results from NRZI (non return to zero inverted) conversion of an original bit stream. In this case, the signal processing circuit 27 includes an NRZI decoder for processing the image data from the pickup device 23.

An unevenness in the thickness of the recording medium 1, an irregularity of the plane thereof, and an eccentricity thereof cause aberrations of the reproduction light beam incident to the photodetector array 20. The aberrations result in a rotation, a curve, and a distortion of image data represented by the electric signal generated by the photodetector array 20. The signal processing circuit 27 corrects the rotation, the curve, and the distortion of the image data represented by the electric signal outputted from the photodetector array 20. In other words, the signal processing circuit 27 compensates for the aberrations of the reproduction light beam.

As understood from the previous description, the photodetector array 20 generates an electric signal representative of sync data and information data in a page portion covered by a spot of the reproduction-purpose reference light. The generated electric signal is composed of segments corresponding to respective bits constituting the sync data and the information data in the page portion.

Figure 4:
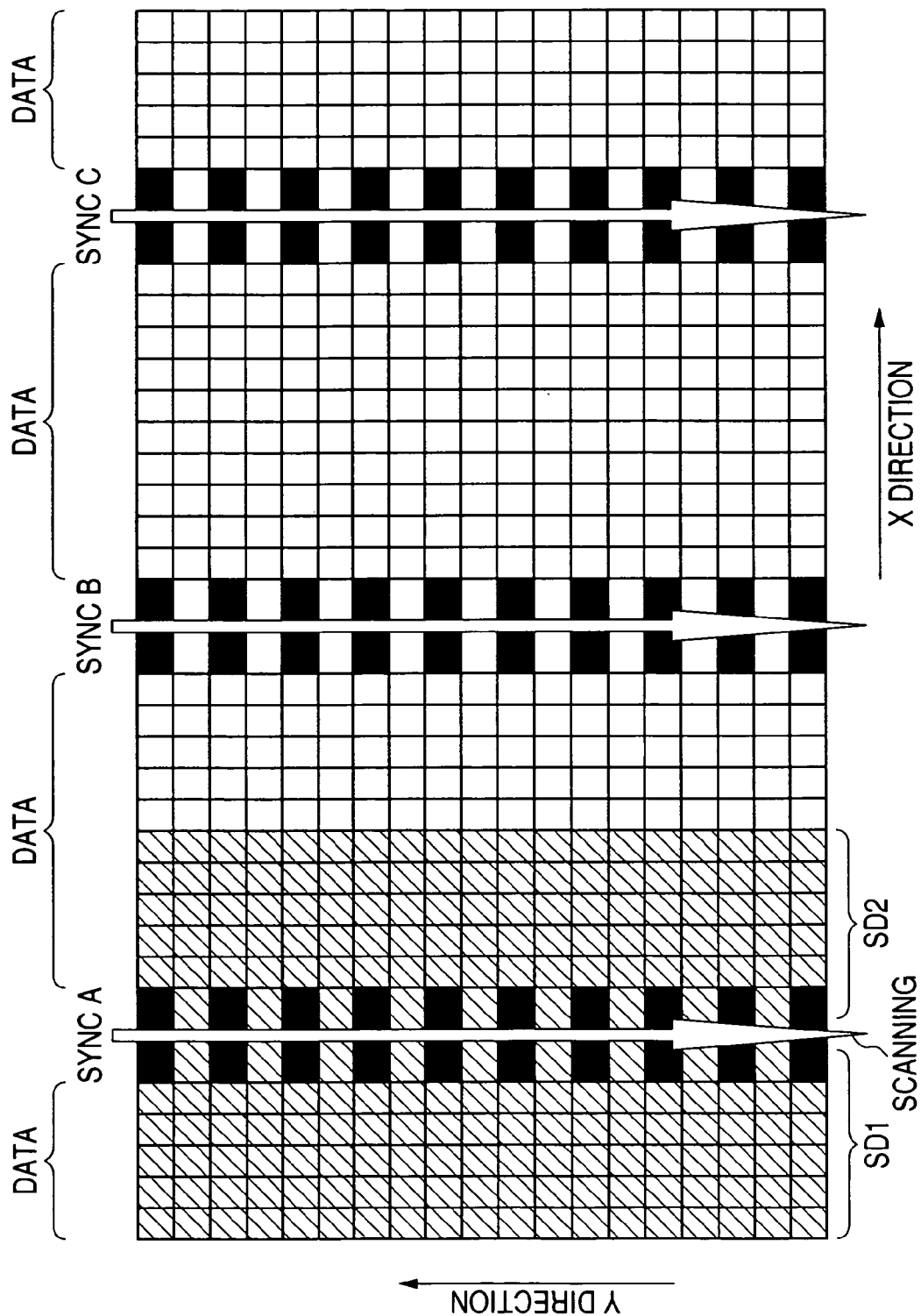
FIG. 4 is a diagram of the two-dimensional pattern in FIG. 3 which is being scanned along a Y direction.

With reference to FIG. 4, the signal processing circuit 27 reads out all bit-corresponding signal segments representative of sync data and information data around the sync data in a page portion from the photodetector array 20 while periodically iterating Y-direction scanning from top to bottom in the order denoted as A→B→C. Preferably, the signal processing circuit 27 converts the read-out signal segments into a digital version before processing the resultant digital read-out signal segments in a way mentioned later. Each stroke of the Y-direction scanning is centered at the central Y-direction sequence of bits in one of the sync zones. Each stroke of the Y-direction scanning has an X-direction width corresponding to a prescribed number of bits in the page portion. Specifically, each stroke of the Y-direction scanning covers a first region (for example, a region SD1 in FIG. 4) having the left-hand Y-direction sequence of bits in the related sync zone and all the Y-direction sequences of bits in the data zone or the right-half of the data zone extending leftward of the related sync zone, and also a second region (for example, a region SD2 in FIG. 4) having the right-hand Y-direction sequence of bits in the related sync zone and all the Y-direction sequences of bits in the data zone or the left-hand half of the data zone extending rightward of the related sync zone. The foregoing first and second regions are equal in X-direction width. For example, one stroke of Y-direction scanning which relates to the leftmost sync zone covers the hatched area in FIG. 4.

Subsequently, the signal processing circuit 27 implements Y-direction frequency and phase correction through the use of the digital read-out signal segments of the sync data. In addition, the signal processing circuit 27 re-samples the digital read-out signal segments of the information data around the sync data to regenerate information data.

Figure 5:
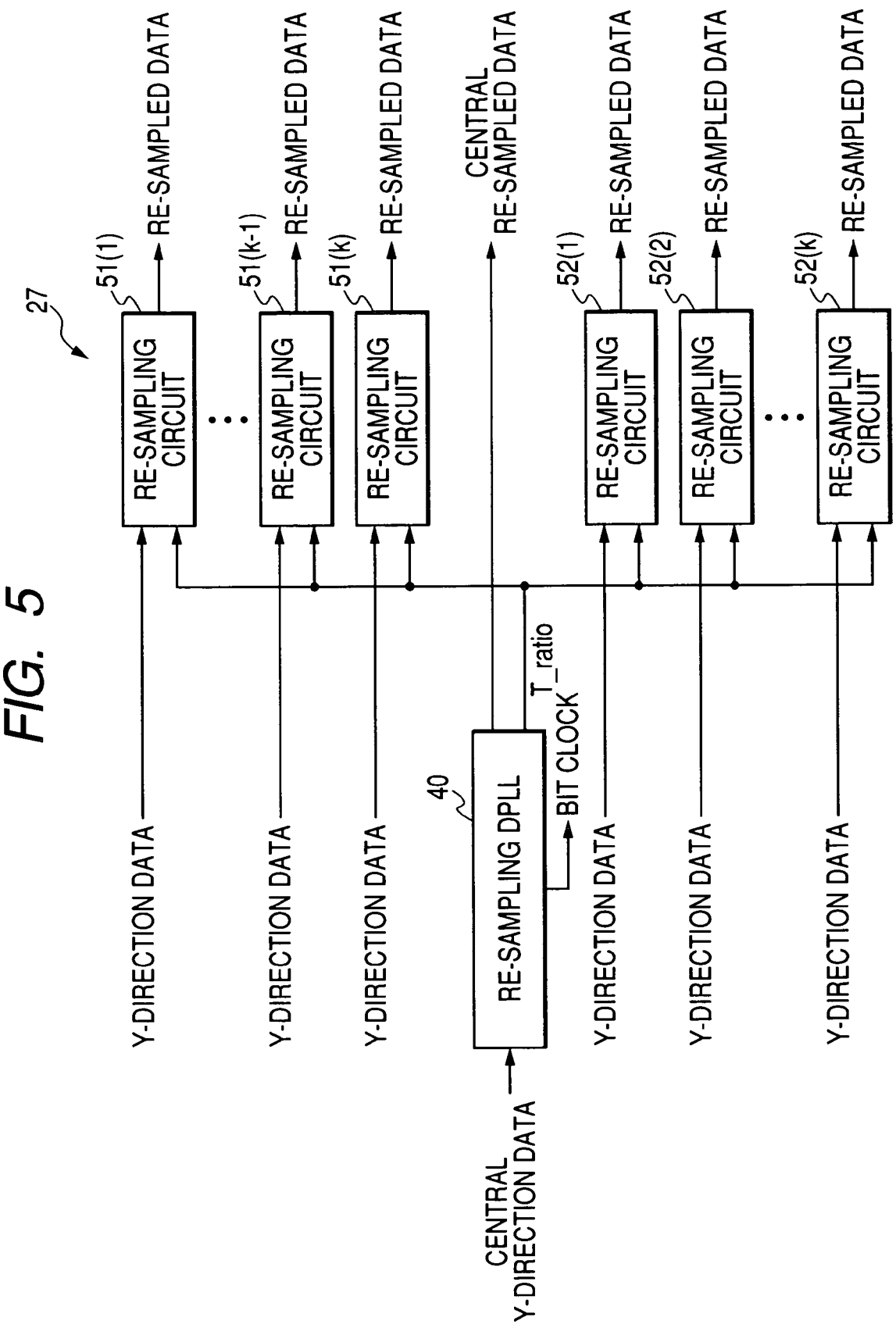
FIG. 5 is a block diagram of a first portion of a signal processing circuit in FIG. 1.

With reference to FIG. 5, the signal processing circuit 27 includes a re-sampling DPLL (digital phase locked loop) 40 for implementing the above-mentioned Y-direction frequency and phase correction. The re-sampling DPLL 40 has a closed loop. The re-sampling DPLL 40 serves to re-sample an input digital signal in response to a bit clock signal and data point phase information to get a re-sampling resultant digital signal. A timing related to samples of the re-sampling resultant digital signal is determined by the bit clock signal. Samples of the re-sampling resultant digital signal have a phase of 0° with respect to the bit clock signal. The re-sampling implemented by the re-sampling DPLL 40 includes at least one of interpolation and decimation designed to generate samples of the re-sampling resultant digital signal from samples of the input digital signal. The re-sampling follows contraction and expansion of an image represented by the input digital signal, and regenerates image data.

Figure 6:
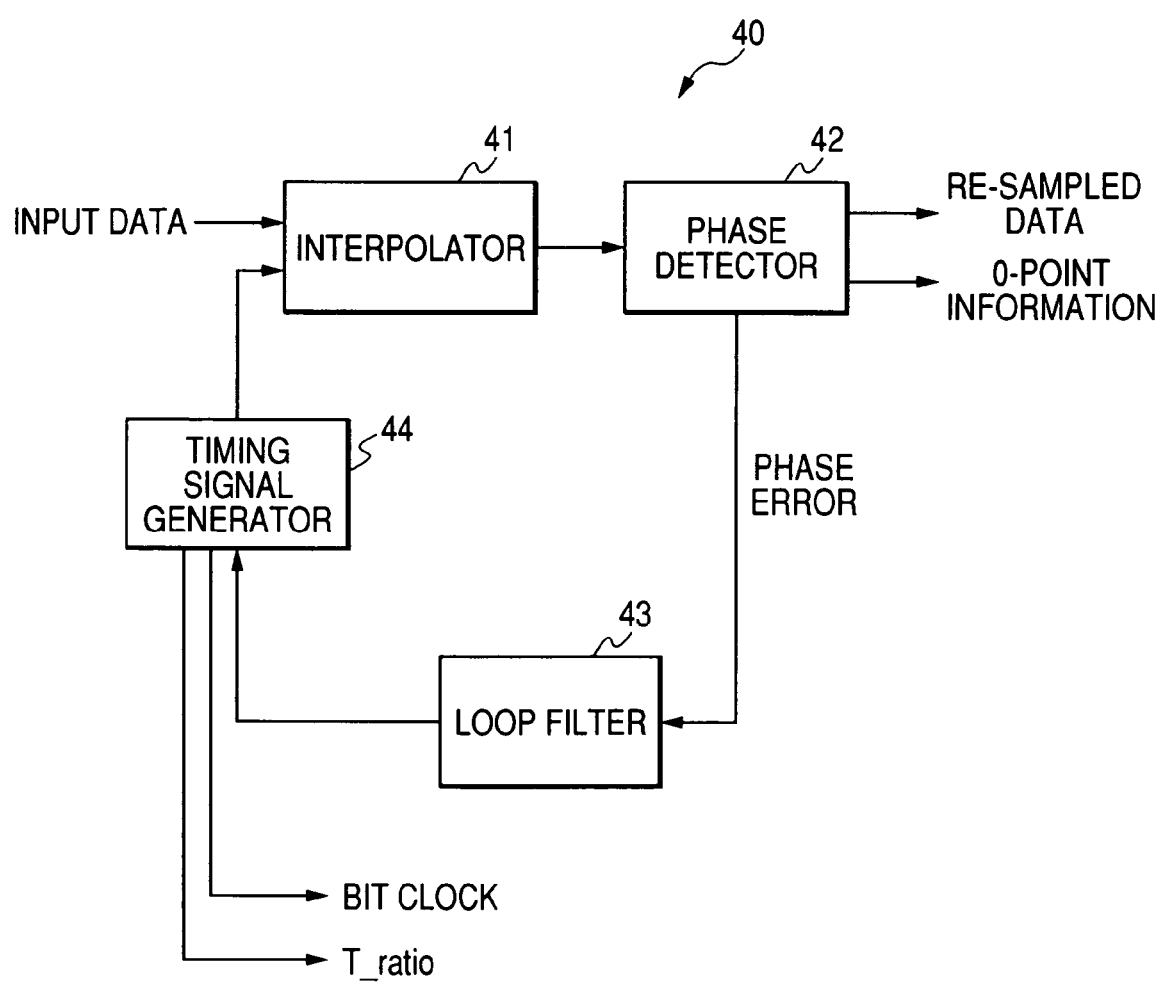
FIG. 6 is a block diagram of a re-sampling DPLL in FIG. 5.

As shown in FIG. 6, the re-sampling DPLL 40 has an interpolator 41, a phase detector 42, a loop filter 43, and a timing signal generator 44 which are connected in a closed loop in that order. The interpolator 41 receives a read-out signal of the central Y-direction sequence of bits in each sync zone from the photodetector array 20 as an input digital signal. Generally, the received signal represents a waveform which repetitively crosses a zero level or an offset zero level. The interpolator 41 receives data point phase information and the bit clock signal from the timing signal generator 44. The interpolator 41 estimates 0°-phase-point data samples from samples of the input digital signal through re-sampling-based interpolation responsive to the data point phase information and the bit cock signal. Here, "phase" is defined relative to the bit clock signal. The interpolator 41 outputs the estimated 0°-phase-point data samples to the phase detector 42.

In the re-sampling DPLL 40, the phase detector 42 passes and outputs the 0°-phase-point data samples to a later circuit stage. The phase detector 42 may shift the sampling phase of the 0°-phase-point data samples or delay the 0°-phase-point data samples before outputting the shifted data samples or the delayed data samples to the later circuit stage.

For example, the phase detector 42 generates 180°-phase-point data samples from the 0°-phase-point data samples. Specifically, the phase detector 42 calculates a mean of a current 0°-phase-point data sample and an immediately preceding 0°-phase-point data sample, and uses the calculated mean as a current 180°-phase-point data sample. The phase detector 42 outputs the 180°-phase-point data samples to the later circuit stage.

A sequence of the data samples outputted from the phase detector 42 is a re-sampling-resultant signal of the central Y-direction bit sequence.

In addition, the phase detector 42 senses zero-cross points from the 0°-phase-point data samples. Furthermore, the phase detector 42 detects a phase error in response to each of the sensed zero-cross points. Specifically, the phase detector 42 senses a zero-cross point by referring to a current 0°-phase-point data sample and an immediately preceding 0°-phase-point data sample. When a zero-cross point is sensed, the phase detector 42 multiplies the polarity of the immediately preceding 0°-phase-point data sample by a mean of the current 0°-phase-point data sample and the immediately preceding 0°-phase-point data sample. The phase detector 42 uses the result of the multiplication as a phase error.

Furthermore, the phase detector 42 generates 0-point information representing the sensed zero-cross points. The phase detector 42 outputs the 0-point information to a subsequent circuit stage. The phase detector 42 generates a signal representing the phase error. The phase detector 42 outputs the phase error signal to the loop filter 43.

The loop filter 43 integrates the phase error signal. The loop filter 43 outputs the integration-resultant signal to the timing signal generator 44. The timing signal generator 44 produces the data point phase information and the bit clock signal in response to the output signal of the loop filter 43. Specifically, the timing signal generator 44 estimates a next data point phase from the output signal of the loop filter 43, and generates the data point phase information in accordance with the estimated next data point phase. The timing signal generator 44 feeds the data point phase information and the bit clock signal to the interpolator 41. The interpolator 41 implements the re-sampling, the timing or the frequency and phase of which are locked so that levels represented by zero-cross-point-corresponding samples having a phase of 180° will be equal to "0". The timing signal generator 44 feeds the bit clock signal to other devices and circuits also.

Furthermore, the timing signal generator 44 calculates the ratio of interior division for the re-sampling from the data point phase information. The time interval between a first original sample point and a second original sample point is divided at "m:n" where "m" denotes the time length between the first original sample point and a re-sampling point while "n" denotes the time length between the re-sampling point and the second original sample point. The time lengths "m" and "n" are given by the data point phase information. The timing signal generator 44 calculates an interior division ratio expressed as "m/(m+n)". The timing signal generator 44 defines the calculated interior division ratio as a parameter T_ratio. The timing signal generator 44 produces and outputs a signal representing the parameter T_ratio. The data point phase information may be directly used as the signal representing the parameter T_ratio.

The interpolator 41 carries out, for example, linear interpolation. In this case, the interpolator 41 calculates the value D of every sample of the re-sampling-resultant signal from the values D1 and D2 of two related successive samples of the input digital signal according to the following equation.

$$D = (1 - T\_ratio) \cdot D1 + T\_ratio \cdot D2$$

The re-sampling DPLL 40 utilizes the sync data (in the Y direction) for controlling the frequency and phase of the information data (in the Y direction) extending around the sync data and represented by the output signal of the photodetector array 20.

With reference back to FIG. 5, the signal processing circuit 27 includes a group of re-sampling circuits 51(1), 51(2), ..., and 51(k), and a group of re-sampling circuits 52(1), 52(2), ..., and 52(k) where "k" denotes a predetermined natural number corresponding to the X-direction width of the regions SD1 and SD2 (see FIG. 4). Basically, the re-sampling circuits 51(1), 51(2), ..., 51(k), 52(1), 52(2), ..., and 52(k) are similar to the interpolator 41 in FIG. 6. Signals of the Y-direction bit sequences in the previously-mentioned first region (for example, the region SD1 in FIG. 4) are inputted from the photodetector array 20 to the re-sampling circuits 51(1), 51(2), ..., and 51(k), respectively. Signals of the Y-direction bit sequences in the previously-mentioned second region (for example, the region SD2 in FIG. 4) are inputted from the photodetector array 20 to the re-sampling circuits 52(1), 52(2), ..., and 52(k), respectively. The re-sampling DPLL 40 feeds the bit clock signal and the signal representative of the parameter T_ratio to the re-sampling circuits 51(1), 51(2), ..., 51(k), 52(1), 52(2), ..., and 52(k).

The re-sampling circuits 51(1), 51(2), ..., 51(k), 52(1), 52(2), ..., and 52(k) re-sample the inputted signals of the Y-direction bit sequences in response to the parameter T_ratio and the bit clock signal to generate re-sampling-resultant signals of the Y-direction bit sequences, respectively. The re-sampling circuits 51(1), 51(2), ..., 51(k), 52(1), 52(2), ..., and 52(k) output the re-sampling-resultant signals, respectively. The re-sampling by the re-sampling circuits 51(1), 51(2), ..., 51(k), 52(1), 52(2), ..., and 52(k) corrects a rotation, a curve, and a distortion of the Y-direction bit sequences represented by the inputted signals.

It should be noted that the Y-direction scanning related to the leftmost sync zone, the Y-direction scanning related to the intermediate sync zone, and the Y-direction scanning related to the rightmost sync zone in the page portion may be simultaneously implemented. In this case, the signal processing circuit 27 simultaneously carries out the processing of the signals of the Y-direction bit sequences read out by the Y-direction scanning related to the leftmost sync zone, the processing of the signals of the Y-direction bit sequences read out by the Y-direction scanning related to the intermediate sync zone, and the processing of the signals of the Y-direction bit sequences read out by the Y-direction scanning related to the rightmost sync zone. Alternatively, the Y-direction scanning related to the leftmost sync zone, the Y-direction scanning related to the intermediate sync zone, and the Y-direction scanning related to the rightmost sync zone in the page portion may be sequentially implemented. In this case, the signal processing circuit 27 sequentially carries out the processing of the signals of the Y-direction bit sequences read out by the Y-direction scanning related to the leftmost sync zone, the processing of the signals of the Y-direction bit sequences read out by the Y-direction scanning related to the intermediate sync zone, and the processing of the signals of the Y-direction bit sequences read out by the Y-direction scanning related to the rightmost sync zone.

It should be noted that only the signals of the Y-direction bit sequences read out from one of the previously-mentioned first and second regions (for example, the regions SD1 and SD2 in FIG. 4) may be re-sampled. The previously-mentioned first and second regions may be different in X-direction width.

As previously mentioned, in each sync zone, alternately-equal-contents X-direction bit sequences which have a 3-bit length and a minimum inversion interval corresponding to 2 bits or more are located in parallel to each other. This design prevents information about Y-direction frequency and phase from being lost by the occurrence of a rotation, a curve, and a distortion of a page portion represented by the electric signal generated in the photodetector array 20. Therefore, the signal processing circuit 27 surely obtains information about frequency and phase errors from the signal processing related to the Y-direction scanning.

The signal processing circuit 27 includes a work memory such as a RAM. The re-sampling-resultant signals of the Y-direction bit sequences generated by the re-sampling DPLL 40, and the re-sampling circuits 51(1), 51(2), . . . , 51(k), 52(1), 52(2), . . . , and 52(k) are stored into the work memory. When all the signals of the re-sampling-resultant Y-direction bit sequences constituting the page portion of interest are prepared in the work memory, the signal processing circuit 27 starts signal processing related to X-direction scanning.

During the X-direction-scanning-based signal processing, the signal processing circuit 27 reads out all bit-corresponding signal segments representative of the sync data and the information data around the sync data in the page portion from the work memory while periodically iterating X-direction scanning from left-hand end to right-hand end. Each stroke of the X-direction scanning has a Y-direction width corresponding to a prescribed number of bits. The signal processing circuit 27 includes a re-sampling DPLL which re-samples the read-out signals of the X-direction bit sequences, and which generates a bit clock signal and a signal representative of a parameter T_ratio. The signal processing circuit 27 serves to re-sample the read-out sync data and the read-out information data around the sync data in response to the parameter T_ratio to regenerate sync data and information data. The signal processing circuit 27 subjects the signal of the regenerated sync and information data to X-direction waveform equalization to reduce or remove the X-direction inter-symbol interferences. The X-direction equalization can be implemented through the use of a transversal filter according to a known LMS (least mean squares) method. Alternatively, the signal processing circuit 27 may subject the signal of the regenerated sync and information data to two-dimensional waveform equalization to reduce or remove the X-direction inter-symbol interferences as well as the Y-direction inter-symbol interferences. Preferably, the two-dimensional waveform equalization includes a procedure of generating a pseudo cross talk through the use of one or more read-out X-direction bit sequences neighboring a read-out X-direction bit sequence of interest, and canceling an actual cross talk by referring to the pseudo cross talk. The equalization-resultant cross-talk-free sync and information data is stored into the work memory.

Figure 7:
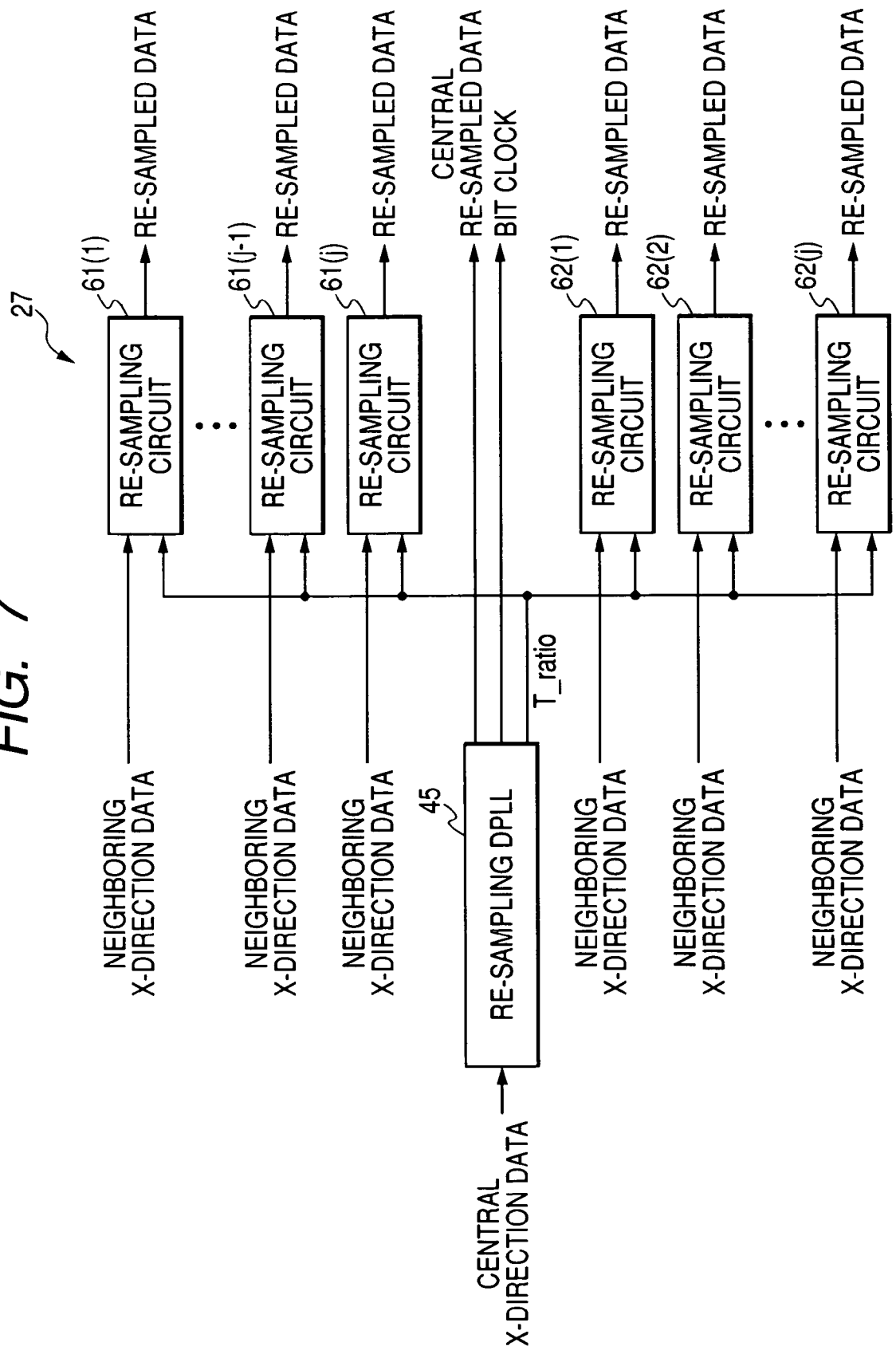
FIG. 7 is a block diagram of a second portion of the signal processing circuit in FIG. 1.
Figure 8:
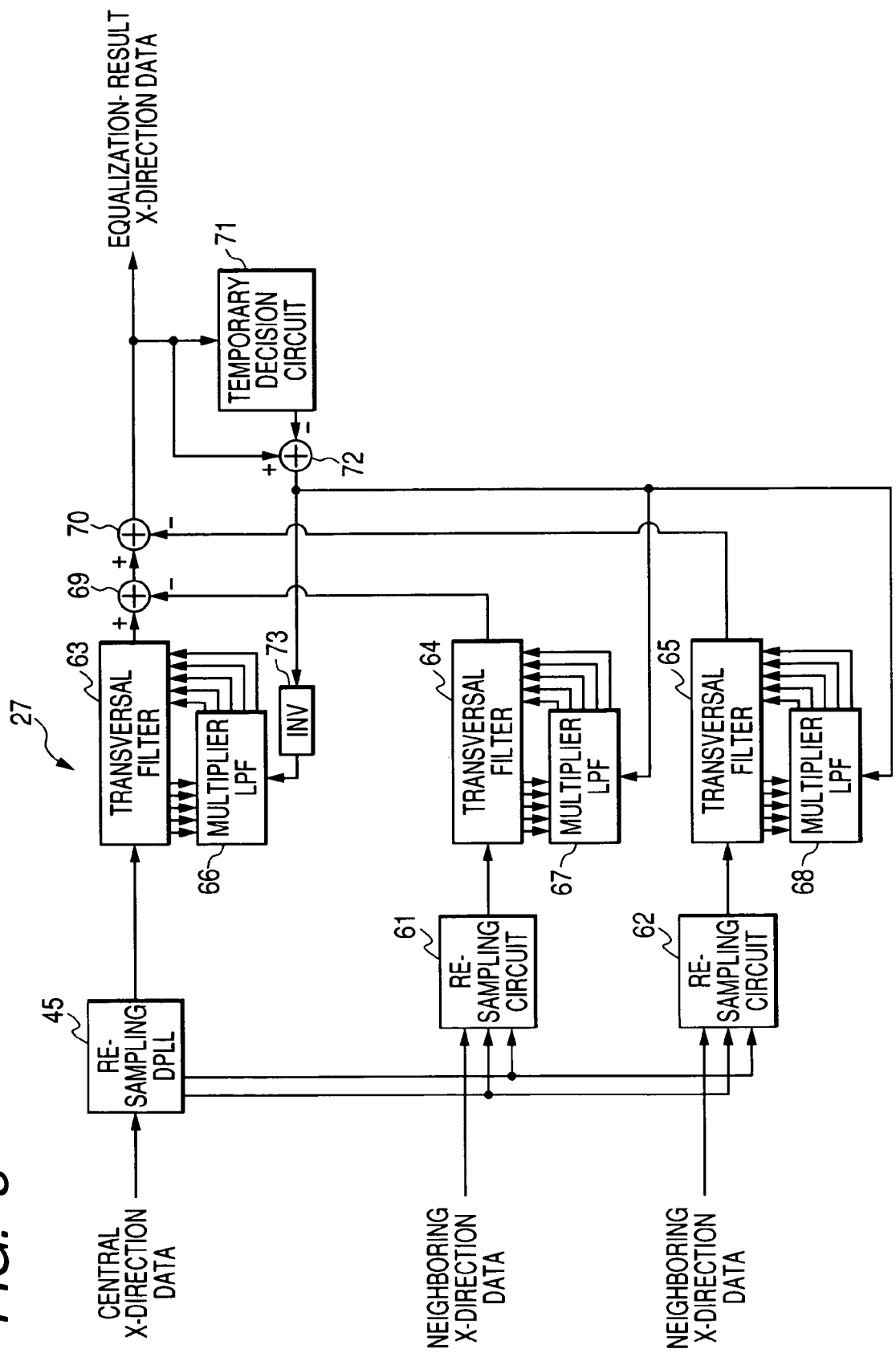
FIG. 8 is a block diagram of a third portion of the signal processing circuit in FIG. 1 which includes the second portion thereof.

The X-direction-scanning-based signal processing will be further described hereafter. With reference to FIGS. 7 and 8, the signal processing circuit 27 includes a re-sampling DPLL 45, a group of re-sampling circuits 61(1), 61(2), . . . , and 61(j), and a group of re-sampling circuits 62(1), 62(2), . . . , and 62(j) where "j" denotes a predetermined natural number substantially corresponding to a half of the Y-direction width of one stroke of the X-direction scanning. Basically, the re-sampling circuits 61(1), 61(2), . . . , 61(j), 62(1), 62(2), . . . , and 62(j) are similar to the interpolator 41 in FIG. 6. It should be noted that only one of the re-sampling circuits 61(1), 61(2), . . . , and 61(j) and only one of the re-sampling circuits 62(1), 62(2), . . . , and 62(j) are shown in FIG. 8 for the sake of clarity. The predetermined natural number "j" may be equal to "1". In this case, only one re-sampling circuit 61 and only one re-sampling circuit 62 are provided. The re-sampling DPLL 45 is similar in structure to the re-sampling DPLL 40 in FIGS. 5 and 6.

Figure 9:
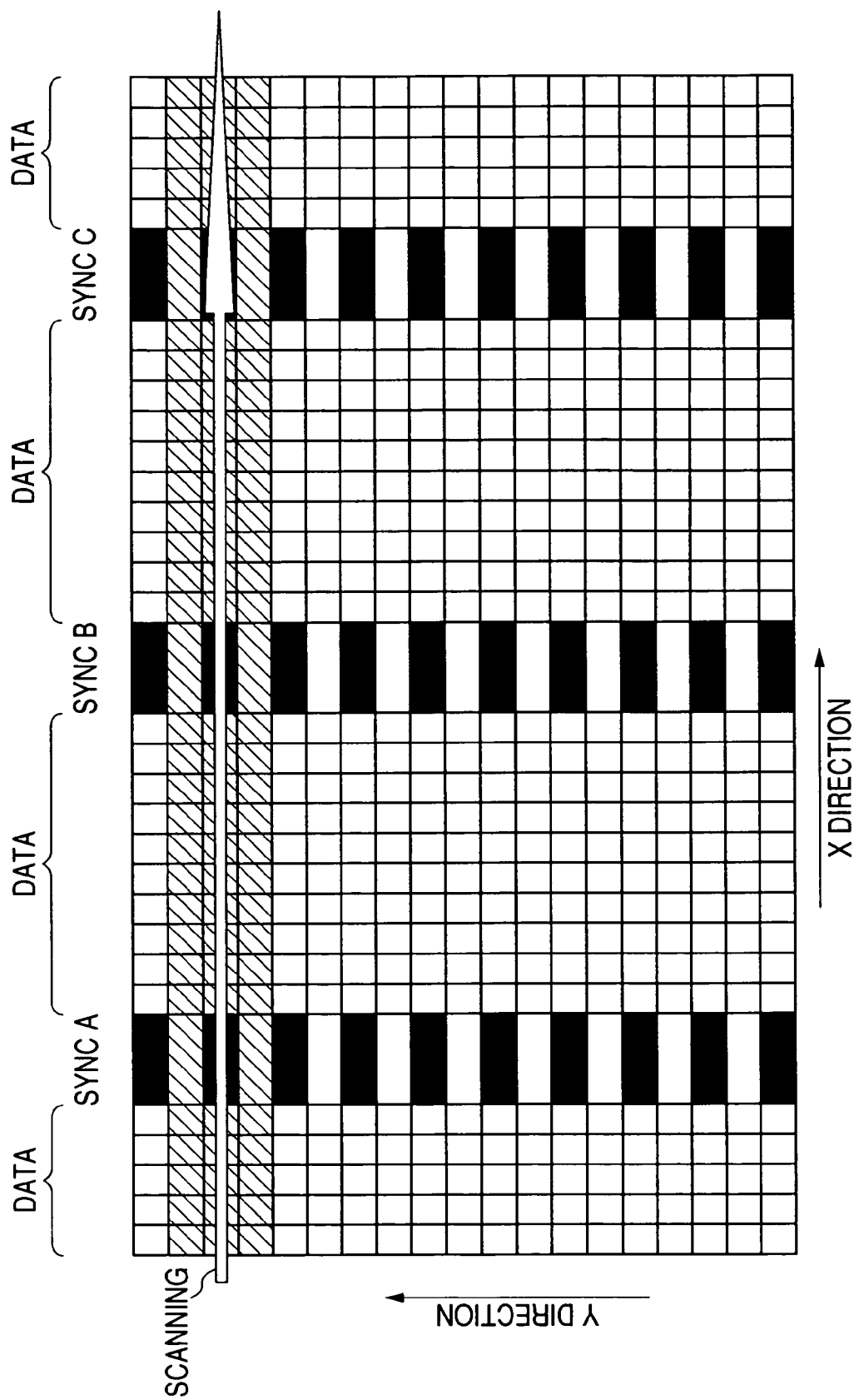
FIG. 9 is a diagram of the two-dimensional pattern in FIG. 3 which is being scanned along an X direction.

All bit-corresponding signal segments of sync data and information data around the sync data in the page portion are read out from the work memory while X-direction scanning from left-hand end to right-hand end is periodically iterated. FIG. 9 shows an example of one stroke of the X-direction scanning. In FIG. 9, one stroke of the X-direction scanning has a Y-direction width corresponding to three bits. The stroke of the X-direction scanning covers the hatched area in FIG. 9. During one stroke of the X-direction scanning in FIG. 9, signals of three successive X-direction bit sequences of the sync data and the information data are read out from the work memory. It should be noted that during one stroke of the X-direction scanning, signals of five or more successive bit sequences may be read out from the work memory. Regarding one stroke of the X-direction scanning in FIG. 9, the three successive X-direction bit sequences are upper, central, and lower ones. The upper and lower X-direction bit sequences, which neighbor the central X-direction bit sequence and are positionally above and below the central X-direction bit sequence, are referred to as the neighboring X-direction bit sequences. The central X-direction bit sequence is handled as an X-direction bit sequence of interest while the neighboring X-direction bit sequences are used for canceling or removing cross talk components from the X-direction bit sequence of interest. During the iteration of the X-direction scanning, the X-direction bit sequence of interest periodically shifts from one of rows of bits to the next.

The re-sampling DPLL 45 receives the signal of the central X-direction bit sequence of the sync data and the information data (the X-direction bit sequence of interest) which is read out from the work memory during every stroke of the X-direction scanning. The re-sampling DPLL 45 re-samples the received signal of the X-direction bit sequence of interest to generate a re-sampling-resultant signal. The re-sampling DPLL 45 outputs the re-sampling-resultant signal of the X-direction bit sequence of interest to a transversal filter 63. The re-sampling DPLL 45 generates a bit clock signal and a signal representative of a parameter T_ratio in response to the received signal of the X-direction bit sequence of interest. The re-sampling DPLL 45 outputs the bit clock signal to other devices and circuits. Basically, the bit clock signal takes a form of a punctured clock signal. The re-sampling DPLL 45 feeds the bit clock signal and the signal representative of the parameter T_ratio to the re-sampling circuits 61(1), 61(2), . . . , 61(j), 62(1), 62(2), . . . , and 62(j).

The signals of the neighboring X-direction bit sequences of the sync data and the information data, which are read out from the work memory during every stroke of the X-direction scanning and which are positionally above the signal of the X-direction bit sequence of interest, are inputted to the re-sampling circuits 61(1), 61(2), . . . , and 61(j), respectively. The signals of the neighboring X-direction bit sequences of the sync data and the information data, which are read out from the work memory during every stroke of the X-direction scanning and which are positionally below the signal of the X-direction bit sequence of interest, are inputted to the re-sampling circuits 62(1), 62(2), . . . , and 62(k), respectively.

The re-sampling circuits 61(1), 61(2), . . . , 61(j), 62(1), 62(2), . . . , and 62(j) re-sample the inputted signals of the neighboring X-direction bit sequences in response to the parameter T_ratio and the bit clock signal to generate re-sampling-resultant signals of the neighboring X-direction bit sequences, respectively. The re-sampling circuits 61(1), 61(2), . . . , and 61(k) output the re-sampling-resultant signals of the neighboring X-direction bit sequences to transversal filters 64, respectively. The transversal filters 64 are similar to the transversal filter 63. The re-sampling circuits 62(1), 62(2), . . . , and 62(k) output the re-sampling-resultant signals of the neighboring X-direction bit sequences to transversal filters 65, respectively. The transversal filters 65 are similar to the transversal filter 63. It should be noted that only one of the transversal filters 64 and only one of the transversal filters 65 are shown in FIG. 8 for the sake of clarity. The re-sampling by the re-sampling DPLL 45 and the re-sampling circuits 61(1), 61(2), . . . , 61(k), 62(1), 62(2), . . . , and 62(k) correct a rotation, a curve, and a distortion of the X-direction bit sequences represented by the inputted signals.

The transversal filter 63 receives filtering coefficients, that is, tap coefficients, from a multiplier and LPF (low pass filter) section 66. The transversal filter 63 subjects the signal of the X-direction bit sequence of interest, which is outputted from the re-sampling DPLL 45, to filtering-based waveform equalization responsive to the filtering coefficients so that the inter-symbol interference components of the signal of the X-direction bit sequence of interest will be reduced or removed. Thus, the transversal filter 63 converts the signal of the X-direction bit sequence of interest into an equalization-resultant signal of the X-direction bit sequence of interest. The equalization-resultant signal of the X-direction bit sequence of interest propagates from the transversal filter 63 to a temporary decision circuit 71 via subtracters 69 and 70.

The temporary decision circuit 71 temporarily decides the state or value of the output signal from the subtracter 70, and generates an ideal value (a target value) on the basis of the temporarily decided state or value. The temporary decision circuit 71 outputs a signal representative of the target value to a subtracter 72. The device 72 subtracts the target value from the actual value represented by the output signal of the subtracter 70 to generate an error signal corresponding to the subtraction result. The subtracter 72 outputs the error signal to an inverter 73. The device 73 inverts the polarity of the error signal to generate a polarity-inverted error signal. The inverter 73 outputs the polarity-inverted error signal to the multiplier and LPF section 66. The multiplier and LPF section 66 receives tap output signals from the transversal filter 63. In the multiplier and LPF section 66, the tap output signals are multiplied by the polarity-inverted error signal to detect a correlation, and the multiplication-resultant signals (the correlation-indicating signals) are integrated by LPFs to form signals representative of the filtering coefficients or the tap coefficients. The multiplier and LPF section 66 outputs the signals of the filtering coefficients to the transversal filter 63. The filtering coefficients, that is, the tap coefficients, used by the transversal filter 63 are designed to nullify the value of the above-mentioned error signal.

The transversal filter 63, the temporary decision circuit 71, the subtracter 72, the inverter 73, and the multiplier and LPF section 66 constitute a feedback loop for adaptively implementing the waveform equalization on the basis of a known LMS (least mean square) algorithm. The transversal filter 63, the temporary decision circuit 71, the subtracter 72, the inverter 73, and the multiplier and LPF section 66, and the combination thereof are the same as those in, for example, U.S. Pat. No. 6,445,662, the disclosure of which is hereby incorporated by reference.

In FIG. 8, the transversal filter 64 receives filtering coefficients, that is, tap coefficients, from a multiplier and LPF (low pass filter) section 67. The multiplier and LPF section 67 is similar to the multiplier and LPF section 66. The transversal filter 64 subjects the signal of the neighboring X-direction bit sequence, which comes from the related re-sampling circuit 61, to filtering responsive to the filtering coefficients, and thereby generates a filtered signal of the neighboring X-direction bit sequence. The multiplier and LPF section 67 receives the error signal from the subtracter 72. The multiplier and LPF section 67 receives tap output signals from the transversal filter 64. In the multiplier and LPF section 67, the tap output signals are multiplied by the error signal to detect a correlation of the signal of the neighboring X-direction bit sequence, and the multiplication-resultant signals (the correlation-indicating signals) are integrated by LPFs to form signals representative of the filtering coefficients or the tap coefficients. The multiplier and LPF section 67 outputs the signals of the filtering coefficients to the transversal filter 64.

The filtering coefficients, that is, the tap coefficients, used by the transversal filter 64 are periodically updated in accordance with the detected correlation of the signal of the neighboring X-direction bit sequence. The filtered signal of the neighboring X-direction bit sequence which is generated by the transversal filter 64 forms a pseudo cross talk signal, that is, a signal representing a cross talk between the signal of the X-direction bit sequence of interest and the signal of the neighboring X-direction bit sequence. The transversal filter 64 outputs the pseudo cross talk signal to the subtracter 69.

In FIG. 8, the transversal filter 65 receives filtering coefficients, that is, tap coefficients, from a multiplier and LPF (low pass filter) section 68. The multiplier and LPF section 68 is similar to the multiplier and LPF section 66. The transversal filter 65 subjects the signal of the neighboring X-direction bit sequence, which comes from the related re-sampling circuit 62, to filtering responsive to the filtering coefficients, and thereby generates a filtered signal of the neighboring X-direction bit sequence. The multiplier and LPF section 68 receives the error signal from the subtracter 72. The multiplier and LPF section 68 receives tap output signals from the transversal filter 65. In the multiplier and LPF section 68, the tap output signals are multiplied by the error signal to detect a correlation of the signal of the neighboring X-direction bit sequence, and the multiplication-resultant signals (the correlation-indicating signals) are integrated by LPFs to form signals representative of the filtering coefficients or the tap coefficients. The multiplier and LPF section 68 outputs the signals of the filtering coefficients to the transversal filter 65.

The filtering coefficients, that is, the tap coefficients, used by the transversal filter 65 are periodically updated in accordance with the detected correlation of the signal of the neighboring X-direction bit sequence. The filtered signal of the neighboring X-direction bit sequence which is generated by the transversal filter 65 forms a pseudo cross talk signal, that is, a signal representing a cross talk between the signal of the X-direction bit sequence of interest and the signal of the neighboring X-direction bit sequence. The transversal filter 65 outputs the pseudo cross talk signal to the subtracter 70.

The subtracters 69 and 70 successively follow the transversal filter 63, and receive the equalization-resultant signal of the X-direction bit sequence of interest therefrom. The combination of the devices 69 and 70 subtracts the pseudo cross talk signals (the output signals of the transversal filters 64 and 65) from the equalization-resultant signal of the X-direction bit sequence of interest, and thereby removes cross talk components therefrom or cancels the cross talk components therein. Accordingly, the combination of the subtracters 69 and 70 converts the equalization-resultant signal of the X-direction bit sequence of interest into an equalization-resultant cross-talk-free signal of the X-direction bit sequence of interest. The equalization-resultant cross-talk-free signal of the X-direction bit sequence of interest is fed to the temporary decision circuit 71 and the subtracter 72. Furthermore, the equalization-resultant cross-talk-free signal of the X-direction bit sequence of interest is stored into the work memory.

The transversal filter 64, the subtracter 69, the temporary decision circuit 71, the subtracter 72, and the multiplier and LPF section 67 constitute a feedback loop which controls the tap coefficients used by the transversal filter 64 to nullify the value of the error signal. The transversal filter 65, the subtracter 70, the temporary decision circuit 71, the subtracter 72, and the multiplier and LPF section 68 constitute a feedback loop which controls the tap coefficients used by the transversal filter 65 to nullify the value of the error signal. The signal processing circuit 27 has an inter-symbol-interference removing block including the transversal filter 63, and a pseudo-cross-talk-signal generating block including the transversal filters 64 and 65. The tap coefficients used by the transversal filters 63, 64, and 65 are controlled to nullify the value of the same error signal. Accordingly, it is possible to prevent the occurrence of a collision between the inter-symbol-interference removing control and the cross-talk canceling control.

It should be noted that the recording medium 1 may be an optical card rather than an optical disc.

Second Embodiment

Figure 10:
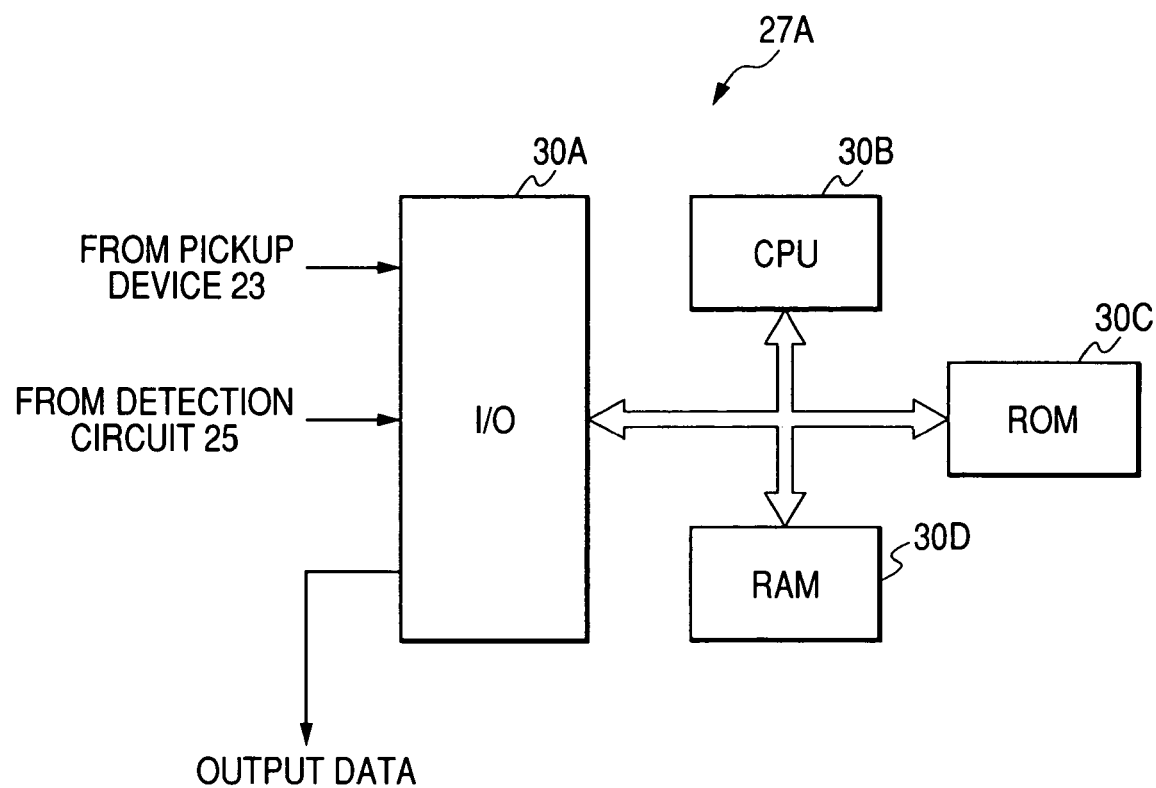
FIG. 10 is a block diagram of a signal processing circuit in a second embodiment of this invention.

A second embodiment of this invention is similar to the first embodiment (FIGS. 1-9) thereof except for design changes mentioned hereafter. FIG. 10 shows a signal processing circuit 27A in the second embodiment of this invention. The signal processing circuit 27A replaces the signal processing circuit 27 of FIG. 1.

With reference to FIG. 10, the signal processing circuit 27A includes a digital signal processor or a computer having a combination of an input/output port 30A, a CPU 30B, a ROM 30C, and a RAM 30D. The signal processing circuit 27A operates in accordance with a control program (a computer program) stored in the ROM 30C or the RAM 30D. It should be noted that the control program may be installed on the RAM 30D from a personal computer or downloaded thereinto via a communication network. The input/output port 30A includes A/D converters for changing the output signals of the pickup device 23 and the detection circuit 25 into corresponding digital signals.

The signal processing circuit 27A and the controller 28 (FIG. 1) may be formed by a common computer.

Figure 11:
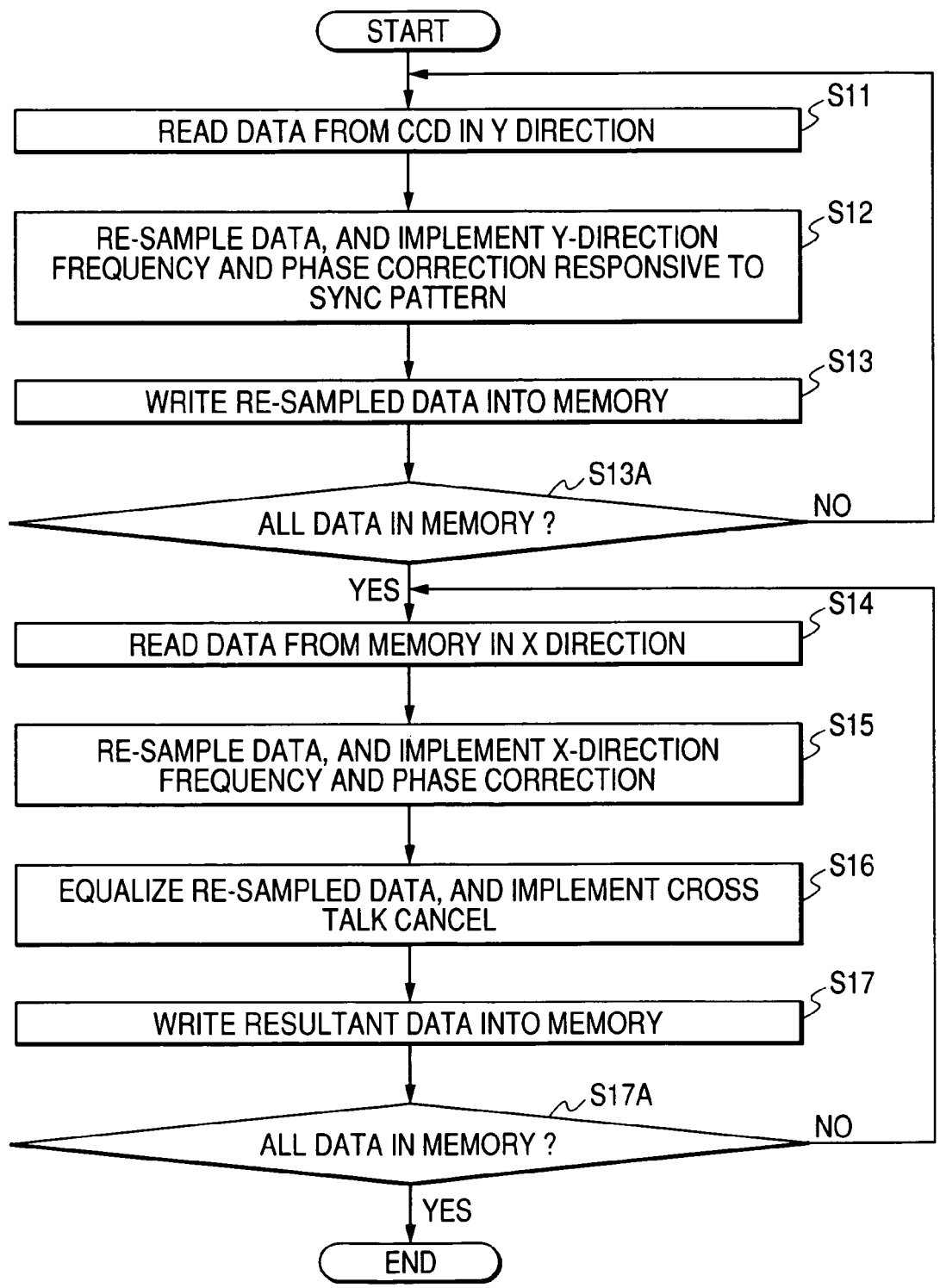
FIG. 11 is a flowchart of a segment of a control program for the signal processing circuit in FIG. 10.

FIG. 11 is a flowchart of a segment of the control program for the signal processing circuit 27A. As shown in FIG. 11, a first step S11 of the program segment reads out bit-corresponding signal segments representative of sync data and information data around the sync data in a page portion from the photodetector array 20 while implementing Y-direction scanning from top to bottom. Preferably, the step S11 converts the read-out signal segments into digital versions before processing the resultant digital read-out signal segments in a way mentioned later.

A step S12 following the step S11 provides a re-sampling DPLL, and processes the digital read-out signal segments of the sync data through the use of the re-sampling DPLL to regenerate signal segments of the sync data and also generate a corrective signal (the signal representing the parameter T_ratio), that is, a signal for Y-direction frequency and phase correction of the digital read-out signal segments of the information data around the sync data. Furthermore, the step S12 re-samples the digital read-out signal segments of the information data around the sync data in response to the corrective signal to regenerate signal segments of the information data which have undergone the Y-direction frequency and phase correction. The step S12 corresponds to the re-sampling DPLL 40 and the re-sampling circuits 51(1), 51(2), ..., 51(k), 52(1), 52(2), ..., and 52(k) in FIG. 5.

A step S13 subsequent to the step S12 writes the regenerated signal segments of the sync data and the information data into the RAM 30D.

A step S13A following the step S13 decides whether or not the Y-direction scanning of the whole of the page portion has been completed. When the Y-direction scanning of the whole of the page portion has been completed, the program advances from the step S13A to a step S14. Otherwise, the step S13A updates a variable denoting a place in the page portion which should be subjected to the Y-direction scanning next. Then, the program returns from the step S13A to the step S11.

The step S14 reads out bit-corresponding signal segments representative of the sync data and the information data around the sync data in the page portion from the RAM 30D to get a prescribed number of read-out signals of respective X-direction bit sequences while implementing X-direction scanning from left-hand end to right-hand end.

A step S15 following the step S14 provides a re-sampling DPLL, and re-samples central one of the read-out signals of the X-direction bit sequences (the read-out signal of the X-direction bit sequence of interest) to implement X-direction frequency and phase correction thereof through the use of the re-sampling DPLL. In addition, the step S15 generate a corrective signal (the signal representing the parameter T_ratio), that is, a signal for X-direction frequency and phase correction of the other ones of the read-out signals through the use of the re-sampling DPLL. Furthermore, the step S15 re-samples the other ones of the read-out signals in response to the corrective signal to regenerate signals of the X-direction bit sequences (the neighboring X-direction bit sequences) which have undergone the X-direction frequency and phase correction. The step S15 corresponds to the re-sampling DPLL 45 and the re-sampling circuits 61(1), 61(2), ..., 61(j), 62(1), 62(2), ..., and 62(j) in FIG. 7.

A step S16 subsequent to the step S15 subjects the re-sampling-resultant signal of the X-direction bit sequence of interest to waveform equalization designed to reduce or remove X-direction inter-symbol interferences. This function of the step S16 corresponds to the feedback loop of the transversal filter 63, the temporary decision circuit 71, the subtracter 72, the inverter 73, and the multiplier and LPF section 66 in FIG. 8.

The step S16 generates pseudo cross talk signals from the re-sampling-resultant signals of the neighboring X-direction bit sequences. The step S16 subtracts the pseudo cross talk signals from the waveform-equalization-resultant signal of the X-direction bit sequence of interest to cancel cross talk signal components. This function of the step S16 corresponds to the transversal filters 64 and 65, the multiplier and LPF sections 67 and 68, the subtracters 69 and 70, the temporary decision circuit 71 and the subtracter 72 in FIG. 8.

A step S17 following the step S16 writes the resultant signal of the X-direction bit sequence of interest into the RAM 30D.

A step S17A subsequent to the step S17 decides whether or not the X-direction scanning of the whole of the page portion has been completed. When the X-direction scanning of the whole of the page portion has been completed, the program exits from the step S17A and then the current execution cycle of the program segment ends. Otherwise, the step S17A updates a variable denoting a place in the page portion which should be subjected to the X-direction scanning next. Then, the program returns from the step S17A to the step S14.

The signal processing circuit 27A may transfer the equalization-resultant and cross-talk-free signal representative of the page portion from the RAM 30D to an external device.

Third Embodiment

Figure 12:
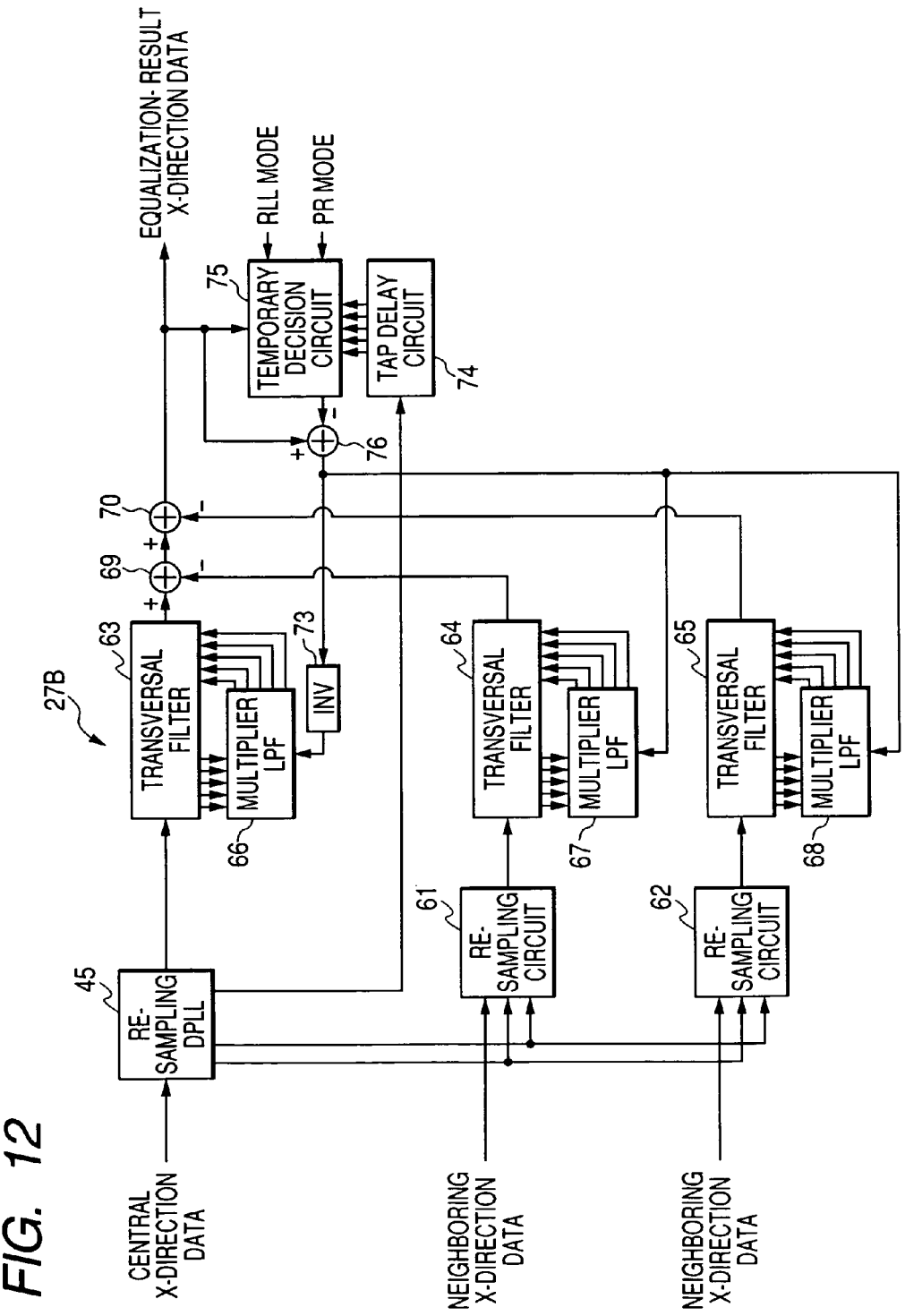
FIG. 12 is a block diagram of a portion of a signal processing circuit in a third embodiment of this invention.

A third embodiment of this invention is similar to the first embodiment (FIGS. 1-9) thereof except for design changes mentioned hereafter. FIG. 12 shows a signal processing circuit 27B in the third embodiment of this invention. The signal processing circuit 27B replaces the signal processing circuit 27 of FIG. 8.

In the signal processing circuit 27B of FIG. 12, the re-sampling DPLL 45 receives the signal of the central X-direction bit sequence of the sync data and the information data (the X-direction bit sequence of interest) which is read out from the work memory during every stroke of the X-direction scanning. The re-sampling DPLL 45 senses when the received signal crosses the zero level or the offset zero level. In other words, the re-sampling DPLL 45 senses zero-cross points concerning the received signal. The re-sampling DPLL 45 generates 0-point information which represents the sensed zero-cross points in a bit-clock-based unit. The re-sampling DPLL 45 outputs the 0-point information to a tap delay circuit 74.

The tap delay circuit 74 defers the 0-point information by a plurality of different time intervals, and thereby converts the 0-point information into different tap delayed 0-point signals. The tap delay circuit 74 outputs the tap delayed 0-point signals to a temporary decision circuit 75. The temporary decision circuit 75 replaces the temporary decision circuit 71 of FIG. 8. The temporary decision circuit 75 receives the output signal of the subtracter 70. The temporary decision circuit 75 receives a PR (partial-response) mode signal and an RLL (run-length-limited) mode signal. The PR mode signal represents a type of partial-response waveform equalization implemented by the transversal filter 63. Preferably, the type of the partial-response waveform equalization is one expressed as PR(a, b, b, a) for an integral signal system. The RLL mode signal represents a type of a run-length-limited code used for the information recorded in the recording medium 1 (see FIGS. 1 and 2). The temporary decision circuit 75 temporarily decides the state or value of the output signal from the subtracter 70 in response to the tap delayed 0-point signals from the tap delay circuit 74, the PR mode signal, and the RLL mode signal, and generates an ideal value (a target value) on the basis of the temporarily decided state or value. The temporary decision circuit 75 outputs a signal representative of the target value to a subtracter 76. The subtracter 76 replaces the subtracter 72 of FIG. 8. The device 76 subtracts the target value from the actual value represented by the output signal of the subtracter 70 to generate an error signal corresponding to the subtraction result. The subtracter 76 outputs the error signal to the inverter 73 and the multiplier and LPF sections 67 and 68.

The transversal filter 63, the temporary decision circuit 75, the subtracter 76, the inverter 73, and the multiplier and LPF section 66 constitute a feedback loop for adaptively implementing the waveform equalization on the basis of a known LMS algorithm. The transversal filter 63, the temporary decision circuit 75, the subtracter 76, the inverter 73, and the multiplier and LPF section 66, and the combination thereof are the same as those in, for example, U.S. Pat. No. 6,445,662, the disclosure of which is hereby incorporated by reference.

Figure 13:
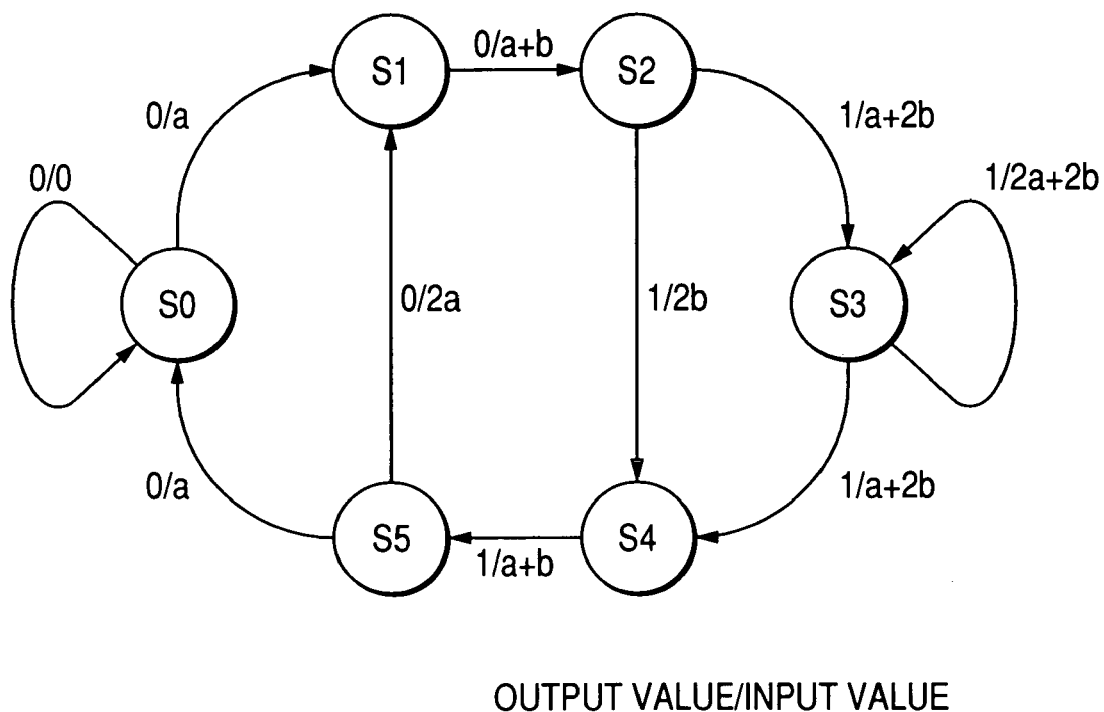
FIG. 13 is a diagram of signal state transitions regarding partial-response (PR) waveform equalization.

Partial-response (PR) characteristics will be explained below. An input signal which meets RLL (1, 7) is taken as an example. The RLL (1, 7) means run-length limiting rules such that the minimum transition interval (the minimum inversion interval) is equal to "2", and the maximum transition interval (the maximum inversion interval) is equal to "7". A consideration is made as to the case where the input signal is subjected to equalization accorded with the characteristic of PR(a, b, b, a). A waveform resulting from the PR(a, b, b, a) equalization of a continuous wave of the input signal takes one of seven different values, that is, "0", "a", "a+b", "2a", "2b", "a+2b", and "2a+2b". It is assumed that the 7-value signal of the RLL (1, 7) code is inputted to a viterbi decoder. The state of a current sample of an original signal (an input value) and the state of a current sample of a reproduced signal (an output value) resulting from PR equalization are restricted by the states of previous samples. In the input signal, two successive samples of "1" will not occur. FIG. 13 shows signal state transitions occurring in this case.

In FIG. 13, S0, S1, S2, S3, S4, and S5 denote signal states determined by immediately-preceding output values. Transitions from the state S2 is now taken as an example. When the input value is "a+2b", the output value becomes "1" and a transition to the state S3 from the state S2 occurs. When the input value is "2b", the output value becomes "1" and a transition to the state S4 from the state S2 occurs. Under normal conditions, regarding the state S2, the input value different from "a+2b" and "2b" does not occur. Thus, the input value different from "a+2b" and "2b" is an error.

The 0-point information is outputted to the tap delay circuit 74 from the re-sampling DPLL 74. The 0-point information whose value Z is "1" indicates a zero-cross point. The 0-point information value Z being "1" corresponds to the value "a+b" in FIG. 13, and occurs in the transition from the state S1 to the state S2 and the transition from the state S4 to the state S5. In FIG. 13, transitions from the right-hand states S2, S3, and S4 pass through positive values ("a+2b", "2a+2b", and "2b") when normalization is done so that a+b=0), while transitions from the left-hand states S0, S1, and S5 pass through negative values ("0", "a", and "2a" when normalization is done so that a+b=0). Therefore, a decision as to whether the zero-cross point is in a positive-going path or a negative-going path can be made by referring to a value temporally preceding or following the zero-cross point.

In the case where the interval from one zero-cross point to the next zero-cross point is known, or in the case where the number of transitions occurring for the interval from the state S2 to the state S5 or the interval from the state S5 to the state S2 is known, the path is settled and hence values to be taken at respective sample points are definite.

In FIG. 13, the values different from "a+b" do not correspond to the zero-cross point. For the values different from "a+b", the 0-point information value Z is equal to "0". Two or more zero-cross points (Z=1) will not occur in succession. In the case of RLL (1, X), at least one "0" point (Z=0 point) exists between two adjacent zero-cross points (Z=1). For example, the 0-point information value Z changes as 1→0→1 (the state changes as S1→S2→S4→S5 or S4→S5→S1→S2). In the case of RLL (2, X), at least two "0" points (Z=0 points) exist between two adjacent zero-cross points (Z=1). The above RLL (1, X) means run-length limiting rules such that the minimum inversion interval is equal to "2", and the maximum inversion interval is equal to a given value X. On the other hand, the above RLL (2, X) means run-length limiting rules such that the minimum inversion interval is equal to "3", and the maximum inversion interval is equal to a given value X. In general, the RLL mode represented by the RLL mode signal fed to the temporary decision circuit 75 can be changed between the RLL (1, X) and the RLL (2, X).

The temporary decision circuit 75 implements the temporary decision for every period of the bit clock signal. During the implementation of the temporary decision, the temporary decision circuit 75 operates as follows.

The temporary decision circuit 75 refers to five successive 0-point information values Z represented by the output signals of the tap delay circuit 74. The central-place value (the third-place value) among the five successive 0-point information values Z corresponds to a sample point of interest. The temporary decision circuit 75 decides whether the five successive 0-point information values Z are "00000", "10000", "00001", or "10001".

In the case where the five successive 0-point information values Z are "00000", "10000", "00001", or "10001", the before-equalization signal waveform is fixed in a positive side or a negative side for a long time interval centered at the sample point of interest. Thus, in this case, the temporary decision circuit 75 calculates or provides a relatively large value P1 on the basis of, for example, the values "a" and "b" defined in the PR (a, b, b, a) which is represented by the PR mode signal.

On the other hand, in the case where the five successive 0-point information values Z are none of "00000", "10000", "00001", and "10001", the temporary decision circuit 75 decides whether or not the five successive 0-point information values Z are "01010". When the five successive 0-point information values Z are "01010", the temporary decision circuit 75 decides whether or not the RLL mode signal represents the RLL (1, X). Five successive 0-point information values Z being "01010" can occur only in the case of the RLL (1, X). According to the before-equalization signal waveform which corresponds to five successive 0-point information values Z being "01010", the signal polarity changes at an early stage. Thus, when the RLL mode signal represents the RLL (1, X), the temporary decision circuit 75 sets or provides a relatively small value P2 on the basis of, for example, the values "a" and "b" defined in the PR (a, b, b, a) which is represented by the PR mode signal.

When the five successive 0-point information values Z are none of "00000", "10000", "00001", "10001", and "01010", the temporary decision circuit 75 decides whether the five successive 0-point information values Z are "01001", "10010", "00010", or "01000".

In the case where the five successive 0-point information values Z are "01010" and the RLL mode signal does not represent the RLL (1, X), and in the case where the five successive 0-point information values Z are "01001", "10010", "00010", or "01000", the before-equalization signal level remains in the same for a short time interval centered at the sample point of interest. Thus, in these cases, the temporary decision circuit 75 calculates or provides an intermediate value P3 between the foregoing values P1 and P2 on the basis of, for example, the value "b" defined in the PR (a, b, b, a) which is represented by the PR mode signal.

Usually, only one of the values P1, P2, and P3 is provided for the sample point of interest. The temporary decision circuit 75 decides whether or not the present-moment signal outputted from the subtracter 70 (that is, the present-moment equalization-resultant signal corresponding to the sample point of interest) is smaller than "0". When the present-moment equalization-resultant signal is equal to or greater than "0", the temporary decision circuit 75 sets a temporary decision value Q equal to the provided one of the values P1, P2, and P3. On the other hand, when the present-moment equalization-resultant signal is smaller than "0", the temporary decision circuit 75 inverts the polarity of the provided one of the values P1, P2, and P3 and sets the temporary decision value Q equal to the polarity-inverted one of the values P1, P2, and P3.

In the case where the five successive 0-point information values Z are none of "00000", "10000", "00001", "10001", "01010", "01001", "10010", "00010", and "01000", none of the values P1, P2, and P3 is provided for the sample point of interest. In this case, the temporary decision circuit 75 sets the temporary decision value Q equal to "0".

For the sample point of interest, the temporary decision circuit 75 uses the resultant temporary decision value Q as the target value, and outputs the signal representative of the target value to the subtracter 76.

In this way, the temporary decision circuit 75 calculates or determines the temporary decision value Q of the equalization-resultant signal on the basis of the PR mode signal, the RLL mode signal, the output signals of the tap delay circuit 74, and the equalization-resultant signal outputted from the subtracter 70. The temporary decision circuit 75 notifies the determined temporary decision value Q to the subtracter 76 as the target value. The device 76 subtracts the target value from the actual value of the equalization-resultant signal (the output signal of the subtracter 70), and generates the error signal in accordance with the subtraction result.

It should be noted that the tap delay circuit 74 may modified to output signals representative of at least three successive 0-point information values to the temporary decision circuit 75. In this case, the temporary decision circuit 75 is modified to carry out a temporary decision responsive to the at least three successive 0-point information values. The central-place value (the second-place value) among the at least three successive 0-point information values corresponds to a sample point of interest.

The PR (a, b, b, a) waveform equalization provides the following advantages. It is possible to extract the error signal from information about all sample points. The sample point level of the equalization-resultant signal converges to definite values (that is, "0", "a", "a+b", "2a", "2b", "a+2b", and "2a+2b"). For the sample point of interest, the target value is calculated or provided on the basis of one or more of the definite values. The correlation with cross talk components is taken while the difference between the target value and the actual value is used as the error signal. Therefore, accurate and quick convergence is available. Furthermore, wrong-way convergence is prevented.

A typical example of the PR(a, b, b, a) is PR(1, 2, 2, 1). It should be noted that PR(1, 1) may be used instead of the PR(1, 2, 2, 1).

Generally, the image signal generated by and outputted from the photodetector array 20 tends to be out of synchronization with the bit clock signal generated by the re-sampling DPLL 45. The signals of the neighboring X-direction bit sequences are also out of synchronization with the bit clock signal. To compensate for the above out-of-synchronization, the re-sampling circuits 61 and 62 re-sample the signals of the neighboring X-direction bit sequences in response to the interior division ratio T_ratio related to the re-sampling by the re-sampling DPLL 45 and the bit clock signal generated by the re-sampling DPLL 45.

Fourth Embodiment

Figure 14:
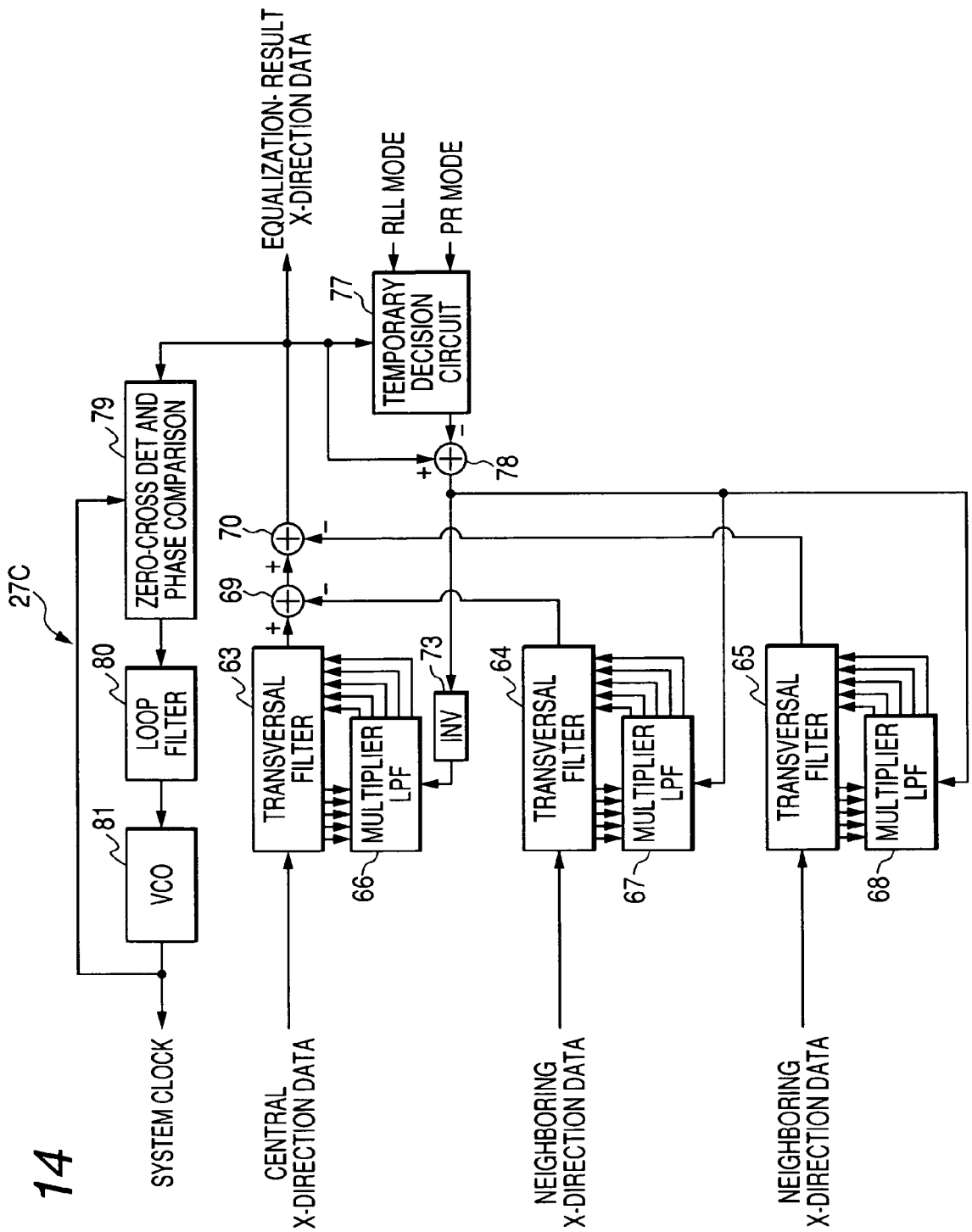
FIG. 14 is a block diagram of a portion of a signal processing circuit in a fourth embodiment of this invention.

A fourth embodiment of this invention is similar to the third embodiment (FIG. 12) thereof except for design changes mentioned hereafter. FIG. 14 shows a signal processing circuit 27C in the fourth embodiment of this invention. The signal processing circuit 27C replaces the signal processing circuit 27B of FIG. 12.

As shown in FIG. 14, the signal processing circuit 27C includes a temporary decision circuit 77 and a subtracter 78 which replace the temporary decision circuit 75 and the subtracter 76 of FIG. 12. The re-sampling DPLL 45 (FIG. 12) is omitted from the signal processing circuit 27C. Accordingly, the transversal filter 63 in the signal processing circuit 27C directly receives the signal of the central X-direction bit sequence of the sync data and the information data (the X-direction bit sequence of interest) which is read out from the work memory during every stroke of the X-direction scanning.

The signal processing circuit 27C includes a zero-cross detection and phase comparison circuit 79, a loop filter 80, and a voltage-controlled oscillator (VCO) 81 which are connected in a closed loop in that order. The circuit 79 detects every zero-cross point of the output signal of the subtracter 70. The circuit 79 compares the phase of the detected zero-cross point and the phase of a system clock signal fed from the VCO 81, and generates a phase error signal in response to the result of the phase comparison. In other words, the circuit 79 detects a phase error between the detected zero-cross point and the system clock signal. The circuit 79 outputs the phase error signal to the loop filter 80. The loop filter 80 converts the phase error signal into a control voltage.

The loop filter 80 outputs the control voltage to the VCO 81. The VCO 81 oscillates at a frequency determined by the control voltage, and thereby generates the system clock signal. The VCO outputs the system clock signal containing the bit clock signal.

The zero-cross detection and phase comparison circuit 79, the loop filter 80, and the voltage-controlled oscillator (VCO) 81 constitute a PLL designed to equalize the detected phase error to a prescribed value.

The signal processing circuit 27C is effective especially in the case where the resolution of the photodetector array 20 is great with respect to the recorded bits.

Fifth Embodiment

A fifth embodiment of this invention is similar to the third embodiment (FIG. 12) thereof except for design changes mentioned hereafter. The fifth embodiment of this invention is designed so that the type of partial-response waveform equalization implemented by the transversal filter 63 (FIG. 12) will be one expressed as PR(1, −1), PR(1, 0, −1), or PR(1, 2, −2, −1) for a differential signal system rather than PR(a, b, b, a) for an integral signal system. The fifth embodiment of this invention utilizes information of peak points and bottom points instead of the 0-point information.

According to the fifth embodiment of this invention, the temporary decision made by the temporary decision circuit 75 for the waveform equalization and the cross talk cancel is responsive to the values of at least three successive samples of the peak-point and bottom-point information, the PR mode signal, and the RLL mode signal.

Sixth Embodiment

A sixth embodiment of this invention is similar to one of the first to fifth embodiments thereof except for design changes mentioned hereafter. The sixth embodiment of this invention is designed to cancel a cross talk between neighboring pages. In the sixth embodiment of this invention, a signal of a bit sequence of interest in a page is inputted to the re-sampling DPLL 45 or the transversal filter 63 while signals of corresponding bit sequences in pages neighboring that page are inputted to the re-sampling circuits 61 and 62 or the transversal filters 64 and 65.

Seventh Embodiment

A seventh embodiment of this invention is similar to the first embodiment (FIGS. 1-9) or the second embodiment (FIG. 10) thereof except for design changes mentioned hereafter.

Figure 15:
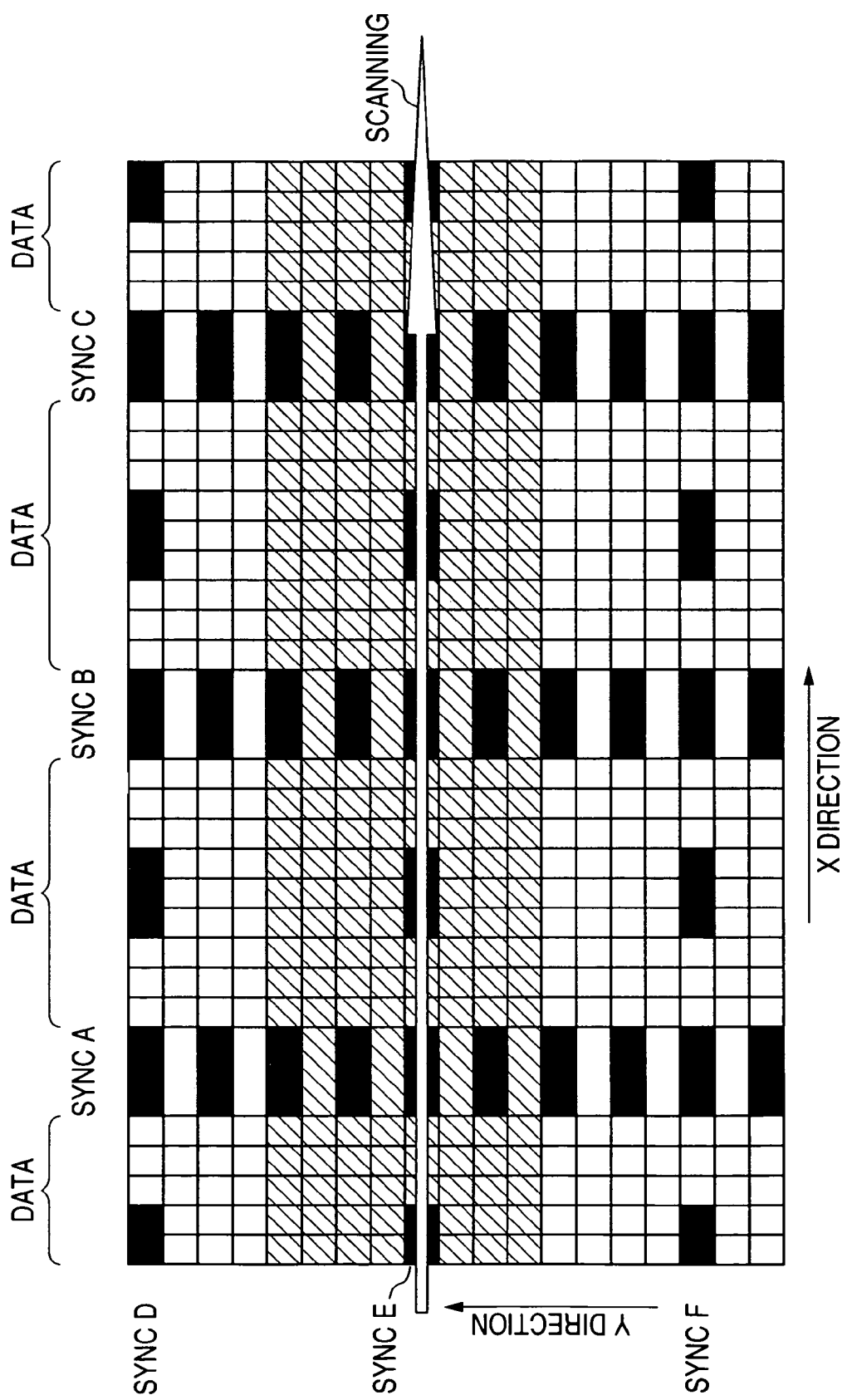
FIG. 15 is a diagram of a two-dimensional pattern of a portion of page data in a seventh embodiment of this invention.

FIG. 15 shows a portion of the page which is in a region covered by a spot of the reproduction-purpose reference light in the seventh embodiment of this invention. The page portion in FIG. 15 is similar to that in FIG. 3 except that X-direction sync zones filled with sync bits are additionally provided. Each of the X-direction sync zones has a 1-bit Y-direction width. Thus, the X-direction sync zones are also referred to as the X-direction sync rows. The X-direction sync zones are spaced in the Y direction at equal intervals corresponding to 7 bits. Each of the X-direction sync zones is divided into 3-bit segments. According to a first example, 3 bits in each of first alternate ones of the X-direction sync zone segments are "111" while 3 bits in each of second alternate ones of the X-direction sync zone segments are "000". According to a second example, 3 bits in each of the first alternate ones of the X-direction sync zone segments are "000" while 3 bits in each of the second alternate ones of the X-direction sync zone segments are is "111".

After the Y-direction signal processing inclusive of the Y-direction scanning is completed, the correction-resultant sync and information data in the page portion are prepared in the RAM 30D (FIG. 10). Then, the sync and information data are read out from the RAM 30D while the page portion is scanned along the X direction as will be explained below.

With reference to FIG. 15, the signal processing circuit 27A (FIG. 10) reads out all bit-corresponding signal segments representative of sync data and information data around the sync data in a page portion from the RAM 30D while periodically iterating X-direction scanning from left to right in the order denoted as D→E→F. Each stroke of the X-direction scanning is approximately centered at one of the X-direction sync zones (the X-direction sync rows). Each stroke of the X-direction scanning has a Y-direction width corresponding to a prescribed number of bits in the page portion. Specifically, each stroke of the X-direction scanning covers a first region having the X-direction sequence of bits in the related X-direction sync row, 4 X-direction sequences of bits in the data zones and the Y-direction sync zones above the related X-direction sync row, and 3 X-direction sequences of bits in the data zones and the Y-direction sync zones below the related X-direction sync row.

Figure 16:
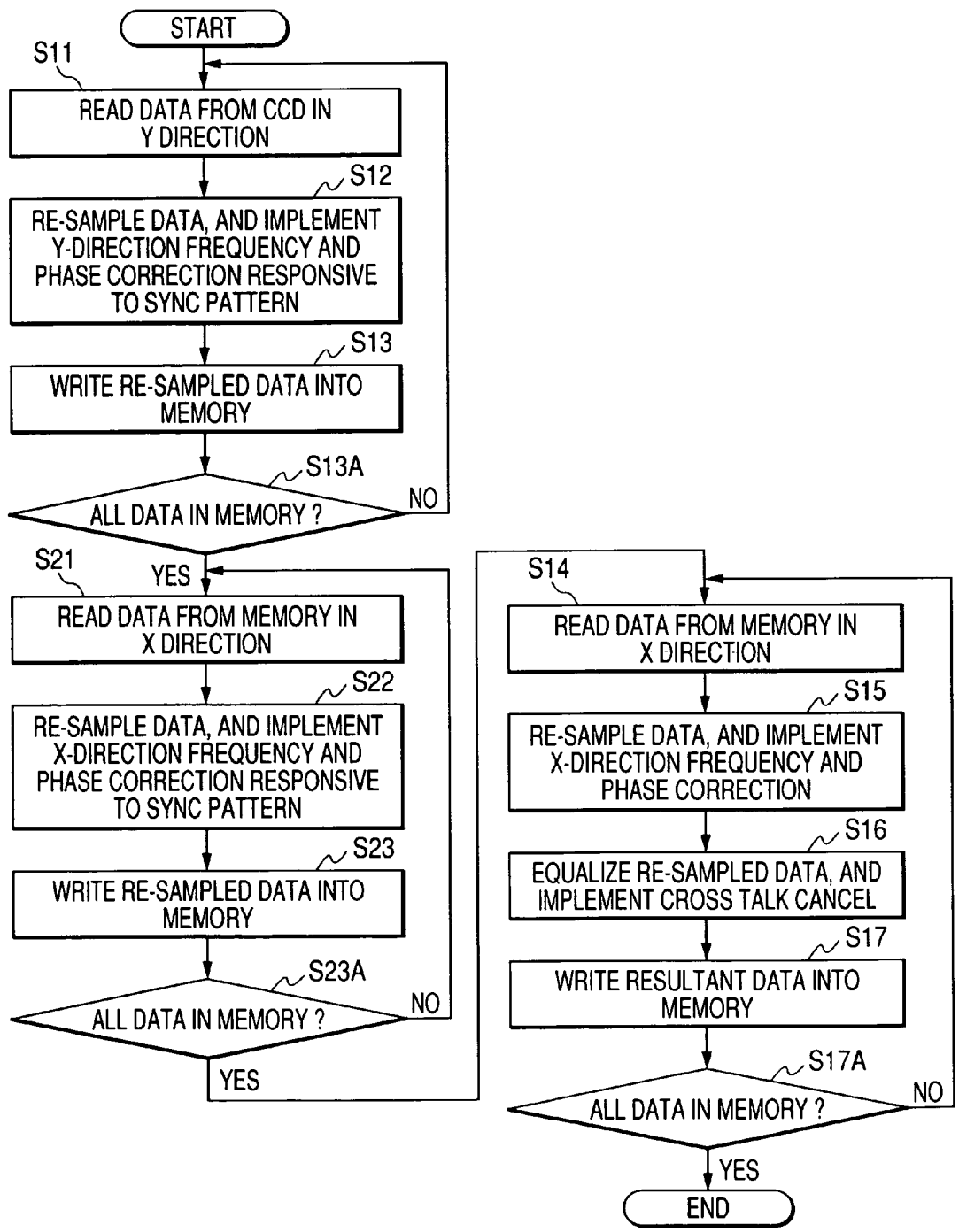
FIG. 16 is a flowchart of a segment of a control program for a signal processing circuit in the seventh embodiment of this invention.

FIG. 16 is a flowchart of a segment of the control program for the signal processing circuit 27A (FIG. 10) in the seventh embodiment of this invention. The program segment in FIG. 16 includes steps S11-S13A similar to those in FIG. 11.

With reference to FIG. 16, the step S11 of the program segment reads out bit-corresponding signal segments representative of sync data and information data around the sync data in a page portion from the photodetector array 20 (FIG. 2) while implementing Y-direction scanning from top to bottom. Preferably, the step S11 converts the read-out signal segments into digital versions before processing the resultant digital read-out signal segments in a way mentioned later.

The step S12 which follows the step S11 provides a re-sampling DPLL, and processes the digital read-out signal segments of the sync data through the use of the re-sampling DPLL to regenerate signal segments of the sync data and also generate a corrective signal, that is, a signal for Y-direction frequency and phase correction of the digital read-out signal segments of the information data around the sync data. Furthermore, the step S12 re-samples the digital read-out signal segments of the information data around the sync data in response to the corrective signal to regenerate signal segments of the information data which have undergone the Y-direction frequency and phase correction.

The step S13 which follows the step S12 writes the regenerated signal segments of the sync data and the information data into the RAM 30D (FIG. 10).

The step S13A which follows the step S13 decides whether or not the Y-direction scanning of the whole of the page portion has been completed. When the Y-direction scanning of the whole of the page portion has been completed, the program advances from the step S13A to a step S21. Otherwise, the step S13A updates a variable denoting a place in the page portion which should be subjected to the Y-direction scanning next. Then, the program returns from the step S13A to the step S11.

The step S21 reads out bit-corresponding signal segments representative of the sync data and the information data around the sync data in the page portion from the RAM 30D to get a prescribed number (for example, 8) of read-out signals of respective X-direction bit sequences while implementing X-direction scanning from left-hand end to right-hand end.

As shown in FIG. 15, the X-direction scanning implemented by the step S21 is approximately centered at an X-direction bit sequence corresponding to an X-direction sync zone in the page portion. The X-direction scanning covers 8 X-direction bit sequences in the page portion which are 4 X-direction bit sequences above the X-direction sync zone and 3 X-direction bit sequences below the X-direction sync zone.

With reference back to FIG. 16, a step S22 following the step S21 provides a re-sampling DPLL, and re-samples approximately central one of the read-out signals of the X-direction bit sequences (the read-out signal of the X-direction bit sequence of interest) to implement X-direction frequency and phase correction thereof through the use of the re-sampling DPLL. Thereby, the step S22 regenerates a signal of the X-direction bit sequence of interest which has undergone the X-direction frequency and phase correction. In addition, the step S22 generate a corrective signal, that is, a signal for X-direction frequency and phase correction of the other ones of the read-out signals through the use of the re-sampling DPLL. Furthermore, the step S22 re-samples the other ones of the read-out signals in response to the corrective signal to regenerate signals of the X-direction bit sequences (the neighboring X-direction bit sequences) which have undergone the X-direction frequency and phase correction.

The re-sampling by the step S22 corrects a rotation, a curve, and a distortion of the X-direction bit sequences represented by the read-out signals.

A step S23 subsequent to the step S22 writes the regenerated signals of the sync and information data into the RAM 30D (FIG. 10).

A step S23A following the step S23 decides whether or not the X-direction scanning of the whole of the page portion has been completed. When the X-direction scanning of the whole of the page portion has been completed, the program advances from the step S23A to a step S14. Otherwise, the step S23A updates a variable denoting a place in the page portion which should be subjected to the X-direction scanning next. Then, the program returns from the step S23A to the step S21.

The step S14, and steps S15-S17A subsequent to the step S14 are similar to those in FIG. 11.

A combination of the steps S11-S13A and the steps S21-S23A removes not only signal distortions in the Y direction but also signal distortions in the X direction. Thus, a combination of the steps S14-S17A processes distortion-free information data. Therefore, the waveform equalization and the cross talk cancel implemented by the combination of the steps S14-S17A are more effective.

With reference to FIG. 15, the X-direction-extending sync zones are spaced at equal intervals and form repetitions of a same pattern at a fixed inversion interval (specifically, repetitions of 3T where "T" denotes a bit period). Accordingly, a reproduced signal of the X-direction sync row takes a continuous waveform which enables a related PLL to be stably locked.

Eighth Embodiment

An eighth embodiment of this invention is similar to the seventh embodiment thereof except for design changes mentioned hereafter.

Figure 17:
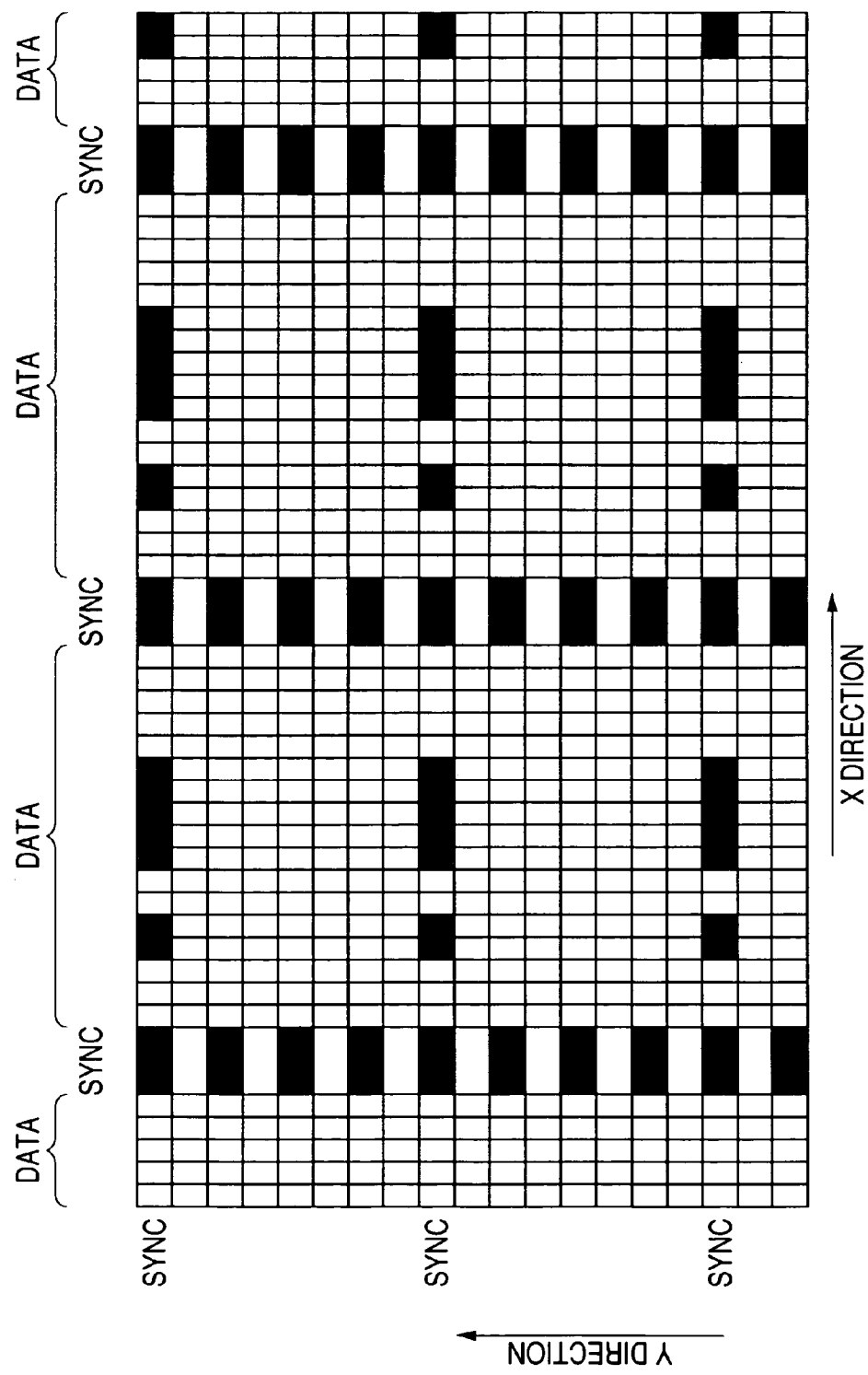
FIG. 17 is a diagram of a two-dimensional pattern of a portion of page data in an eighth embodiment of this invention.

According to the eighth embodiment of this invention, sync bits in each X-direction sync zone (or each Y-direction sync column) in a page have repetitions of a same sub pattern, and the value of the integration of the sub pattern is equal to "0". An example of the sub pattern is shown in FIG. 17. The sub pattern in FIG. 17 is expressed as 3T·3T·2T·2T·5T·5T.

In the eighth embodiment of this invention, a DC variation in a reproduced signal is relatively small. Therefore, a PLL is stably locked to the reproduced signal. In the case where PRML (partial-response maximum-likelihood is utilized, a relatively great number of samples corresponding to target values are obtained. Thus, regarding the adaptive waveform equalization and the cross talk cancel, correct convergence is available.

Figure 18:
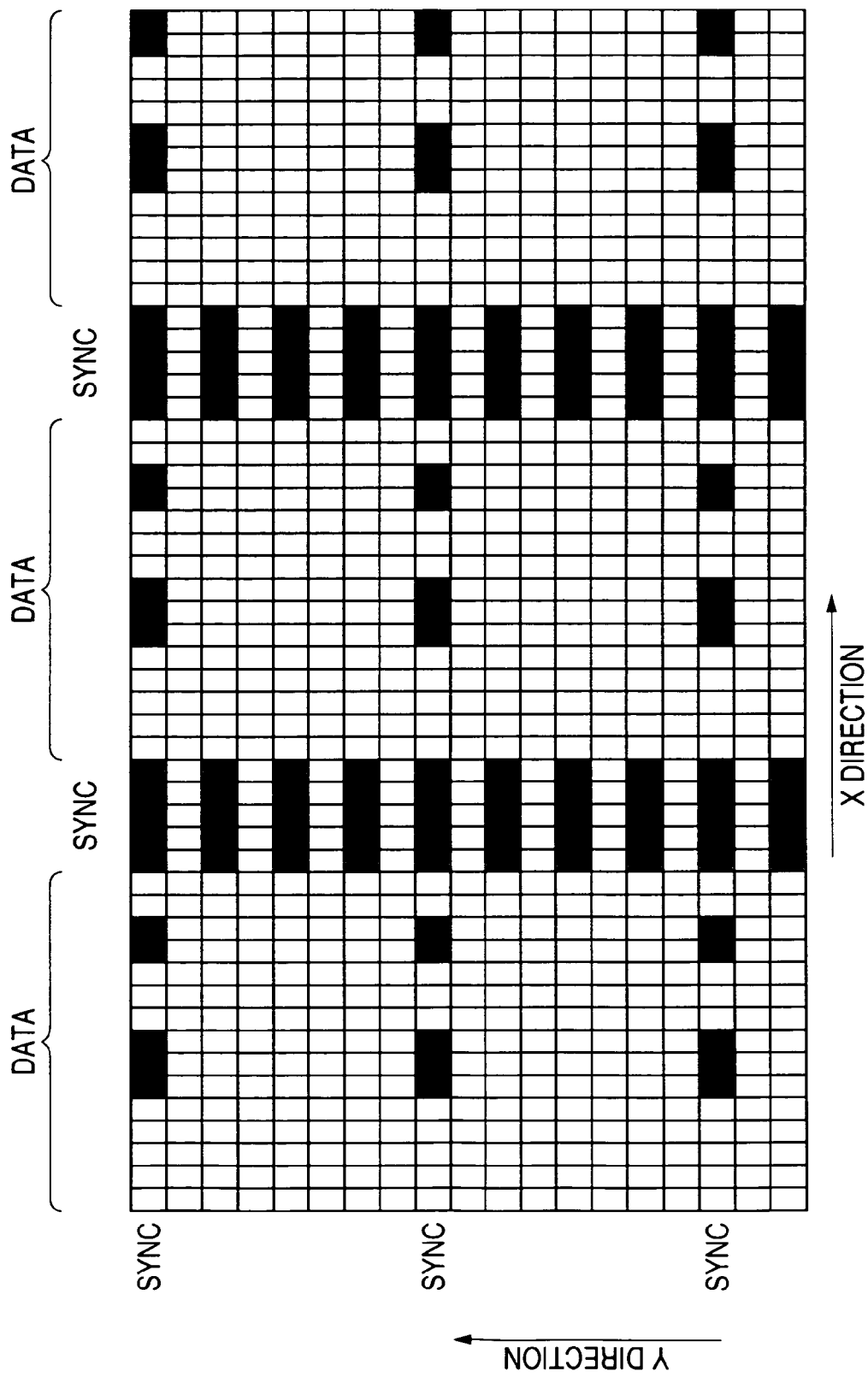
FIG. 18 is a diagram of another two-dimensional pattern of a portion of page data in the eighth embodiment of this invention.

FIG. 18 shows another example of the sub pattern. In FIG. 18, each X-direction sync zone has repetitions of a same sub pattern as 3T·3T·2T·2T·5T·5T, and each Y-direction sync zone has an X-direction width of 5 bits corresponding to a maximum inversion interval, that is, 5T. Regarding a page portion having the arrangement of FIG. 18, the sync zones can be easily searched for by detecting that the inversion interval becomes the maximum.

Ninth Embodiment

A ninth embodiment of this invention is similar to one of the first to eighth embodiments thereof except for design changes mentioned hereafter.

Figure 19:
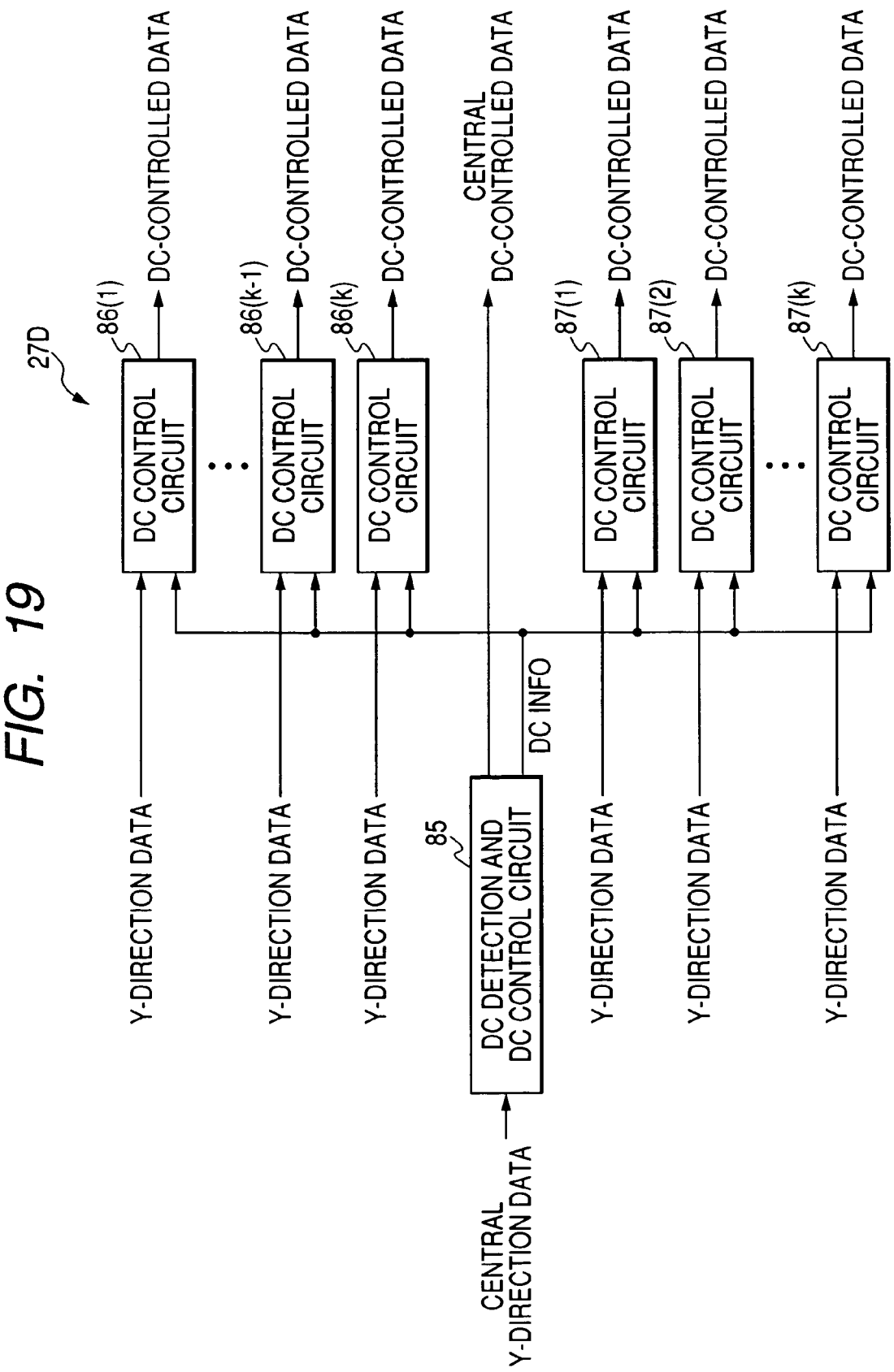
FIG. 19 is a block diagram of a portion of a signal processing circuit in a ninth embodiment of this invention.

FIG. 19 shows a portion of a signal processing circuit 27D in the ninth embodiment of this invention. The signal processing circuit 27D replaces the signal processing circuit 27 of FIG. 1, the signal processing circuit 27A of FIG. 10, the signal processing circuit 27B of FIG. 12, or the signal processing circuit 27C of FIG. 14.

As shown in FIG. 19, the signal processing circuit 27D includes a DC-detection and DC-control circuit 85, a group of DC control circuits 86(1), 86(2), . . . , and 86(k), and a group of DC control circuits 87(1), 87(2), . . . , and 87(k).

The DC-detection and DC-control circuit 85 receives a read-out signal of the central Y-direction sequence of bits in each sync zone from the photodetector array 20 (FIG. 2) as an input digital signal. The DC-detection and DC-control circuit 85 detects a DC component of the input digital signal (the read-out signal of the sync data). The DC-detection and DC-control circuit 85 subjects the read-out signal of the sync data to DC control designed to make the detected DC component constant. The DC-detection and DC-control circuit 85 outputs the DC-controlled signal of the sync data to, for example, the re-sampling DPLL 40 of FIG. 5. The DC-detection and DC-control circuit 85 generates information of the DC control, and outputs the generated DC control information to the DC control circuits 86(1), 86(2), . . . , 86(k), 87(1), 87(2), . . . , and 87(k).

Read-out signals of the Y-direction bit sequences in the previously-mentioned first region (for example, the region SD1 in FIG. 4) are inputted from the photodetector array 20 to the DC control circuits 86(1), 86(2), . . . , and 86(k), respectively. Read-out signals of the Y-direction bit sequences in the previously-mentioned second region (for example, the region SD2 in FIG. 4) are inputted from the photodetector array 20 to the DC control circuits 87(1), 87(2), . . . , and 87(k), respectively.

The DC control circuits 86(1), 86(2), . . . , 86(k), 87(1), 87(2), . . . , and 87(k) subject the respective inputted signals of the Y-direction bit sequences to DC control responsive to the DC control information. The DC control circuits 86(1), 86(2), . . . , 86(k), 87(1), 87(2), . . . , and 87(k) output the DC-controlled signals to, for example, the re-sampling circuits 51(1), 51(2), . . . , 51(k), 52(1), 52(2), . . . , and 52(k) of FIG. 5, respectively.

Tenth Embodiment

A tenth embodiment of this invention is similar to one of the first to eighth embodiments thereof except for design changes mentioned hereafter.

Figure 20:
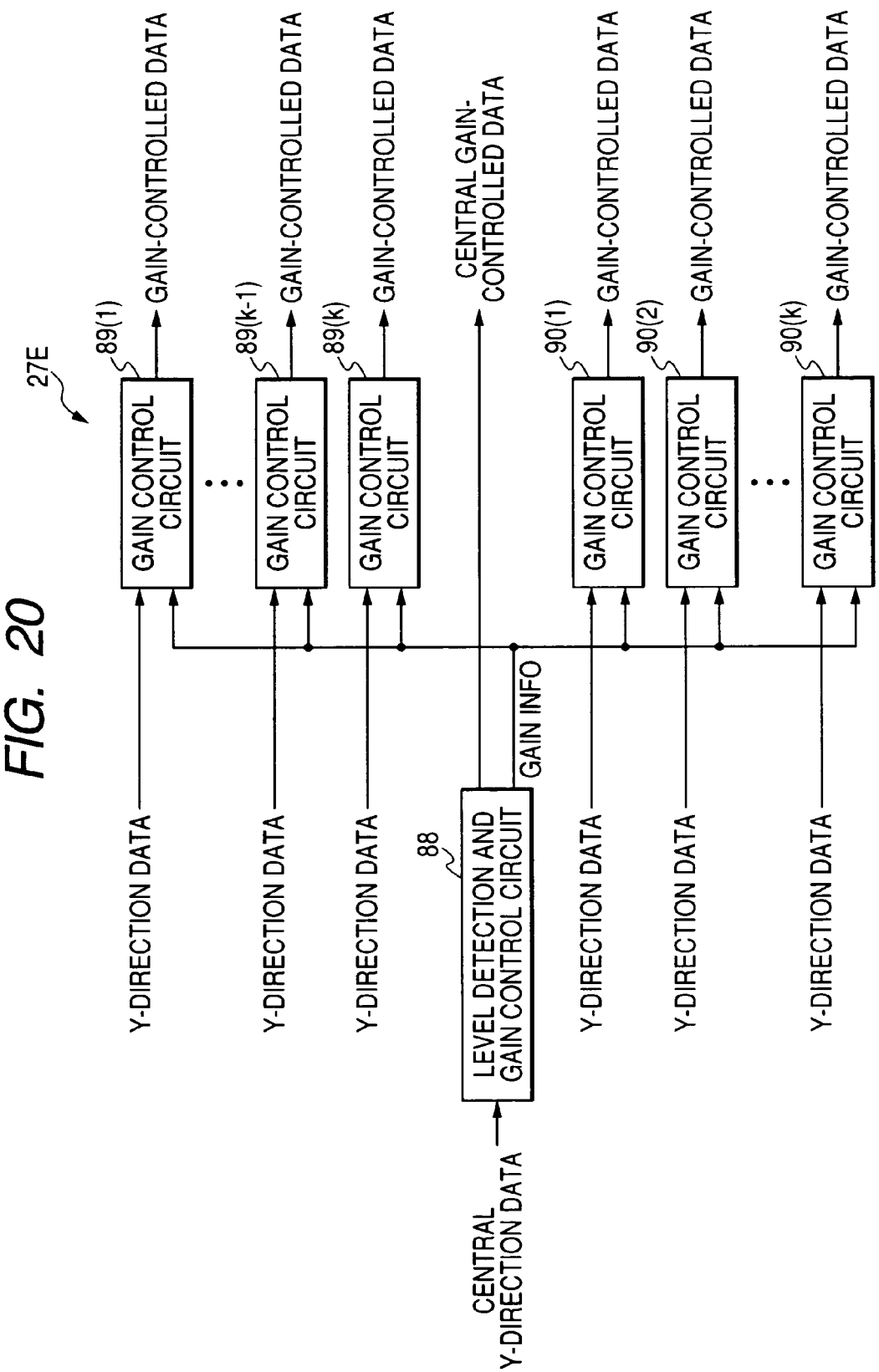
FIG. 20 is a block diagram of a portion of a signal processing circuit in a tenth embodiment of this invention.

FIG. 20 shows a portion of a signal processing circuit 27E in the tenth embodiment of this invention. The signal processing circuit 27E replaces the signal processing circuit 27 of FIG. 1, the signal processing circuit 27A of FIG. 10, the signal processing circuit 27B of FIG. 12, or the signal processing circuit 27C of FIG. 14.

As shown in FIG. 20, the signal processing circuit 27E includes a level-detection and gain-control circuit 88, a group of gain control circuits 89(1), 89(2), . . . , and 89(k), and a group of gain control circuits 90(1), 90(2), . . . , and 90(k).

The level-detection and gain-control circuit 88 receives a read-out signal of the central Y-direction sequence of bits in each sync zone from the photodetector array 20 (FIG. 2) as an input digital signal. The level-detection and gain-control circuit 88 detects a level represented by the input digital signal (the read-out signal of the sync data). The level-detection and gain-control circuit 88 subjects the read-out signal of the sync data to gain control designed to make the detected level constant. The level-detection and gain-control circuit 88 outputs the gain-controlled signal of the sync data to, for example, the re-sampling DPLL 40 of FIG. 5. The level-detection and gain-control circuit 88 generates information of the gain control, and outputs the generated gain control information to the gain control circuits 89(1), 89(2), . . . , 89(k), 90(1), 90(2), . . . , and 90(k).

Read-out signals of the Y-direction bit sequences in the previously-mentioned first region (for example, the region SD1 in FIG. 4) are inputted from the photodetector array 20 to the gain control circuits 89(1), 89(2), . . . , and 89(k), respectively. Read-out signals of the Y-direction bit sequences in the previously-mentioned second region (for example, the region SD2 in FIG. 4) are inputted from the photodetector array 20 to the gain control circuits 90(1), 90(2), . . . , and 90(k), respectively.

The gain control circuits 89(1), 89(2), . . . , 89(k), 90(1), 90(2), . . . , and 90(k) subject the respective inputted signals of the Y-direction bit sequences to gain control responsive to the gain control information. The gain control circuits 89(1), 89(2), . . . , 89(k), 90(1), 90(2), . . . , and 90(k) output the gain-controlled signals to, for example, the re-sampling circuits 51(1), 51(2), . . . , 51(k), 52(1), 52(2), . . . , and 52(k) of FIG. 5, respectively.

Eleventh Embodiment

An eleventh embodiment of this invention is similar to one of the first to tenth embodiments thereof except for design changes mentioned hereafter.

Figure 21:
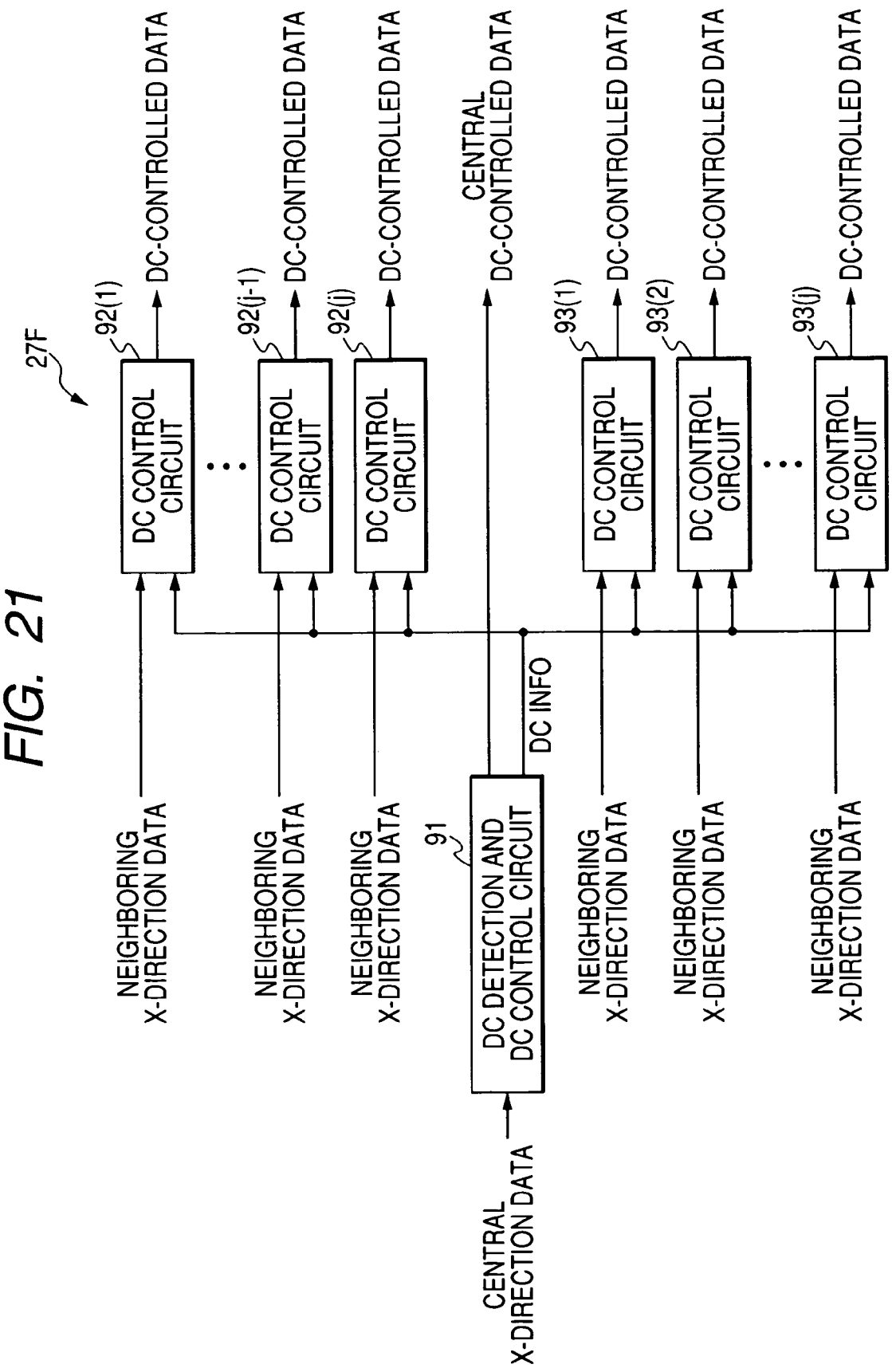
FIG. 21 is a block diagram of a portion of a signal processing circuit in an eleventh embodiment of this invention.

FIG. 21 shows a portion of a signal processing circuit 27F in the eleventh embodiment of this invention. The signal processing circuit 27F replaces one of the signal processing circuits 27, 27A, 27B, 27C, 27D, and 27E.

As shown in FIG. 21, the signal processing circuit 27F includes a DC-detection and DC-control circuit 91, a group of DC control circuits 92(1), 92(2), . . . , and 92(j), and a group of DC control circuits 93(1), 93(2), . . . , and 93(j).

The DC-detection and DC-control circuit 91 receives the signal of the central X-direction bit sequence of the sync data and the information data (the X-direction bit sequence of interest) which is read out from the work memory during every stroke of the X-direction scanning. The DC-detection and DC-control circuit 91 detects a DC component of the read-out signal of the X-direction bit sequence of interest. The DC-detection and DC-control circuit 91 subjects the read-out signal of the X-direction bit sequence of interest to DC control designed to make the detected DC component constant. The DC-detection and DC-control circuit 91 outputs the DC-controlled signal of the X-direction bit sequence of interest to, for example, the re-sampling DPLL 45 of FIG. 7. The DC-detection and DC-control circuit 91 generates information of the DC control, and outputs the generated DC control information to the DC control circuits 92(1), 92(2), . . . , 92(j), 93(1), 93(2), . . . , and 93(j).

The signals of the neighboring X-direction bit sequences of the sync data and the information data, which are read out from the work memory during every stroke of the X-direction scanning and which are positionally above the signal of the X-direction bit sequence of interest, are inputted to the DC control circuits 92(1), 92(2), . . . , and 92(j), respectively. The signals of the neighboring X-direction bit sequences of the sync data and the information data, which are read out from the work memory during every stroke of the X-direction scanning and which are positionally below the signal of the X-direction bit sequence of interest, are inputted to the DC control circuits 93(1), 93(2), . . . , and 93(j), respectively.

The DC control circuits 92(1), 92(2), . . . , 92(j), 93(1), 93(2), . . . , and 93( ) subject the respective inputted signals of the neighboring X-direction bit sequences to DC control responsive to the DC control information. The DC control circuits 92(1), 92(2), . . . , 92(j), 93(1), 93(2), . . . , and 93(j) output the DC-controlled signals to, for example, the re-sampling circuits 61(1), 61(2), . . . , 61(j), 62(1), 62(2), . . . , and 62(j) of FIG. 7, respectively.

Twelfth Embodiment

A twelfth embodiment of this invention is similar to one of the first to tenth embodiments thereof except for design changes mentioned hereafter.

Figure 22:
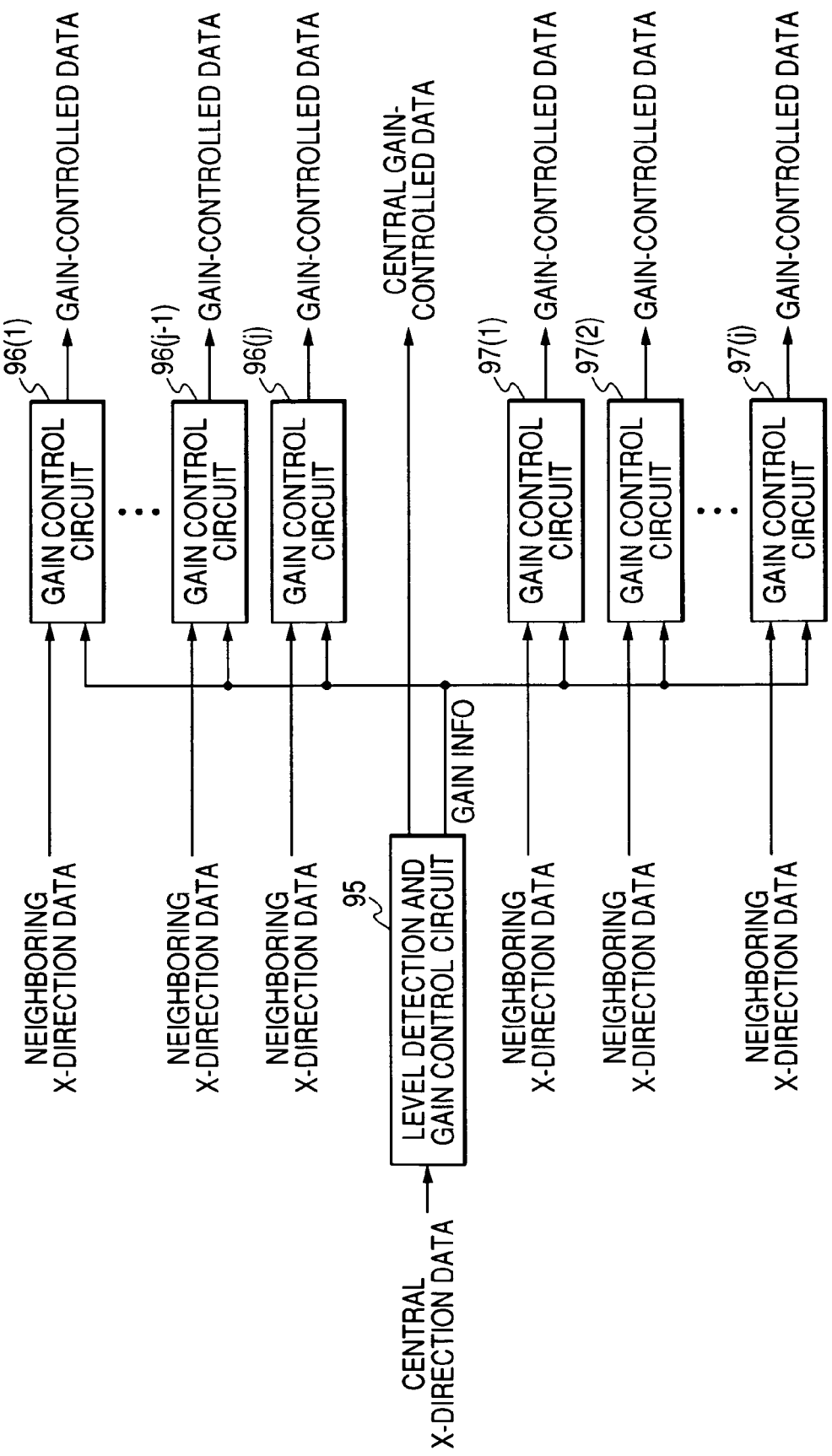
FIG. 22 is a block diagram of a portion of a signal processing circuit in a twelfth embodiment of this invention.

FIG. 22 shows a portion of a signal processing circuit 27G in the twelfth embodiment of this invention. The signal processing circuit 27G replaces one of the signal processing circuits 27, 27A, 27B, 27C, 27D, 27E, and 27F.

As shown in FIG. 22, the signal processing circuit 27G includes a level-detection and gain-control circuit 95, a group of gain control circuits 96(1), 96(2), . . . , and 96(j), and a group of gain control circuits 97(1), 97(2), . . . , and 97(j).

The level-detection and gain-control circuit 95 receives the signal of the central X-direction bit sequence of the sync data and the information data (the X-direction bit sequence of interest) which is read out from the work memory during every stroke of the X-direction scanning. The level-detection and gain-control circuit 95 detects a level represented by the read-out signal of the X-direction bit sequence of interest. The level-detection and gain-control circuit 95 subjects the read-out signal of the X-direction bit sequence of interest to gain control designed to make the detected level constant. The level-detection and gain-control circuit 95 outputs the level-controlled signal of the X-direction bit sequence of interest to, for example, the re-sampling DPLL 45 of FIG. 7. The level-detection and gain-control circuit 95 generates information of the gain control, and outputs the generated gain control information to the gain control circuits 96(1), 96(2), . . . , 96(j), 97(1), 97(2), . . . , and 97(j).

The signals of the neighboring X-direction bit sequences of the sync data and the information data, which are read out from the work memory during every stroke of the X-direction scanning and which are positionally above the signal of the X-direction bit sequence of interest, are inputted to the gain control circuits 96(1), 96(2), . . . , and 96(j), respectively. The signals of the neighboring X-direction bit sequences of the sync data and the information data, which are read out from the work memory during every stroke of the X-direction scanning and which are positionally below the signal of the X-direction bit sequence of interest, are inputted to the gain control circuits 97(1), 97(2), . . . , and 97(j), respectively.

The gain control circuits 96(1), 96(2), . . . , 96(j), 97(1), 97(2), . . . , and 97(j) subject the respective inputted signals of the neighboring X-direction bit sequences to gain control responsive to the gain control information. The gain control circuits 96(1), 96(2), . . . , 96(j), 97(1), 97(2), . . . , and 97(j) output the gain-controlled signals to, for example, the re-sampling circuits 61(1), 61(2), . . . , 61(j), 62(1), 62(2), . . . , and 62(j) of FIG. 7, respectively.

Thirteenth Embodiment

Figure 23:
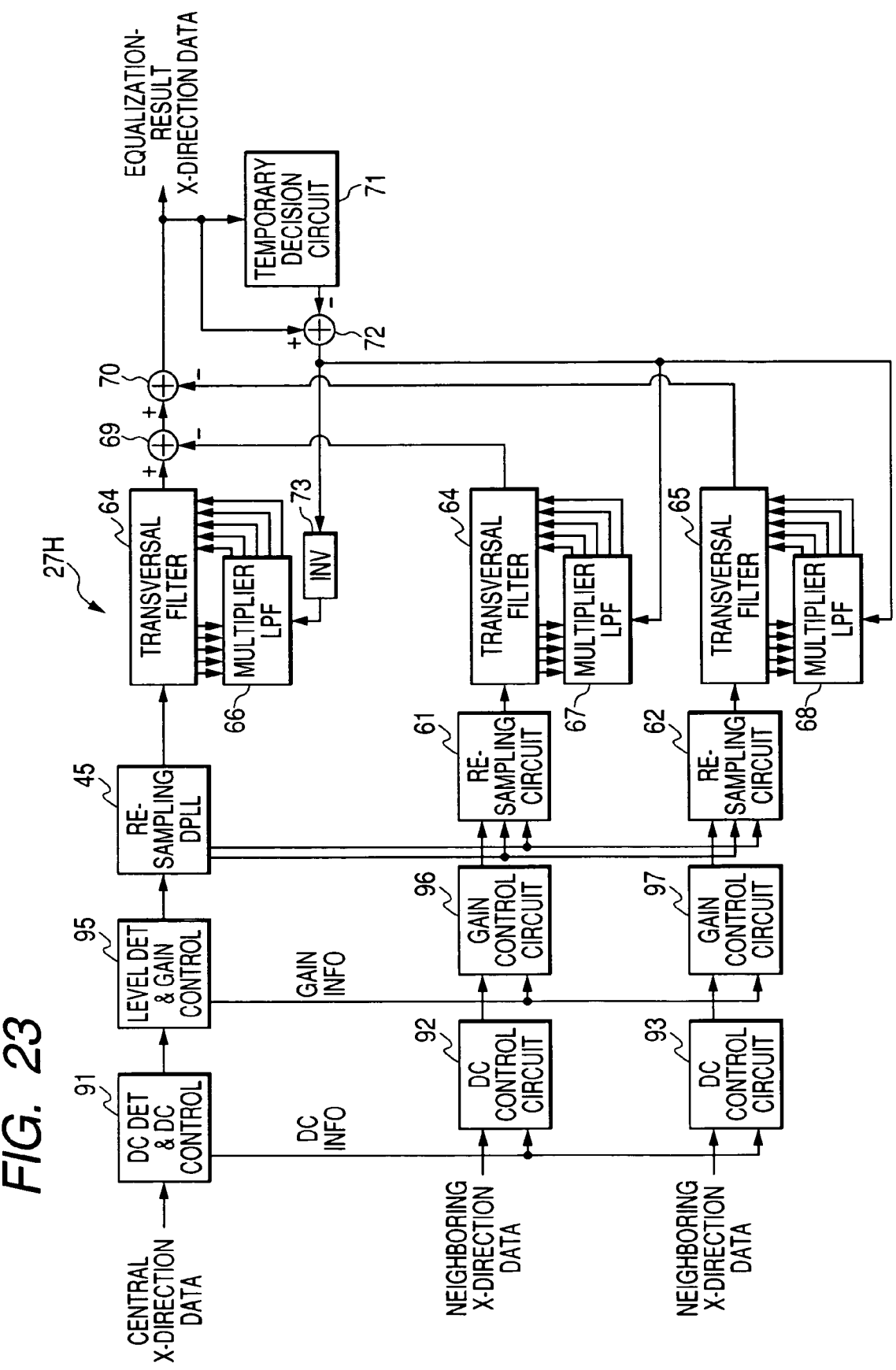
FIG. 23 is a block diagram of a portion of a signal processing circuit in a thirteenth embodiment of this invention.

A thirteenth embodiment of this invention is similar to the first embodiment (FIGS. 1-9) thereof except for design changes mentioned hereafter. FIG. 23 shows a portion of a signal processing circuit 27H in the thirteenth embodiment of this invention. The signal processing circuit 27H replaces the signal processing circuit 27 of FIG. 8. The signal processing circuit 27H is a modification of the signal processing circuit 27.

As shown in FIG. 23, the signal processing circuit 27H additionally includes a DC-detection and DC-control circuit 91, DC control circuits 92 and 93, a level-detection and gain-control circuit 95, and gain control circuits 96 and 97.

The DC-detection and DC-control circuit 91 receives the signal of the central X-direction bit sequence of the sync data and the information data (the X-direction bit sequence of interest) which is read out from the work memory during every stroke of the X-direction scanning. The DC-detection and DC-control circuit 91 detects a DC component of the read-out signal of the X-direction bit sequence of interest. The DC-detection and DC-control circuit 91 subjects the read-out signal of the X-direction bit sequence of interest to DC control designed to make the detected DC component constant. The DC-detection and DC-control circuit 91 outputs the DC-controlled signal of the X-direction bit sequence of interest to the level-detection and gain-control circuit 95. The DC-detection and DC-control circuit 91 generates information of the DC control, and outputs the generated DC control information to the DC control circuits 92 and 93.

The signals of the neighboring X-direction bit sequences of the sync data and the information data, which are read out from the work memory during every stroke of the X-direction scanning and which are positionally above and below the signal of the X-direction bit sequence of interest, are inputted to the DC control circuits 92 and 93, respectively.

The DC control circuits 92 and 93 subject the respective inputted signals of the neighboring X-direction bit sequences to DC control responsive to the DC control information. The DC control circuits 92 and 93 output the DC-controlled signals of the neighboring X-direction bit sequences to the gain control circuits 96 and 97, respectively.

The level-detection and gain-control circuit 95 detects a level represented by the DC-controlled signal of the X-direction bit sequence of interest. The level-detection and gain-control circuit 95 subjects the DC-controlled signal of the X-direction bit sequence of interest to gain control designed to make the detected level constant. The level-detection and gain-control circuit 95 outputs the level-controlled signal of the X-direction bit sequence of interest to the re-sampling DPLL 45. The level-detection and gain-control circuit 95 generates information of the gain control, and outputs the generated gain control information to the gain control circuits 96 and 97.

The gain control circuits 96 and 97 subject the DC-controlled signals of the neighboring X-direction bit sequences to gain control responsive to the gain control information. The gain control circuits 96 and 97 output the gain-controlled signals of the neighboring X-direction bit sequences to the re-sampling circuits 61 and 62, respectively.

Fourteenth Embodiment

Figure 24:
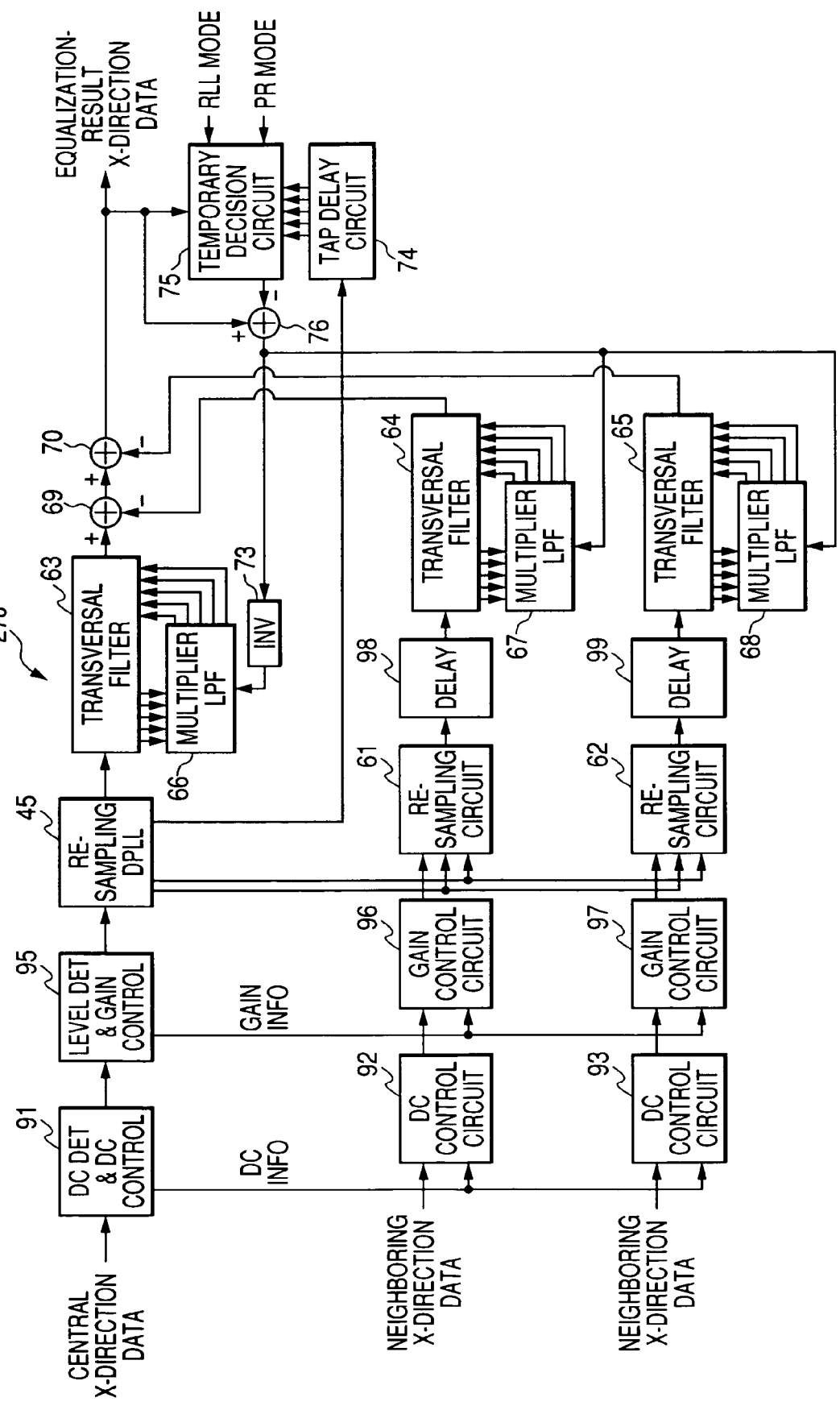
FIG. 24 is a block diagram of a portion of a signal processing circuit in a fourteenth embodiment of this invention.

A fourteenth embodiment of this invention is similar to the third embodiment (FIG. 12) thereof except for design changes mentioned hereafter. FIG. 24 shows a portion of a signal processing circuit 27J in the fourteenth embodiment of this invention. The signal processing circuit 27J replaces the signal processing circuit 27B of FIG. 12. The signal processing circuit 27J is a modification of the signal processing circuit 27B.

As shown in FIG. 24, the signal processing circuit 27J additionally includes a DC-detection and DC-control circuit 91, DC control circuits 92 and 93, a level-detection and gain-control circuit 95, gain control circuits 96 and 97, and delay circuits 98 and 99.

The DC-detection and DC-control circuit 91 receives the signal of the central X-direction bit sequence of the sync data and the information data (the X-direction bit sequence of interest) which is read out from the work memory during every stroke of the X-direction scanning. The DC-detection and DC-control circuit 91 detects a DC component of the read-out signal of the X-direction bit sequence of interest. The DC-detection and DC-control circuit 91 subjects the read-out signal of the X-direction bit sequence of interest to DC control designed to make the detected DC component constant. The DC-detection and DC-control circuit 91 outputs the DC-controlled signal of the X-direction bit sequence of interest to the level-detection and gain-control circuit 95. The DC-detection and DC-control circuit 91 generates information of the DC control, and outputs the generated DC control information to the DC control circuits 92 and 93.

The signals of the neighboring X-direction bit sequences of the sync data and the information data, which are read out from the work memory during every stroke of the X-direction scanning and which are positionally above and below the signal of the X-direction bit sequence of interest, are inputted to the DC control circuits 92 and 93, respectively.

The DC control circuits 92 and 93 subject the respective inputted signals of the neighboring X-direction bit sequences to DC control responsive to the DC control information. The DC control circuits 92 and 93 output the DC-controlled signals of the neighboring X-direction bit sequences to the gain control circuits 96 and 97, respectively.

The level-detection and gain-control circuit 95 detects a level represented by the DC-controlled signal of the X-direction bit sequence of interest. The level-detection and gain-control circuit 95 subjects the DC-controlled signal of the X-direction bit sequence of interest to gain control designed to make the detected level constant. The level-detection and gain-control circuit 95 outputs the level-controlled signal of the X-direction bit sequence of interest to the re-sampling DPLL 45. The level-detection and gain-control circuit 95 generates information of the gain control, and outputs the generated gain control information to the gain control circuits 96 and 97.

The gain control circuits 96 and 97 subject the DC-controlled signals of the neighboring X-direction bit sequences to gain control responsive to the gain control information. The gain control circuits 96 and 97 output the gain-controlled signals of the neighboring X-direction bit sequences to the re-sampling circuits 61 and 62, respectively.

The delay circuit 98 is connected between the re-sampling circuit 61 and the transversal filter 64. The delay circuit 99 is connected between the re-sampling circuit 62 and the transversal filter 65. The delay circuits 98 and 99 defer the re-sampling-resultant signals of the neighboring X-direction bit sequences transmitted from the re-sampling circuits 61 and 62 to the transversal filters 64 and 65, respectively. The delay circuits 98 and 99 are designed to provide phase matching or timing matching among the signals applied to the transversal filters 63, 64, and 65.

Fifteenth Embodiment

Figure 25:
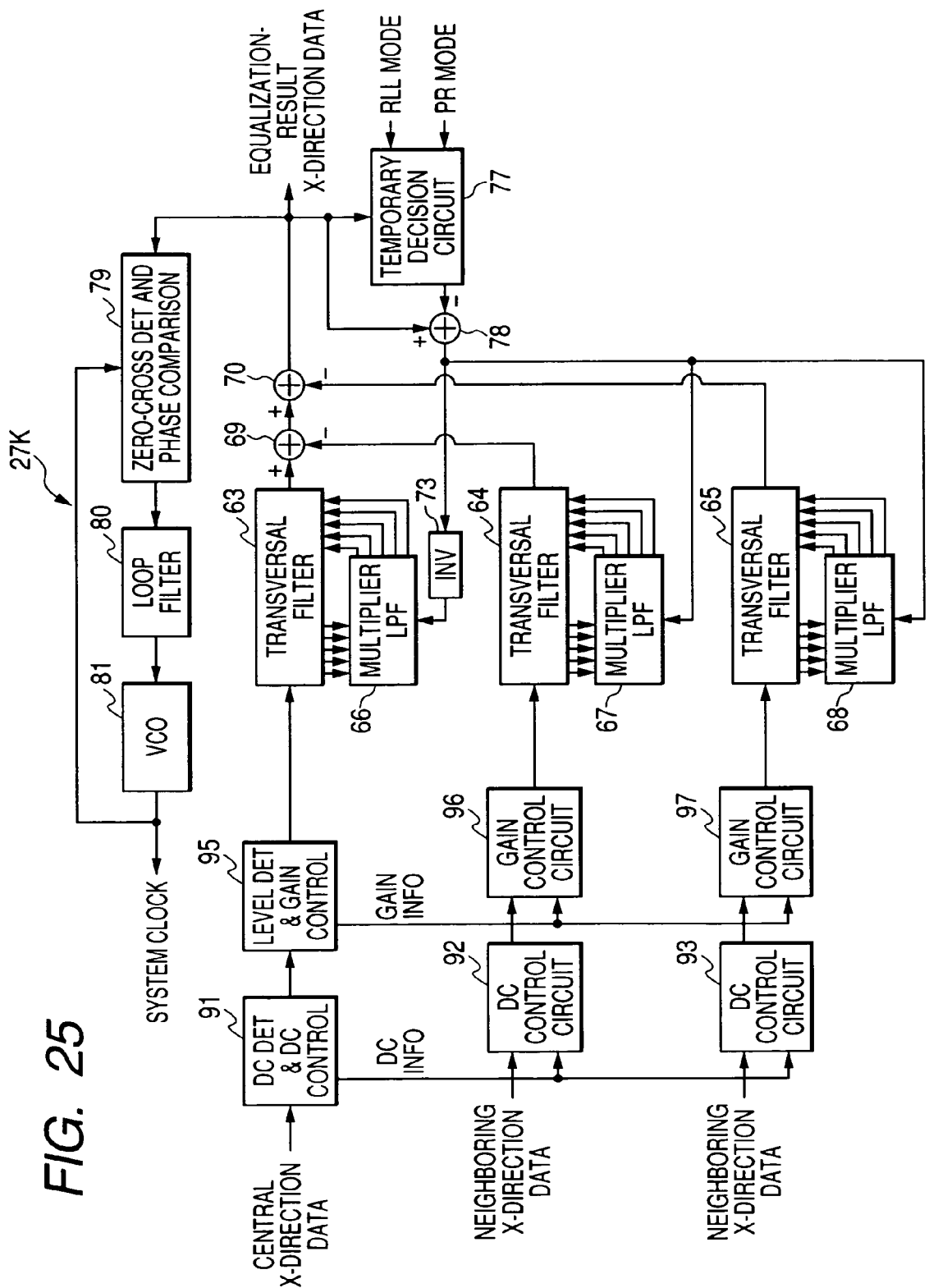
FIG. 25 is a block diagram of a portion of a signal processing circuit in a fifteenth embodiment of this invention.

A fifteenth embodiment of this invention is similar to the fourth embodiment (FIG. 14) thereof except for design changes mentioned hereafter. FIG. 25 shows a portion of a signal processing circuit 27K in the fifteenth embodiment of this invention. The signal processing circuit 27K replaces the signal processing circuit 27C of FIG. 14. The signal processing circuit 27K is a modification of the signal processing circuit 27C.

As shown in FIG. 25, the signal processing circuit 27K additionally includes a DC-detection and DC-control circuit 91, DC control circuits 92 and 93, a level-detection and gain-control circuit 95, and gain control circuits 96 and 97.

The DC-detection and DC-control circuit 91 receives the signal of the central X-direction bit sequence of the sync data and the information data (the X-direction bit sequence of interest) which is read out from the work memory during every stroke of the X-direction scanning. The DC-detection and DC-control circuit 91 detects a DC component of the read-out signal of the X-direction bit sequence of interest. The DC-detection and DC-control circuit 91 subjects the read-out signal of the X-direction bit sequence of interest to DC control designed to make the detected DC component constant. The DC-detection and DC-control circuit 91 outputs the DC-controlled signal of the X-direction bit sequence of interest to the level-detection and gain-control circuit 95. The DC-detection and DC-control circuit 91 generates information of the DC control, and outputs the generated DC control information to the DC control circuits 92 and 93.

The signals of the neighboring X-direction bit sequences of the sync data and the information data, which are read out from the work memory during every stroke of the X-direction scanning and which are positionally above and below the signal of the X-direction bit sequence of interest, are inputted to the DC control circuits 92 and 93, respectively.

The DC control circuits 92 and 93 subject the respective inputted signals of the neighboring X-direction bit sequences to DC control responsive to the DC control information. The DC control circuits 92 and 93 output the DC-controlled signals of the neighboring X-direction bit sequences to the gain control circuits 96 and 97, respectively.

The level-detection and gain-control circuit 95 detects a level represented by the DC-controlled signal of the X-direction bit sequence of interest. The level-detection and gain-control circuit 95 subjects the DC-controlled signal of the X-direction bit sequence of interest to gain control designed to make the detected level constant. The level-detection and gain-control circuit 95 outputs the level-controlled signal of the X-direction bit sequence of interest to the transversal filter 63. The level-detection and gain-control circuit 95 generates information of the gain control, and outputs the generated gain control information to the gain control circuits 96 and 97.

The gain control circuits 96 and 97 subject the DC-controlled signals of the neighboring X-direction bit sequences to gain control responsive to the gain control information. The gain control circuits 96 and 97 output the gain-controlled signals of the neighboring X-direction bit sequences to the transversal filters 64 and 65, respectively.

Sixteenth Embodiment

A sixteenth embodiment of this invention is similar to one of the first to fifteenth embodiments thereof except for design changes mentioned hereafter. The sixteenth embodiment of this invention is designed to cancel a cross talk between pages. According to the sixteenth embodiment of this invention, sync zones in a page overlap sync zones in previous and following pages. This design suppresses the adverse effect of an inter-page cross talk.

The sixth embodiment of this invention utilizes a combination of partial-response waveform equalization and viterbi decoding (PRML) to attain a reduced error rate. Regarding the viterbi decoding, target values are set. Preferably, the target values are varied in accordance with conditions of the equalization-resultant signal, for example, the integrals of the values of equalization-resultant samples corresponding to the target values.

Seventeenth Embodiment

A seventeenth embodiment of this invention is similar to the first embodiment (FIGS. 1-9) thereof except for design changes mentioned hereafter.

According to the seventeenth embodiment of this invention, a predetermined bit pattern, a known bit pattern, or a reference bit pattern is recorded on and reproduced from the recording medium 1 (FIG. 1) to obtain a correct two-dimensional equalizer characteristic.

A method of recording the predetermined bit pattern on the recording medium 1 is similar to that of recording a data bit pattern (an information bit pattern) on the recording medium 1. The method of recording the predetermined bit pattern is as follows. Information light which carries image information is generated. Information of the predetermined bit pattern is used as the image information. Specifically, the information light results from modulation in accordance with the image information (the predetermined bit pattern information). Reference light is also generated. The information light and the reference light are superimposed on each other in the recording medium 1, causing an interference pattern (a holographic pattern) therein. The interference pattern is written into the recording medium 1. The writing of the interference pattern involves the recording of the image information, that is, the predetermined bit pattern information. The image information (the predetermined bit pattern information) is reproduced from the recording medium 1 as follows. The recording medium 1 is irradiated with the reference light. The interference pattern in the recording medium 1 diffracts the reference light. The resultant diffracted light is reproduction light which carries the image information. The image information (the predetermined bit pattern information) is extracted from the reproduction light.

A plurality of pages can be recorded on the recording medium 1 on an superimposition basis or an overlapping basis while changing the angle of the reference light relative to the recording medium 1 as a function of page.

The relation in recorded position between the predetermined bit pattern and a data bit pattern (an information bit pattern) is selected from three (1), (2), and (3) as follows.

(1) The predetermined bit pattern is in a page while the data bit pattern is in another page. The position of the predetermined bit pattern relative to the related page is the same as the position of the data bit pattern relative to the related page.

(2) The predetermined bit pattern is in a page while the data bit pattern is in another page. The position of the predetermined bit pattern relative to the related page is slightly different or offset from the position of the data bit pattern relative to the related page.

(3) One page is divided into blocks including a first block assigned to the predetermined bit pattern and a second block assigned to the data bit pattern.

In the case where the above relation (1) or (2) is taken, the predetermined bit pattern and the data bit pattern can be separately reproduced by changing the angle or the phase of the reference light relative to the recording medium 1.

In the case where the above relation (1) is taken, the position of the predetermined bit pattern relative to the related page is the same as the position of the data bit pattern relative to the related page. Accordingly, in this case, signal read-out is made twice while the recording medium 1 remains fixed, or signal read-out from a same track on the recording medium 1 is made twice. Since a tilt or a surface curvature of the recording medium 1 affects the signal read-out from the two pages to substantially the same degree, it is possible to carry out correct signal detection and proper compensation for the tilt or the surface curvature.

To provide the above relation (2), the data bit pattern and the predetermined bit pattern are recorded in slightly different or offset places on the recording medium 1 as portions of different pages respectively. Also in the case where the above relation (2) is taken, since a tilt or a surface curvature of the recording medium 1 affects the signal read-out from the two pages to substantially the same degree, it is possible to carry out correct signal detection and proper compensation for the tilt or the surface curvature.

In the case where the above relation (2) is taken, it is preferable to divide the page inclusive of the predetermined bit pattern into blocks including a block assigned to the predetermined bit pattern, and to divide the page inclusive of the data bit pattern into blocks including a block assigned to the data bit pattern.

Figure 26:
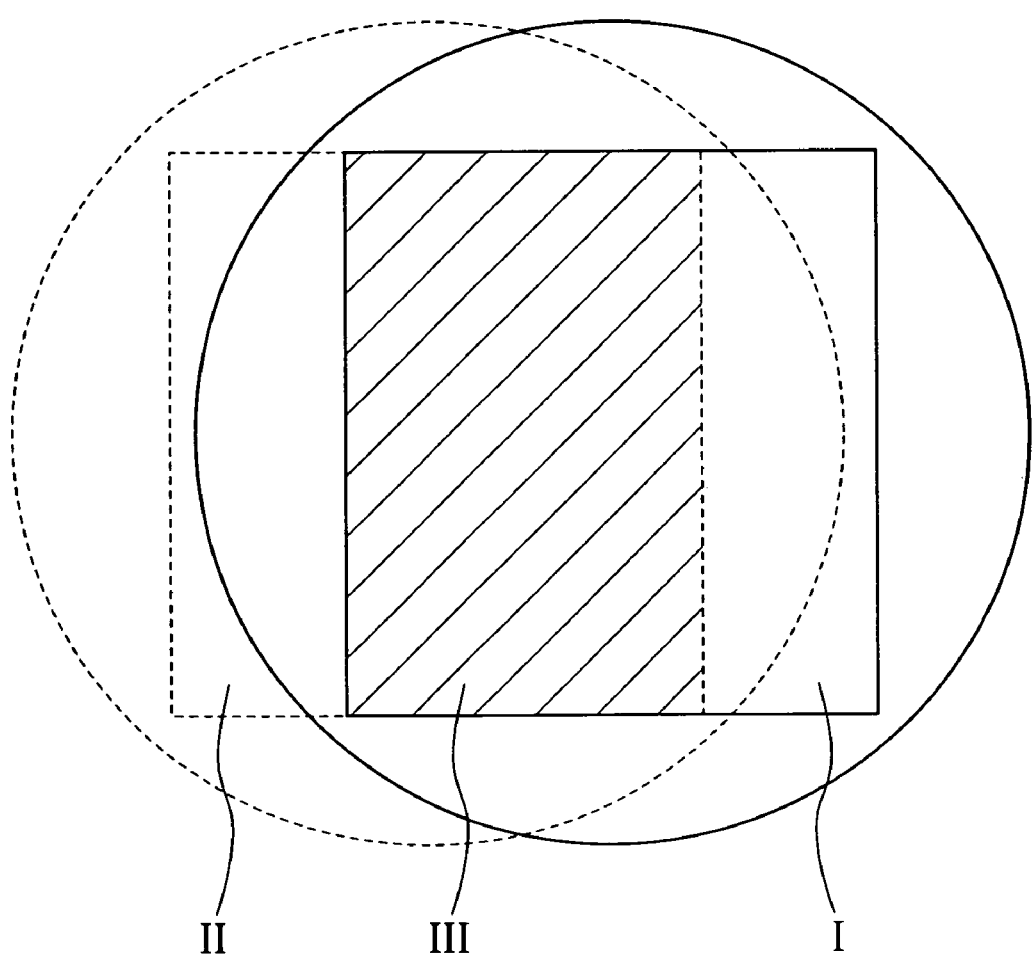
FIG. 26 is a diagram showing a block of a predetermined bit pattern and a block of a data bit pattern (an information bit pattern) which partially overlap each other.

FIG. 26 shows an example of the above relation (2). With reference to FIG. 26, a block I of the predetermined bit pattern and a block II of the data bit pattern (the information bit pattern) partially overlap each other in a region III. Preferably, the degree of the overlap corresponds to 50% or more.

Figure 27:
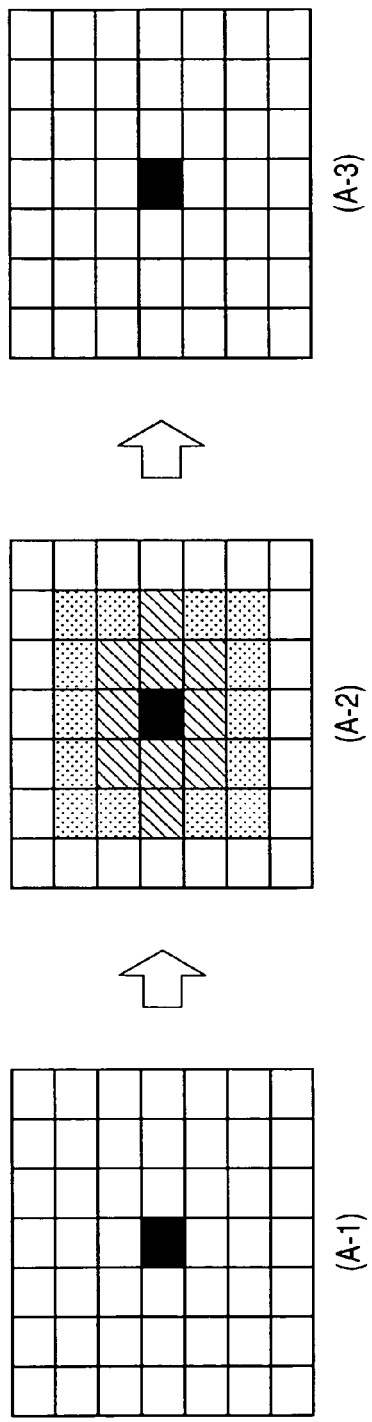
FIG. 27 is a diagram of a predetermined bit pattern corresponding to an isolated waveform, a level pattern taken by a reproduced signal of the predetermined bit pattern which has inter-symbol interference components, and a reproduced bit pattern obtained by a signal processing procedure including a step of removing the inter-symbol interference components from the reproduced signal.

FIG. 27 shows an example of the predetermined bit pattern which is denoted by the character "(A-1)". The predetermined bit pattern (A-1) is divided into rectangular segments corresponding to bits respectively. As shown in FIG. 27, the predetermined bit pattern (A-1) is a matrix array of 7 by 7 bits where the center bit assumes a state of "1" while the other bits assume states of "0". It should be noted that the center bit may assume a state of "0". In this case, the other bits assume states of "1". The predetermined bit pattern (A-1) corresponds to a two-dimensional isolated waveform. A signal representative of the predetermined bit pattern (A-1) is recorded on and reproduced from the recording medium 1. FIG. 27 shows an example (A-2) of the two-dimensional level pattern taken by the reproduced signal of the predetermined bit pattern (A-1). In this case, the level pattern (A-2) corresponds to a transfer characteristic of the recording and reproducing system.

The level pattern (A-2) has components caused by inter-symbol interferences. In the case where the center of the predetermined bit pattern (A-1) is designed to correspond to a lowest reproduction signal level, the level at a position in the level pattern (A-2) increases as the position moves from the center to the edge of the level pattern (A-2). The level pattern (A-2) corresponds to the intensities of light incident to the cells of the photodetector array 20 (FIG. 2). In FIG. 27, the degree of darkness of a rectangular segment of the level pattern (A-2) increases as the corresponding light intensity decreases.

A signal processing circuit 27L mentioned later removes the inter-symbol interference components from the level pattern (A-2) to obtain a reproduced bit pattern (A-3) identical with the original bit pattern (A-1).

It should be noted that the predetermined bit pattern may differ from that in FIG. 27. Another example of the predetermined bit pattern is designed so that successive bits in a region corresponding to a minimum inversion interval assume first logic states while other bits are in second logic states opposite to the first logic states.

Figure 28:
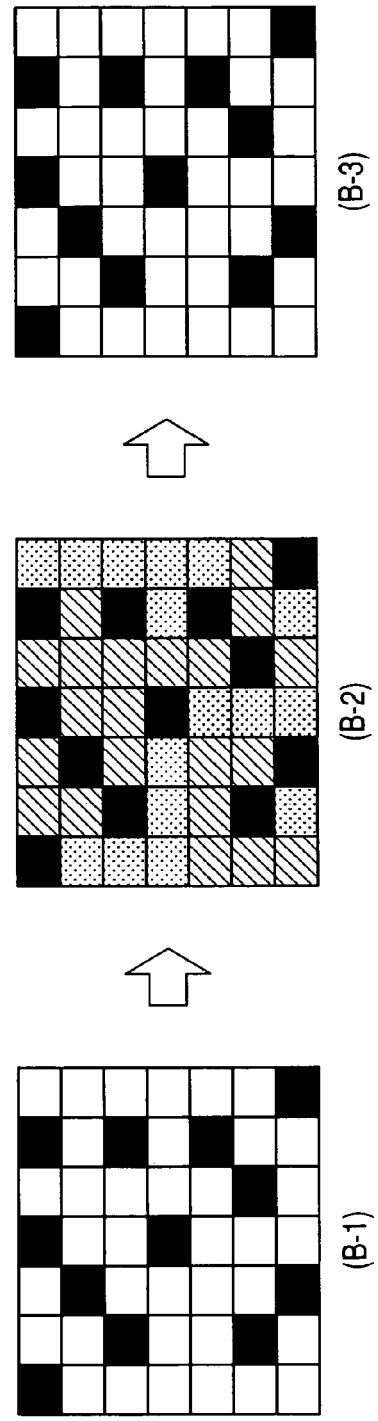
FIG. 28 is a diagram of a random bit pattern (a data bit pattern), a level pattern taken by a reproduced signal of the random bit pattern which has inter-symbol interference components, and a reproduced bit pattern obtained by a signal processing procedure including a step of removing the inter-symbol interference components from the reproduced signal.

FIG. 28 shows an example of a random bit pattern (a data bit pattern or an information bit pattern) which is denoted by the character "(B-1)". The random bit pattern (B-1) is divided into rectangular segments corresponding to bits respectively. As shown in FIG. 28, the random bit pattern (B-1) is a matrix array of 7 by 7 bits where the bits assume states of "1" and "0" in a random fashion. A signal representative of the random bit pattern (B-1) is recorded on and reproduced from the recording medium 1. FIG. 28 shows an example (B-2) of the two-dimensional level pattern taken by the reproduced signal of the random bit pattern (B-1). The level pattern (B-2) has components caused by inter-symbol interferences. The signal processing circuit 27L removes the inter-symbol interference components from the level pattern (B-2) to obtain a reproduced bit pattern (B-3) identical with the original bit pattern (B-1).

The predetermined bit pattern and a data bit pattern (an information bit pattern) may be one of a baseband signal, a signal resulting from LDPC (low-density parity check code) modulation of original data, a signal resulting from run-length modulation of the LDPC-modulation-resultant signal, a signal resulting from rearranging segments or bits of the LDPC-modulation-resultant signal, a signal resulting from run-length modulation of the rearranged LDPC-modulation-resultant signal, a signal resulting from turbo encoding of the original data, a signal resulting from run-length modulation of the turbo-encoded signal, a signal resulting from rearranging segments or bits of the turbo-encoded signal, and a signal resulting from run-length modulation of the rearranged turbo-encoded signal.

The predetermined bit pattern and a data bit pattern (an information bit pattern) may be a signal of a run-length-limited code such as one used in a CD, a DVD, a BD (Blu-ray disc), or another optical information recording medium. In this case, the predetermined bit pattern has a minimum run length or longer.

The signal processing circuit 27L utilizes waveform equalization for removing the inter-symbol interference components from a reproduced signal.

An image signal of the predetermined bit pattern is recorded on an XY plane of the information recording layer 3 in the recording medium 1 (FIG. 1) through the use of first recording-purpose reference light. The pickup device 23 reads out the image signal of the predetermined bit pattern from the recording medium 1 while applying first reproduction-purpose reference light thereto and collecting and detecting reproduction light caused in the recording medium by the application of the first reproduction-purpose reference light. The first reproduction-purpose reference light is the same as the first recording-purpose reference light. Specifically, the pickup device 23 (FIG. 1) reads out the image signal of the predetermined bit pattern from the recording medium 1 by iterating scanning in the X or Y direction. Every stroke of the X-direction or Y-direction scanning generates read-out signals of at least three adjacent lines of bits in the predetermined bit pattern, that is, read-out signals of at least three adjacent bit sequences in the predetermined bit pattern. The central bit sequence among the at least three adjacent bit sequences is handled as a bit sequence of interest. The other bit sequences, that is, the at least two bit sequences neighboring the bit sequence of interest are referred to as the neighboring bit sequences. The neighboring bit sequences are used for canceling or removing cross talk components from the bit sequence of interest. During the iteration of the scanning, the bit sequence of interest periodically shifts from one to the next.

Figure 29:
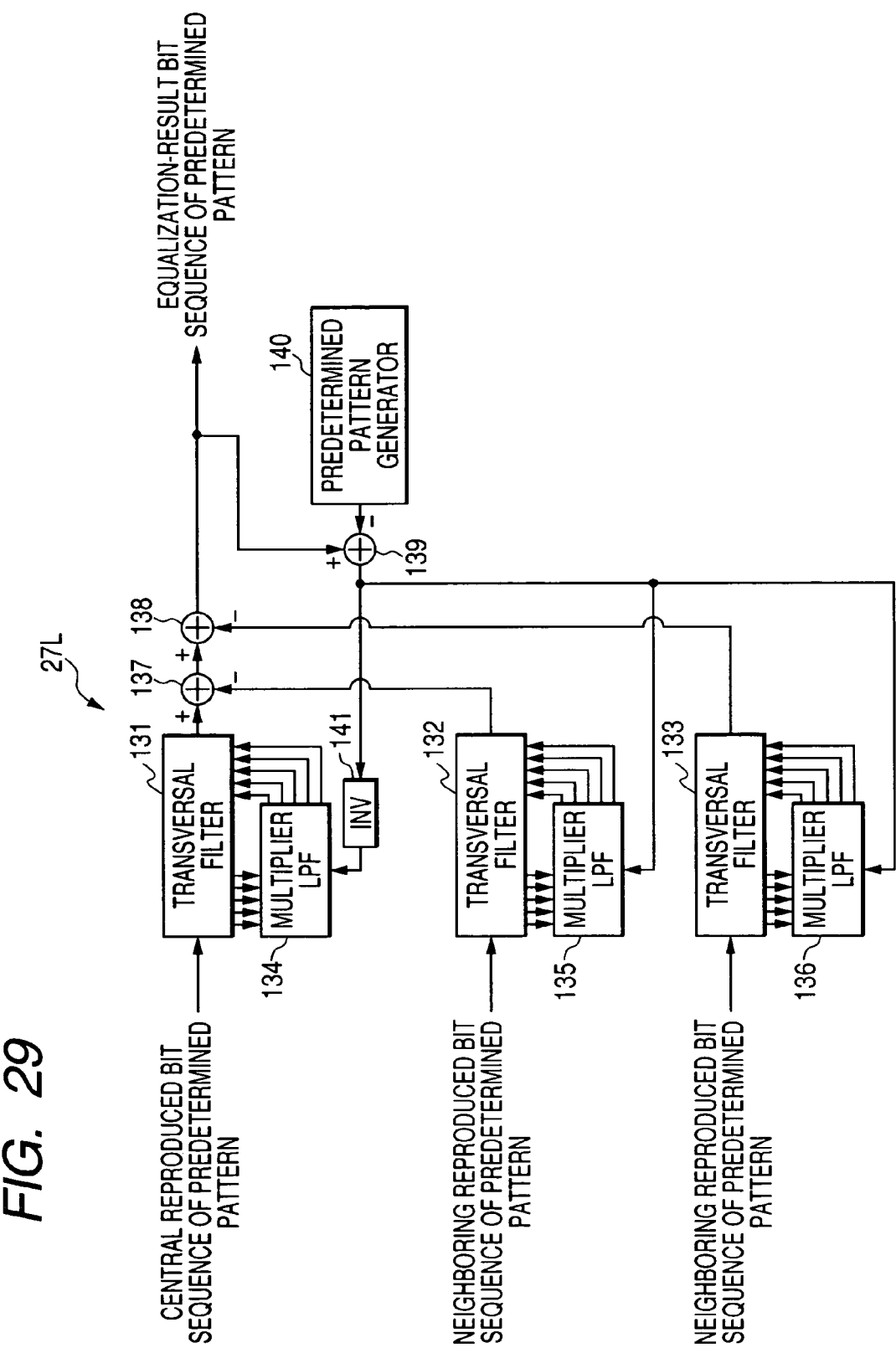
FIG. 29 is a block diagram of a first portion of a signal processing circuit in a seventeenth embodiment of this invention.

FIG. 29 shows a first portion of the signal processing circuit 27L which replaces the signal processing circuit 27 of FIG. 1. The first portion of the signal processing circuit 27L is designed to process the read-out signals of the bit sequence of interest and the neighboring bit sequences in the predetermined bit pattern. As shown in FIG. 29, the first portion of the signal processing circuit 27L includes transversal filters 131, 132, and 133, multiplier and LPF (low pass filter) sections 134, 135, and 136, subtracters 137, 138, and 139, a predetermined-pattern generator 140, and an inverter 141.

The signal processing circuit 27L includes analog-to-digital converters (not shown) which receive the read-out signals of the bit sequence of interest and the neighboring bit sequences in the predetermined bit pattern from the pickup device 23 (FIG. 1), and which change the received signals into corresponding digital signals. The transversal filter 131 receives the digital read-out signal of the bit sequence of interest. The transversal filters 135 and 136 receive the digital read-out signals of the neighboring bit sequences, respectively. In FIG. 29, the number of the digital read-out signals of the neighboring bit sequences and also the number of the transversal filters 135 and 136 are equal to two. It should be noted that the number of the digital read-out signals of the neighboring bit sequences and also the number of the related transversal filters may be equal to more than two.

The transversal filter 131 receives filtering coefficients, that is, tap coefficients, from the multiplier and LPF section 134. The transversal filter 131 subjects the signal of the bit sequence of interest to filtering-based waveform equalization responsive to the filtering coefficients so that the inter-symbol interference components of the signal of the bit sequence of interest will be reduced or removed. Thus, the transversal filter 131 converts the signal of the bit sequence of interest into an equalization-resultant signal of the bit sequence of interest. The equalization-resultant signal of the bit sequence of interest propagates from the transversal filter 131 to the subtracter 139 via the subtracters 137 and 138.

The predetermined-pattern generator 140 produces a signal representative of the predetermined bit pattern. The predetermined-pattern generator 140 outputs the predetermined bit pattern signal to the subtracter 139. The device 139 subtracts the value represented by the predetermined bit pattern signal from the value represented by the output signal of the subtracter 138 to generate an error signal corresponding to the subtraction result. The subtracter 139 outputs the error signal to the inverter 141. The device 141 inverts the polarity of the error signal to generate a polarity-inverted error signal. The inverter 141 outputs the polarity-inverted error signal to the multiplier and LPF section 134. The multiplier and LPF section 134 receives tap output signals from the transversal filter 131. In the multiplier and LPF section 134, the tap output signals are multiplied by the polarity-inverted error signal to detect a correlation, and the multiplication-resultant signals (the correlation-indicating signals) are integrated by LPFs to form signals representative of the filtering coefficients or the tap coefficients. The multiplier and LPF section 134 outputs the signals of the filtering coefficients to the transversal filter 131. The filtering coefficients, that is, the tap coefficients, used by the transversal filter 131 are designed to nullify the value of the above-mentioned error signal.

The multiplier and LPF section 134 obtains the signals of the filtering coefficients (the tap coefficients) as a result of learning with respect to the predetermined bit pattern. The multiplier and LPF section 134 outputs the signals of the learning-result filtering coefficients to a data-bit-pattern processing section.

The transversal filter 131, the subtracters 137, 138, and 139, the inverter 141, and the multiplier and LPF section 134 constitute a feedback loop for implementing the waveform equalization on the basis of a known LMS (least mean square) algorithm.

The transversal filter 132 receives filtering coefficients, that is, tap coefficients, from the multiplier and LPF section 135. The multiplier and LPF section 135 is similar to the multiplier and LPF section 134. The transversal filter 132 subjects the received signal of the neighboring bit sequence to filtering responsive to the filtering coefficients, and thereby generates a filtered signal of the neighboring bit sequence. The multiplier and LPF section 135 receives the error signal from the subtracter 139. The multiplier and LPF section 135 receives tap output signals from the transversal filter 132. In the multiplier and LPF section 135, the tap output signals are multiplied by the error signal to detect a correlation of the signal of the neighboring bit sequence, and the multiplication-resultant signals (the correlation-indicating signals) are integrated by LPFs to form signals representative of the filtering coefficients or the tap coefficients. The multiplier and LPF section 135 outputs the signals of the filtering coefficients to the transversal filter 132.

The filtering coefficients, that is, the tap coefficients, used by the transversal filter 132 are periodically updated in accordance with the detected correlation of the signal of the neighboring bit sequence. The filtered signal of the neighboring bit sequence which is generated by the transversal filter 132 forms a pseudo cross talk signal, that is, a signal representing a cross talk between the signal of the bit sequence of interest and the signal of the neighboring bit sequence. The transversal filter 132 outputs the pseudo cross talk signal to the subtracter 137.

The multiplier and LPF section 135 obtains the signals of the filtering coefficients (the tap coefficients) as a result of learning with respect to the predetermined bit pattern. The multiplier and LPF section 135 outputs the signals of the learning-result filtering coefficients to the data-bit-pattern processing section.

The transversal filter 133 receives filtering coefficients, that is, tap coefficients, from the multiplier and LPF section 136. The multiplier and LPF section 136 is similar to the multiplier and LPF section 134. The transversal filter 133 subjects the received signal of the neighboring bit sequence to filtering responsive to the filtering coefficients, and thereby generates a filtered signal of the neighboring bit sequence. The multiplier and LPF section 136 receives the error signal from the subtracter 139. The multiplier and LPF section 136 receives tap output signals from the transversal filter 133. In the multiplier and LPF section 136, the tap output signals are multiplied by the error signal to detect a correlation of the signal of the neighboring bit sequence, and the multiplication-resultant signals (the correlation-indicating signals) are integrated by LPFs to form signals representative of the filtering coefficients or the tap coefficients. The multiplier and LPF section 136 outputs the signals of the filtering coefficients to the transversal filter 133.

The filtering coefficients, that is, the tap coefficients, used by the transversal filter 133 are periodically updated in accordance with the detected correlation of the signal of the neighboring X-direction bit sequence. The filtered signal of the neighboring X-direction bit sequence which is generated by the transversal filter 133 forms a pseudo cross talk signal, that is, a signal representing a cross talk between the signal of the bit sequence of interest and the signal of the neighboring bit sequence. The transversal filter 133 outputs the pseudo cross talk signal to the subtracter 138.

The multiplier and LPF section 136 obtains the signals of the filtering coefficients (the tap coefficients) as a result of learning with respect to the predetermined bit pattern. The multiplier and LPF section 136 outputs the signals of the learning-result filtering coefficients to the data-bit-pattern processing section.

The subtracters 137 and 138 successively follow the transversal filter 131, and receive the equalization-resultant signal of the bit sequence of interest therefrom. The combination of the devices 137 and 138 subtracts the pseudo cross talk signals (the output signals of the transversal filters 132 and 133) from the equalization-resultant signal of the bit sequence of interest, and thereby removes cross talk components therefrom or cancels the cross talk components therein. Accordingly, the combination of the subtracters 137 and 138 converts the equalization-resultant signal of the bit sequence of interest into an equalization-resultant cross-talk-free signal of the bit sequence of interest. The equalization-resultant cross-talk-free signal of the bit sequence of interest is fed to the subtracter 139 and also a later circuit stage. The equalization-resultant cross-talk-free signal which occurs during the iteration of the scanning represents, for example, the reproduced bit pattern (A-3) identical with the original bit pattern (A-1) in FIG. 27.

The transversal filter 132, the subtracters 137, 138, and 139, and the multiplier and LPF section 135 constitute a feedback loop which controls the tap coefficients used by the transversal filter 132 to nullify the value of the error signal. The transversal filter 133, the subtracters 138 and 139, and the multiplier and LPF section 136 constitute a feedback loop which controls the tap coefficients used by the transversal filter 133 to nullify the value of the error signal. The signal processing circuit 27L has an inter-symbol-interference removing block including the transversal filter 131, and a pseudo-cross-talk-signal generating block including the transversal filters 132 and 133. The tap coefficients used by the transversal filters 131, 132, and 133 are controlled to nullify the value of the same error signal. Accordingly, it is possible to prevent the occurrence of a collision between the inter-symbol-interference removing control and the cross-talk canceling control.

Figure 30:
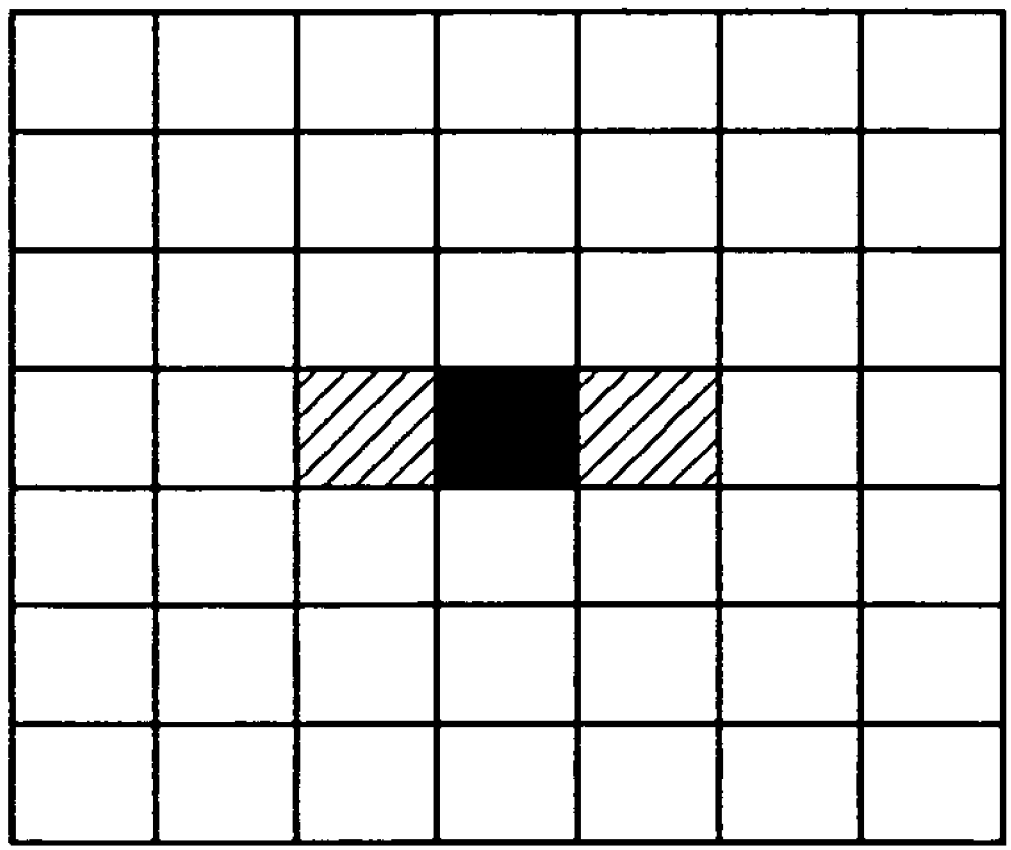
FIG. 30 is a diagram of a reproduced bit pattern corresponding to the predetermined bit pattern in FIG. 27 and obtained by a signal processing procedure utilizing partial-response waveform equalization including a step of making a temporary decision for removing inter-symbol interference components.

The removal of the inter-symbol interference components from the reproduced signal may be implemented by partial-response waveform equalization including a process of making a temporary decision. In this case, a reproduced bit pattern (A-4) shown in FIG. 30 occurs as a result of the removal of the inter-symbol interference components from the level pattern (A-2) of FIG. 27. The reproduced bit pattern (A-4) is similar to the original bit pattern (A-1) of FIG. 27. For example, in the case where the partial-response waveform equalization is of a type expressed as PR(1, 2, 1), the predetermined-pattern generator 40 outputs a signal representing a level which varies as "0", "0", "0.5", "1", "0.5", "0", "0" in correspondence with the partial response. It should be noted that the center level is normalized to "1".

An image signal of a data bit pattern (an information bit pattern or a random bit pattern) is recorded on an XY plane of the information recording layer 3 in the recording medium 1 (FIG. 1) through the use of second recording-purpose reference light different from the first recording-purpose reference light. The pickup device 23 reads out the image signal of the data bit pattern from the recording medium 1 while applying second reproduction-purpose reference light thereto and collecting and detecting reproduction light caused in the recording medium by the application of the second reproduction-purpose reference light. The second reproduction-purpose reference light is the same as the second recording-purpose reference light. The second reproduction-purpose reference light differs from the first reproduction-purpose reference light. The pickup device 23 (FIG. 1) reads out the image signal of the data bit pattern from the recording medium 1 by iterating scanning in the X or Y direction. Every stroke of the X-direction or Y-direction scanning generates read-out signals of at least three adjacent lines of bits in the data bit pattern, that is, read-out signals of at least three adjacent bit sequences in the data bit pattern. The central bit sequence among the at least three adjacent bit sequences is handled as a bit sequence of interest. The other bit sequences, that is, the at least two bit sequences neighboring the bit sequence of interest are referred to as the neighboring bit sequences. The neighboring bit sequences are used for canceling or removing cross talk components from the bit sequence of interest. During the iteration of the scanning, the bit sequence of interest periodically shifts from one to the next.

Figure 31:
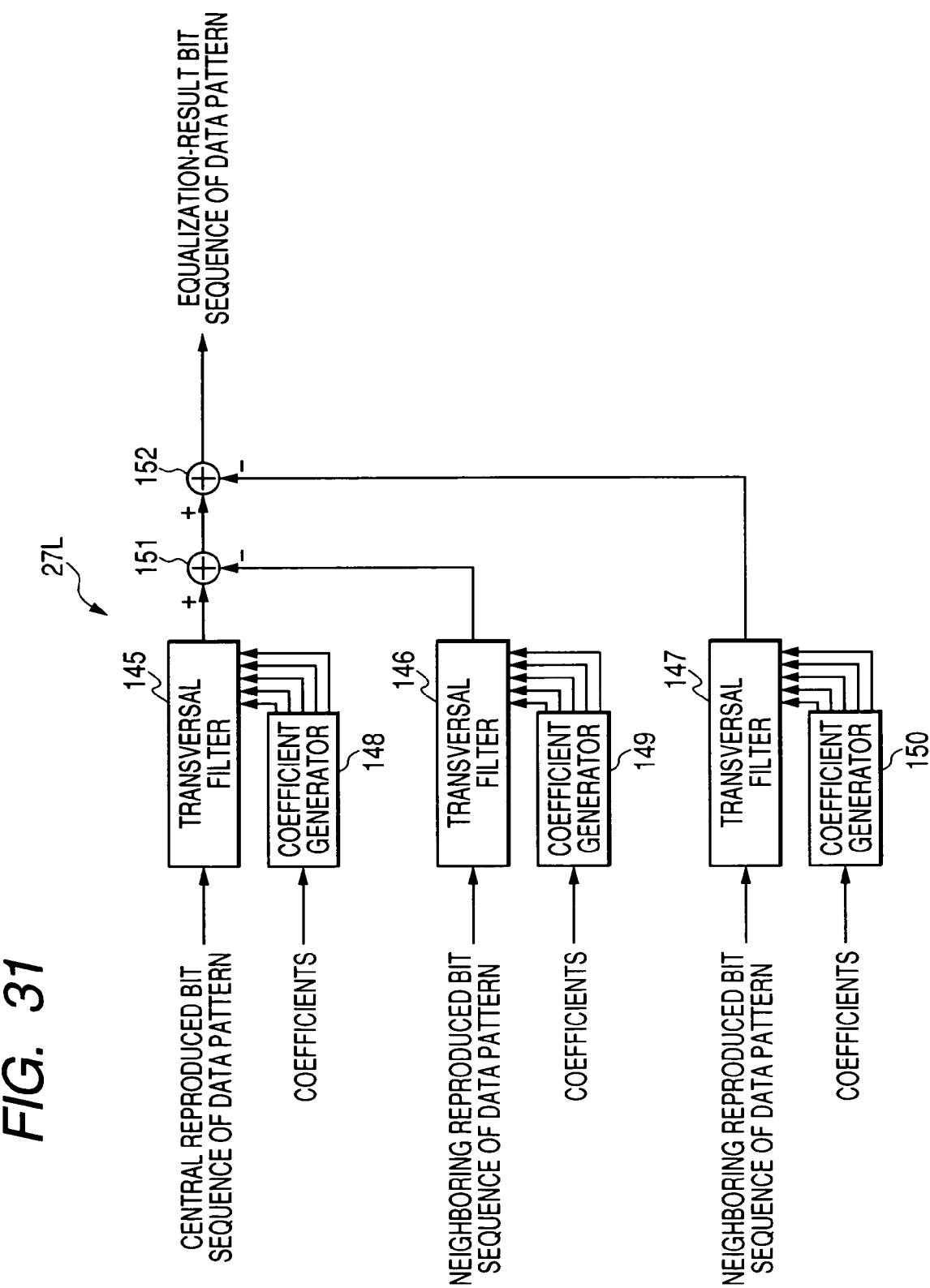
FIG. 31 is a block diagram of a second portion of the signal processing circuit in the seventeenth embodiment of this invention.

FIG. 31 shows a second portion of the signal processing circuit 27L. The second portion of the signal processing circuit 27L is designed to process the read-out signals of the bit sequence of interest and the neighboring bit sequences in the data bit pattern (the information bit pattern). As shown in FIG. 31, the second portion of the signal processing circuit 27L includes transversal filters 145, 146, and 147, coefficient generators 148, 149, and 150, and subtracters 151 and 152.

The signal processing circuit 27L includes analog-to-digital converters (not shown) which receive the read-out signals of the bit sequence of interest and the neighboring bit sequences in the data bit pattern from the pickup device 23 (FIG. 1), and which change the received signals into corresponding digital signals. The transversal filter 145 receives the digital read-out signal of the bit sequence of interest. The transversal filters 146 and 147 receive the digital read-out signals of the neighboring bit sequences, respectively. In FIG. 31, the number of the digital read-out signals of the neighboring bit sequences and also the number of the transversal filters 146 and 147 are equal to two. It should be noted that the number of the digital read-out signals of the neighboring bit sequences and also the number of the related transversal filters may be equal to more than two.

The coefficient generator 148 receives the signals of the learning-result filtering coefficients (the learning-result tap coefficients) from the multiplier and LPF section 134 in FIG. 29. The coefficient generator 148 includes a memory in which the received signals of the learning-result filtering coefficients are stored. The coefficient generator 148 transfers the signals of the learning-result filtering coefficients from the memory to the transversal filter 145.

The coefficient generator 149 receives the signals of the learning-result filtering coefficients (the learning-result tap coefficients) from the multiplier and LPF section 135 in FIG. 29. The coefficient generator 149 includes a memory in which the received signals of the learning-result filtering coefficients are stored. The coefficient generator 149 transfers the signals of the learning-result filtering coefficients from the memory to the transversal filter 146.

The coefficient generator 150 receives the signals of the learning-result filtering coefficients (the learning-result tap coefficients) from the multiplier and LPF section 136 in FIG. 29. The coefficient generator 150 includes a memory in which the received signals of the learning-result filtering coefficients are stored. The coefficient generator 150 transfers the signals of the learning-result filtering coefficients from the memory to the transversal filter 147.

The transversal filter 145 subjects the signal of the bit sequence of interest to filtering-based waveform equalization responsive to the learning-result filtering coefficients so that the inter-symbol interference components of the signal of the bit sequence of interest will be reduced or removed. Thus, the transversal filter 145 converts the signal of the bit sequence of interest into an equalization-resultant signal of the bit sequence of interest. The equalization-resultant signal of the bit sequence of interest propagates from the transversal filter 145 to a later circuit stage via the subtracters 151 and 152.

The transversal filter 146 subjects the received signal of the neighboring bit sequence to filtering responsive to the learning-result filtering coefficients, and thereby generates a filtered signal of the neighboring bit sequence. The filtered signal of the neighboring bit sequence forms a pseudo cross talk signal, that is, a signal representing a cross talk between the signal of the bit sequence of interest and the signal of the neighboring bit sequence. The transversal filter 146 outputs the pseudo cross talk signal to the subtracter 151.

The transversal filter 147 subjects the received signal of the neighboring bit sequence to filtering responsive to the learning-result filtering coefficients, and thereby generates a filtered signal of the neighboring bit sequence. The filtered signal of the neighboring bit sequence forms a pseudo cross talk signal, that is, a signal representing a cross talk between the signal of the bit sequence of interest and the signal of the neighboring bit sequence. The transversal filter 147 outputs the pseudo cross talk signal to the subtracter 152.

The subtracters 151 and 152 successively follow the transversal filter 145, and receive the equalization-resultant signal of the bit sequence of interest therefrom. The combination of the devices 151 and 152 subtracts the pseudo cross talk signals (the output signals of the transversal filters 146 and 147) from the equalization-resultant signal of the bit sequence of interest, and thereby removes cross talk components therefrom or cancels the cross talk components therein. Accordingly, the combination of the subtracters 151 and 152 converts the equalization-resultant signal of the bit sequence of interest into an equalization-resultant cross-talk-free signal of the bit sequence of interest. The equalization-resultant cross-talk-free signal of the bit sequence of interest is fed to a later circuit stage.

Eighteenth Embodiment

An eighteenth embodiment of this invention is similar to the seventeenth embodiment (FIGS. 26-31) thereof except for design changes mentioned hereafter.

According to the eighteenth embodiment of this invention, a temporary decision circuit is provided to adaptively implement waveform equalization. Filtering coefficients (tap coefficients) fed to transversal filters for processing read-out signals of a data bit pattern (an information bit pattern) are periodically updated through the use of the temporary decision circuit. The learning-result filtering coefficients are set as initial values for the filtering coefficients used by the transversal filters. The used filtering coefficients are limited so that they can vary only in a prescribed range. This design prevents a divergence.

Figure 32:
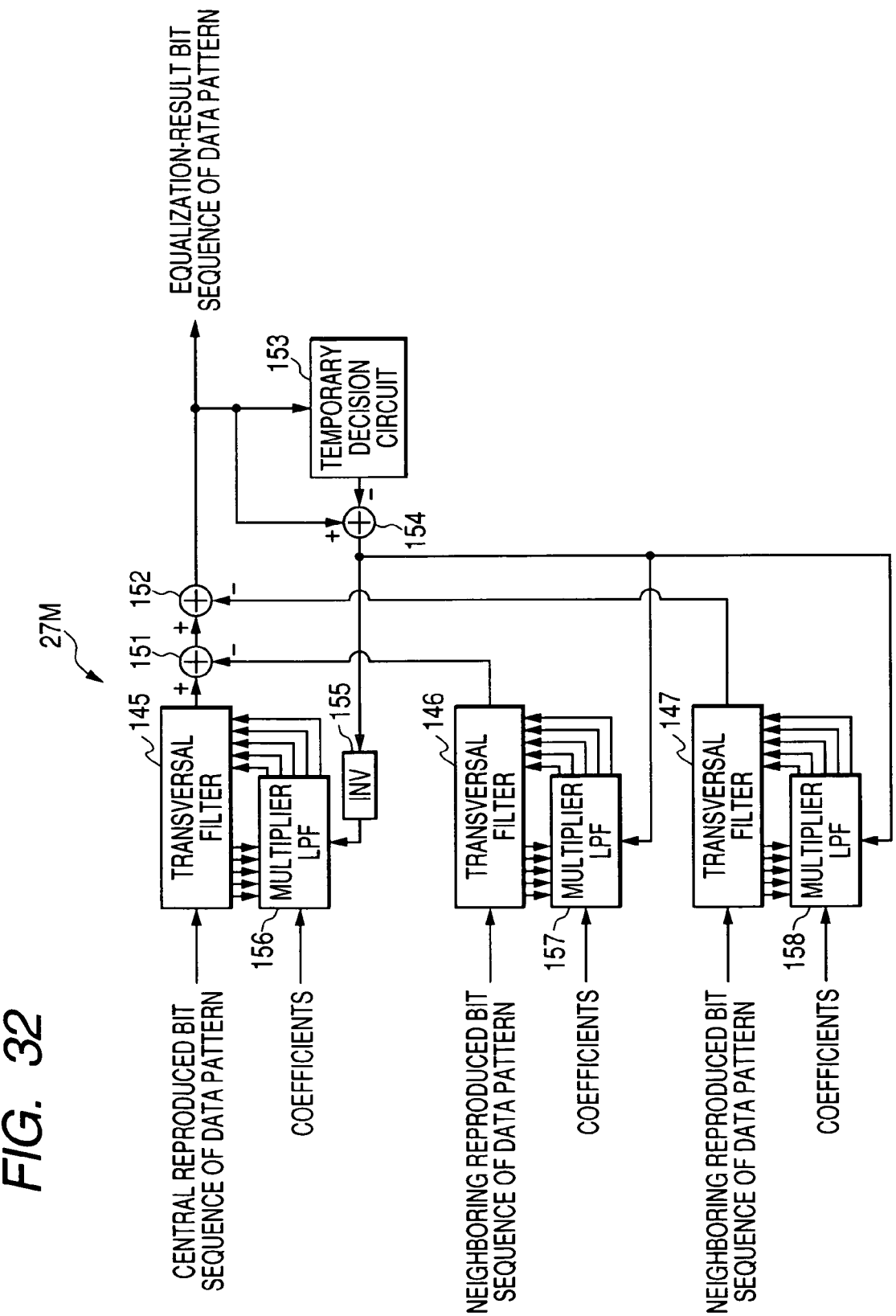
FIG. 32 is a block diagram of a portion of a signal processing circuit in an eighteenth embodiment of this invention.

FIG. 32 shows a portion of a signal processing circuit 27M in the eighteenth embodiment of this invention. The portion of the signal processing circuit 27M in FIG. 32 replaces the portion of the signal processing circuit 27L in FIG. 31.

As shown in FIG. 32, the portion of the signal processing circuit 27M includes a temporary decision circuit 153, a subtracter 154, an inverter 155, and multiplier and LPF (low pass filter) sections 156, 157, and 158 in addition to the transversal filters 145, 146, and 147, and the subtracters 151 and 152.

The transversal filter 145 receives filtering coefficients, that is, tap coefficients, from the multiplier and LPF section 156. The transversal filter 145 subjects the signal of the bit sequence of interest to filtering-based waveform equalization responsive to the filtering coefficients so that the inter-symbol interference components of the signal of the bit sequence of interest will be reduced or removed. Thus, the transversal filter 145 converts the signal of the bit sequence of interest into an equalization-resultant signal of the bit sequence of interest. The equalization-resultant signal of the bit sequence of interest propagates from the transversal filter 145 to the temporary decision circuit 153 and the subtracter 154 via the subtracters 151 and 152.

The multiplier and LPF section 156 receives the signals of the learning-result filtering coefficients (the learning-result tap coefficients) from the multiplier and LPF section 134 in FIG. 29. The multiplier and LPF section 156 includes a memory in which the received signals of the learning-result filtering coefficients are stored. The multiplier and LPF section 156 sets the learning-result filtering coefficients as initial values for the filtering coefficients fed to the transversal filter 145. Therefore, the filtering coefficients used by the transversal filter 145 start from the learning-result filtering coefficients.

The temporary decision circuit 153 temporarily decides the state or value of the output signal from the subtracter 152, and generates an ideal value (a target value) on the basis of the temporarily decided state or value. The temporary decision circuit 153 outputs a signal representative of the target value to the subtracter 154. The device 154 subtracts the target value from the actual value represented by the output signal of the subtracter 152 to generate an error signal corresponding to the subtraction result. The subtracter 154 outputs the error signal to the inverter 155. The device 155 inverts the polarity of the error signal to generate a polarity-inverted error signal. The inverter 155 outputs the polarity-inverted error signal to the multiplier and LPF section 156. The multiplier and LPF section 156 receives tap output signals from the transversal filter 145. In the multiplier and LPF section 156, the tap output signals are multiplied by the polarity-inverted error signal to detect a correlation, and the multiplication-resultant signals (the correlation-indicating signals) are integrated by LPFs to form signals representative of the filtering coefficients or the tap coefficients. The multiplier and LPF section 156 outputs the signals of the filtering coefficients to the transversal filter 145. The filtering coefficients, that is, the tap coefficients, used by the transversal filter 145 are designed to nullify the value of the above-mentioned error signal.

The transversal filter 145, the temporary decision circuit 153, the subtracter 154, the inverter 155, and the multiplier and LPF section 156 constitute a feedback loop for implementing the waveform equalization on the basis of a known LMS (least mean square) algorithm.

The transversal filter 146 receives filtering coefficients, that is, tap coefficients, from the multiplier and LPF section 157. The multiplier and LPF section 157 is similar to the multiplier and LPF section 156. The transversal filter 146 subjects the received signal of the neighboring bit sequence to filtering responsive to the filtering coefficients, and thereby generates a filtered signal of the neighboring bit sequence.

The multiplier and LPF section 157 receives the signals of the learning-result filtering coefficients (the learning-result tap coefficients) from the multiplier and LPF section 135 in FIG. 29. The multiplier and LPF section 157 includes a memory in which the received signals of the learning-result filtering coefficients are stored. The multiplier and LPF section 157 sets the learning-result filtering coefficients as initial values for the filtering coefficients fed to the transversal filter 146. Therefore, the filtering coefficients used by the transversal filter 146 start from the learning-result filtering coefficients.

The multiplier and LPF section 157 receives the error signal from the subtracter 154. The multiplier and LPF section 157 receives tap output signals from the transversal filter 146. In the multiplier and LPF section 157, the tap output signals are multiplied by the error signal to detect a correlation of the signal of the neighboring bit sequence, and the multiplication-resultant signals (the correlation-indicating signals) are integrated by LPFs to form signals representative of the filtering coefficients or the tap coefficients. The multiplier and LPF section 157 outputs the signals of the filtering coefficients to the transversal filter 146.

The filtering coefficients, that is, the tap coefficients, used by the transversal filter 146 are periodically updated in accordance with the detected correlation of the signal of the neighboring bit sequence. The filtered signal of the neighboring bit sequence which is generated by the transversal filter 146 forms a pseudo cross talk signal, that is, a signal representing a cross talk between the signal of the bit sequence of interest and the signal of the neighboring bit sequence. The transversal filter 146 outputs the pseudo cross talk signal to the subtracter 151.

The transversal filter 147 receives filtering coefficients, that is, tap coefficients, from the multiplier and LPF section 158. The multiplier and LPF section 158 is similar to the multiplier and LPF section 156. The transversal filter 147 subjects the received signal of the neighboring bit sequence to filtering responsive to the filtering coefficients, and thereby generates a filtered signal of the neighboring bit sequence.

The multiplier and LPF section 158 receives the signals of the learning-result filtering coefficients (the learning-result tap coefficients) from the multiplier and LPF section 136 in FIG. 29. The multiplier and LPF section 158 includes a memory in which the received signals of the learning-result filtering coefficients are stored. The multiplier and LPF section 158 sets the learning-result filtering coefficients as initial values for the filtering coefficients fed to the transversal filter 147. Therefore, the filtering coefficients used by the transversal filter 147 start from the learning-result filtering coefficients.

The multiplier and LPF section 158 receives the error signal from the subtracter 154. The multiplier and LPF section 158 receives tap output signals from the transversal filter 147. In the multiplier and LPF section 158, the tap output signals are multiplied by the error signal to detect a correlation of the signal of the neighboring bit sequence, and the multiplication-resultant signals (the correlation-indicating signals) are integrated by LPFs to form signals representative of the filtering coefficients or the tap coefficients. The multiplier and LPF section 158 outputs the signals of the filtering coefficients to the transversal filter 147.

The filtering coefficients, that is, the tap coefficients, used by the transversal filter 147 are periodically updated in accordance with the detected correlation of the signal of the neighboring bit sequence. The filtered signal of the neighboring bit sequence which is generated by the transversal filter 147 forms a pseudo cross talk signal, that is, a signal representing a cross talk between the signal of the bit sequence of interest and the signal of the neighboring bit sequence. The transversal filter 147 outputs the pseudo cross talk signal to the subtracter 152.

The subtracters 151 and 152 successively follow the transversal filter 145, and receive the equalization-resultant signal of the bit sequence of interest therefrom. The combination of the devices 151 and 152 subtracts the pseudo cross talk signals (the output signals of the transversal filters 146 and 147) from the equalization-resultant signal of the bit sequence of interest, and thereby removes cross talk components therefrom or cancels the cross talk components therein. Accordingly, the combination of the subtracters 151 and 152 converts the equalization-resultant signal of the bit sequence of interest into an equalization-resultant cross-talk-free signal of the bit sequence of interest. The equalization-resultant cross-talk-free signal of the bit sequence of interest is fed to the temporary decision circuit 153, the subtracter 154, and a later circuit stage.

The temporary decision circuit 153 is the same as that in, for example, U.S. Pat. No. 6,445,662, the disclosure of which is hereby incorporated by reference.

Nineteenth Embodiment

A nineteenth embodiment of this invention is similar to the seventeenth embodiment (FIGS. 26-31) or the eighteenth embodiment (FIG. 32) thereof except for design changes mentioned hereafter.

Figure 33:
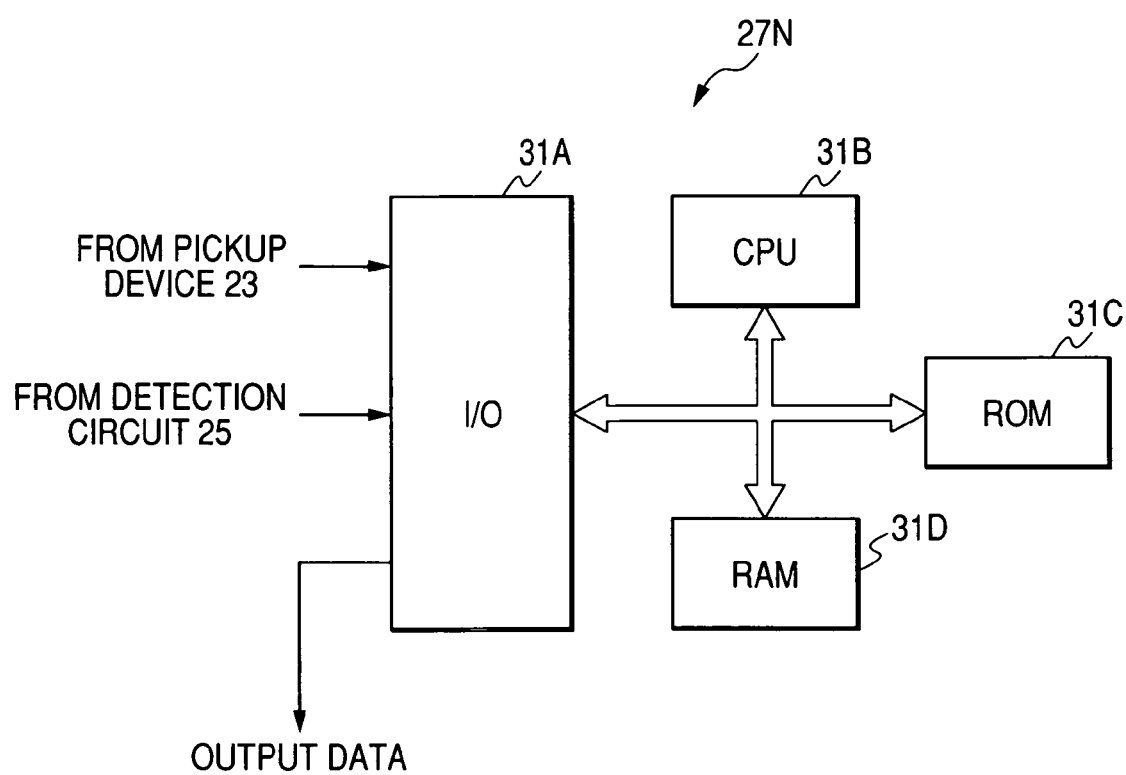
FIG. 33 is a block diagram of a signal processing circuit in a nineteenth embodiment of this invention.

FIG. 33 shows a signal processing circuit 27N in the nineteenth embodiment of this invention. The signal processing circuit 27N replaces the signal processing circuit 27L of FIGS. 29 and 31 or the signal processing circuit 27M of FIG. 32.

With reference to FIG. 33, the signal processing circuit 27N includes a digital signal processor or a computer having a combination of an input/output port 31A, a CPU 31B, a ROM 31C, and a RAM 31D. The signal processing circuit 27N operates in accordance with a control program (a computer program) stored in the ROM 31C or the RAM 31D. It should be noted that the control program may be installed on the RAM 31D from a personal computer or downloaded thereinto via a communication network. The input/output port 31A includes A/D converters for changing the output signals of the pickup device 23 and the detection circuit 25 (FIG. 1) into corresponding digital signals.

Figure 34:
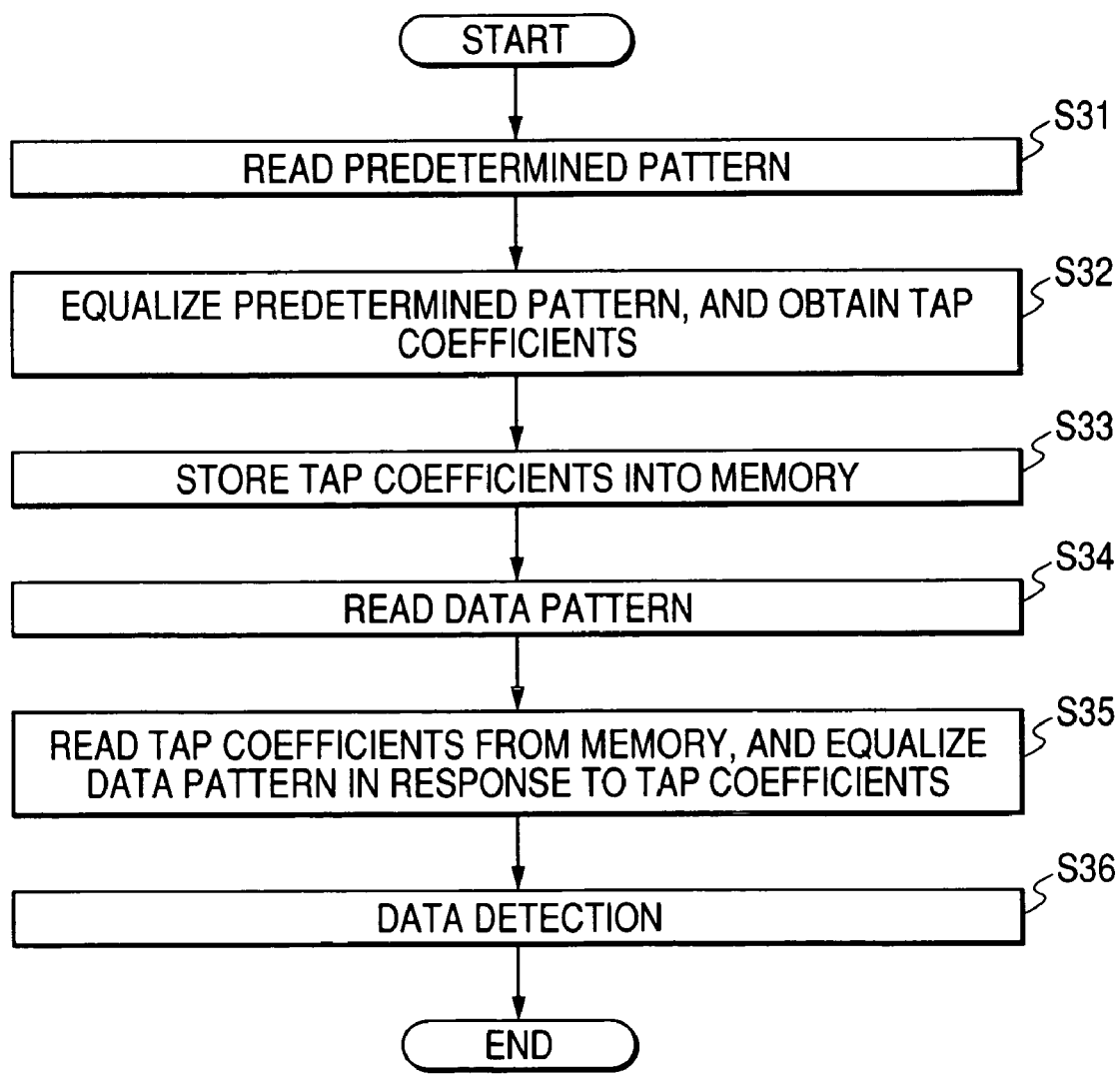
FIG. 34 is a flowchart of a segment of a control program for the signal processing circuit in FIG. 33.

FIG. 34 is a flowchart of a segment of the control program for the signal processing circuit 27N. With reference to FIG. 34, a first step S31 of the program segment receives a read-out signal from the pickup device 23 which represents the predetermined bit pattern in a block or a page recorded on the recording medium 1 (FIG. 1). As previously mentioned, there occur read-out signals of the bit sequence of interest and the neighboring bit sequences during every stroke of the X-direction or Y-direction scanning. The bit sequence of interest periodically shifts from one to the next during the iteration of the X-direction or Y-direction scanning.

A step S32 following the step S31 processes the read-out signals received by the step S31. Specifically, the step S32 provides transversal filters corresponding to the transversal filters 131, 132, and 133 in FIG. 29. The step S32 subjects the read-out signal of the bit sequence of interest to waveform equalization and cross talk cancel through the use of the transversal filters. The cross talk cancel is responsive to the read-out signals of the neighboring bit sequences. The step S32 generates an equalization-resultant cross-talk-free signal representative of the predetermined bit pattern. The step S32 generates filtering coefficients (tap coefficients) used by the transversal filters. The step S32 corresponds to the portion of the signal processing circuit 27L in FIG. 29.

A step S33 subsequent to the step S32 loads the RAM 31D with signals representative of filtering coefficients finally generated by the step S32. The finally-generated filtering coefficients are the learning-result filtering coefficients (the learning-result tap coefficients).

A step S34 receives a read-out signal from the pickup device 23 which represents a data bit pattern (an information bit pattern) in a block or a page recorded on the recording medium 1 (FIG. 1). As previously mentioned, there occur read-out signals of the bit sequence of interest and the neighboring bit sequences during every stroke of the X-direction or Y-direction scanning. The bit sequence of interest periodically shifts from one to the next during the iteration of the X-direction or Y-direction scanning.

A step S35 following the step S34 processes the read-out signals received by the step S34. Specifically, the step S35 provides transversal filters corresponding to the transversal filters 145, 146, and 147 in FIG. 31 or FIG. 32. The step S35 retrieves the signals of the learning-result filtering coefficients (the learning-result tap coefficients) from the RAM 31D. The step S35 subjects the read-out signal of the bit sequence of interest to waveform equalization and cross talk cancel through the use of the transversal filters while applying the learning-result filtering coefficients to the transversal filters. The cross talk cancel is responsive to the read-out signals of the neighboring bit sequences. The step S35 generates an equalization-resultant cross-talk-free signal representative of the data bit pattern. The step S35 corresponds to the portion of the signal processing circuit 27L in FIG. 31 or the portion of the signal processing circuit 27M in FIG. 32.

A step S36 subsequent to the step S35 implements data detection with respect to the equalization-resultant cross-talk-free signal generated by the step S35, and thereby recovers the original data from the equalization-resultant cross-talk-free signal. The step S36 may utilize viterbi decoding for the recovery of the original data. After the step S36, the current execution cycle of the program segment ends.

Twentieth Embodiment

A twentieth embodiment of this invention is similar to the seventeenth embodiment (FIGS. 26-31) thereof except for design changes mentioned hereafter.

Figure 35:
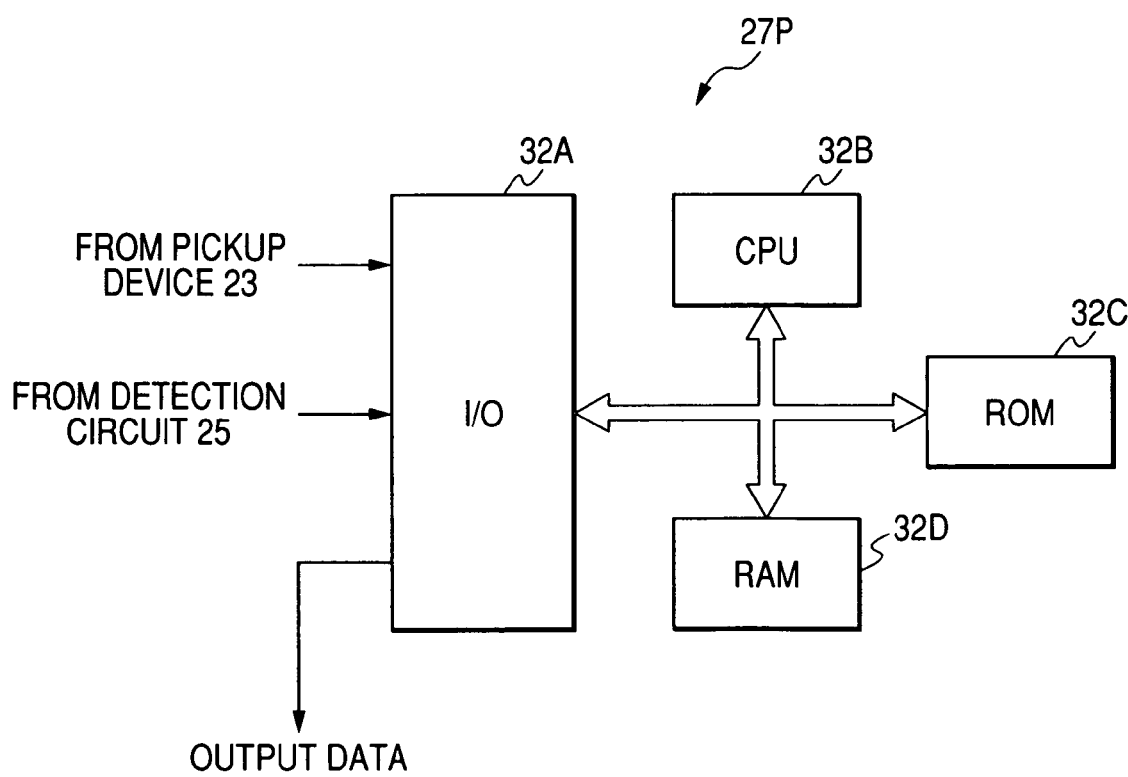
FIG. 35 is a block diagram of a signal processing circuit in a twentieth embodiment of this invention.

FIG. 35 shows a signal processing circuit 27P in the twentieth embodiment of this invention. The signal processing circuit 27P replaces the signal processing circuit 27L of FIGS. 29 and 31.

With reference to FIG. 35, the signal processing circuit 27P includes a digital signal processor or a computer having a combination of an input/output port 32A, a CPU 32B, a ROM 32C, and a RAM 32D. The signal processing circuit 27P operates in accordance with a control program (a computer program) stored in the ROM 32C or the RAM 32D. It should be noted that the control program may be installed on the RAM 32D from a personal computer or downloaded thereinto via a communication network. The input/output port 32A includes A/D converters for changing the output signals of the pickup device 23 and the detection circuit 25 (FIG. 1) into corresponding digital signals.

FIG. 36 is a flowchart of a segment of the control program for the signal processing circuit 27P. With reference to FIG. 36, a first step S41 of the program segment receives a reproduced signal from the pickup device 23 which represents the predetermined bit pattern in a block or a page recorded on the recording medium 1 (FIG. 1). The level pattern directly indicated by the reproduced signal is like the level pattern (A-2) in FIG. 27. The step S41 calculates the two-dimensional discrete Fourier transform (the two-dimensional DFT) of the digital version of the reproduced signal of the predetermined bit pattern according to a known equation, for example, the following equation.

$$F(u, v) = \sum_{y=0}^{N-1} \sum_{x=0}^{N-1} f(x, y) e^{-j2\pi(ux+vy)/N} \quad (1)$$

$$u, v = 0, 1, 2, \ldots, N-1$$

where f(x, y) denotes a function in the spatial domain which corresponds to the reproduced signal of the predetermined bit pattern; F(u, v) denotes a DFT-result function in the Fourier domain; and N denotes a sample number (a bit number) in each of the X and Y directions. The equation (1) is derived from a two-dimensional continuous Fourier transform equation expressed as:

$$F(u, v) = \int_{-\infty}^{\infty}\int_{-\infty}^{\infty} f(x, y)e^{-j2\pi(ux+uy)}dxdy \quad (2)$$

In the signal processing circuit 27P, the ROM 32C or the RAM 32D is previously loaded with the DFT result of an original signal representative of the predetermined bit pattern. The level pattern directly indicated by the original signal is like the bit pattern (A-1) in FIG. 27.

A step S42 following the step S41 retrieves the DFT result of the original signal of the predetermined bit pattern from the ROM 32C or the RAM 32D.

A step S43 subsequent to the step S42 subtracts the DFT result of the original signal of the predetermined bit pattern from the DFT result of the reproduced signal of the predetermined bit pattern which is obtained by the step S41. Thereby, the step S43 generates a first subtraction result. The first subtraction result indicates a transfer characteristic of the recording and reproducing system.

A step S44 following the step S43 receives a reproduced signal from the pickup device 23 which represents a data bit pattern (an information bit pattern) in a block or a page recorded on the recording medium 1 (FIG. 1). The level pattern directly indicated by the reproduced signal is like the level pattern (B-2) in FIG. 28. The step S44 calculates the two-dimensional discrete Fourier transform (the two-dimensional DFT) of the digital version of the reproduced signal of the data bit pattern according to, for example, the equation (1).

A step S45 subsequent to the step S44 subtracts the first subtraction result from the DFT result of the reproduced signal of the data bit pattern which is obtained by the step S44. Thereby, the step S43 generates a second subtraction result. The subtraction by the step S45 removes, from the DFT result of the reproduced signal of the data bit pattern, components caused by the adverse effect of the transfer characteristic. Such components include those caused by inter-symbol interferences and cross talks.

A step S46 following the step S45 calculates the two-dimensional inverse discrete Fourier transform (the two-dimensional IDFT) of the second subtraction result according to, a known equation, for example, the following equation.

$$f(x, y) = \sum_{u=0}^{N-1}\sum_{v=0}^{N-1} F(u, v)e^{j2\pi(ux+vy)/N} \quad (3)$$

where F(u, v) denotes a function in the Fourier domain which corresponds to the second subtraction result, and f(x, y) denotes a IDFT-result function in the spatial domain. Thus, the step S46 generates an IDFT-result signal representative of the data bit pattern. The equation (3) is derived from a two-dimensional inverse continuous Fourier transform equation expressed as:

$$f(x, y) = \int_{-\infty}^{\infty}\int_{-\infty}^{\infty} F(u, v)e^{j2\pi(ux+vy)}dudv \quad (4)$$

A step S47 subsequent to the step S46 implements data detection with respect to the IDFT-result signal generated by the step S46, and thereby recovers the original data from the IDFT-result signal. After the step S47, the current execution cycle of the program segment ends.

Twenty-First Embodiment

A twenty-first embodiment of this invention is similar to the twentieth embodiment (FIGS. 35 and 36) thereof except for design changes mentioned hereafter.

FIG. 37 is a flowchart of a segment of a control program for the signal processing circuit 27P (FIG. 35) in the twenty-first embodiment of this invention. With reference to FIG. 37, a first step S51 of the program segment receives a reproduced signal from the pickup device 23 which represents the predetermined bit pattern in a block or a page recorded on the recording medium 1 (FIG. 1). The level pattern directly indicated by the reproduced signal is like the level pattern (A-2) in FIG. 27. The step S51 calculates the two-dimensional discrete Fourier transform (the two-dimensional DFT) of the digital version of the reproduced signal of the predetermined bit pattern according to, for example, the previously-mentioned equation (1). Thus, the step S51 obtains the DFT result of the reproduced signal of the predetermined bit pattern.

A step S52 following the step S51 receives a reproduced signal from the pickup device 23 which represents a data bit pattern (an information bit pattern) in a block or a page recorded on the recording medium 1 (FIG. 1). The level pattern directly indicated by the reproduced signal is like the level pattern (B-2) in FIG. 28. The step S52 calculates the two-dimensional discrete Fourier transform (the two-dimensional DFT) of the digital version of the reproduced signal of the data bit pattern according to, for example, the previously-mentioned equation (1). Thus, the step S52 obtains the DFT result of the reproduced signal of the data bit pattern.

A step S53 subsequent to the step S52 subtracts the DFT result of the reproduced signal of the predetermined bit pattern from the DFT result of the reproduced signal of the data bit pattern. Thereby, the step S53 generates a subtraction result. The subtraction by the step S53 removes, from the DFT result of the reproduced signal of the data bit pattern, components caused by the adverse effect of the transfer characteristic. Such components include those caused by inter-symbol interferences and cross talks.

A step S54 following the step S53 calculates the two-dimensional inverse discrete Fourier transform (the two-dimensional IDFT) of the subtraction result according to, for example, the previously-mentioned equation (3). Thus, the step S54 obtains an IDFT-result signal.

A step S55 subsequent to the step S54 implements data detection with respect to the IDFT-result signal, and thereby recovers the original data from the IDFT-result signal. After the step S55, the current execution cycle of the program segment ends.

Twenty-Second Embodiment

A twenty-second embodiment of this invention is similar to the twentieth embodiment (FIGS. 35 and 36) or the twenty-first embodiment (FIG. 37) thereof except for design changes mentioned hereafter.

The twenty-second embodiment of this invention implements discrete cosine transform (DCT) and inverse discrete cosine transform (IDCT) instead of the discrete Fourier transform (DFT) and the inverse discrete Fourier transform (IDFT) respectively.

A set of input signals $x_i$ (i=0, 1, 2, , n−1) is now expressed by a vector x(vec). A set of transform-resultant coefficients $c_i$ (i=0, 1, 2, , n−1) is now expressed by a vector c(vec). One-dimensional discrete cosine transform is defined according to the following equation.

$$c(vec)=T \cdot x(vec) \quad (5)$$

where T denotes an n-by-n transform matrix. One-dimensional inverse discrete cosine transform is defined according to the following equation.

$$x(\text{vec}) = T^{-1} \cdot c(\text{vec}) \quad (6)$$

where $T^{-1}$ denotes an inverse matrix or a reciprocal matrix with respect to the transform matrix T.

The i-th-row j-th-column element of the transform matrix T is expressed as follows.

$$T_{ij} = \sqrt{\frac{2}{n}} \, k_{ij} \cos\left[\frac{(i-1)\left(j-\frac{1}{2}\right)}{n}\pi\right] \quad (7)$$

where the variable "$k_{ij}$" may be replaced by a variable "$k_i$" in the case of a one-dimensional expression. The transform matrix T is regular. The inverse matrix $T^{-1}$ is equal to the transpose of the complex conjugate with respect to the transform matrix T as expressed below.

$$T^{-1} = {}^t\overline{T} \quad (8)$$

Such a matrix is called a unitary matrix. Transform expressed by a unitary matrix is called unitary transform.

Two-dimensional discrete cosine transform is expressed as follows.

$$C = T \cdot G \cdot {}^t T \quad (9)$$

Two-dimensional inverse discrete cosine transform is expressed as follows.

$$G = T^{-1} \cdot C \cdot ({}^t T)^{-1} = {}^t T \cdot C \cdot T \quad (10)$$

What is claimed is:

1. A method of reproducing information from an optical information recording medium including an information recording layer on which the information has been recorded through the use of holography, wherein the information recording layer has an XY plane, and information bits and sync bits are arranged in the XY plane, the sync bits being in parallel Y-direction-extending groups having an X-direction minimum inversion interval of 2 or more, the information bits being between the parallel Y-direction-extending groups of the sync bits, the method comprising the steps of applying reproduction-purpose reference light to the XY plane of the information recording layer in the optical information recording medium, and detecting reproduction light caused in the information recording layer by the application of the reproduction-purpose reference light to reproduce the information, the method further comprising:
    a first step of collecting the reproduction light caused in the information recording layer by the application of the reproduction-purpose reference light, and detecting the collected reproduction light to reproduce the information;
    a second step, provided in the first step, of scanning one of the parallel Y-direction-extending groups of the sync bits and ones of the information bits neighboring said one of the parallel Y-direction-extending groups of the sync bits to reproduce a Y-direction sync bit sequence and at least one Y-direction information bit sequence;
    a third step of re-sampling the reproduced Y-direction sync bit sequence through the use of a digital phase locked loop to obtain corrected Y-direction sync bit frequency and phase; and
    a fourth step of re-sampling said at least one Y-direction information bit sequence in response to the corrected Y-direction sync bit frequency and phase.

2. A method as recited in claim 1, wherein the sync bits are in the parallel Y-direction-extending groups and parallel X-direction-extending groups, and the information bits are between the parallel Y-direction-extending groups of the sync bits and the parallel X-direction-extending groups of the sync bits, the method further comprising:
    a fifth step, provided in the first step, of scanning one of the parallel X-direction-extending groups of the sync bits and ones of the information bits neighboring said one of the parallel X-direction-extending groups of the sync bits to reproduce an X-direction sync bit sequence and at least one X-direction information bit sequence;
    a sixth step of re-sampling the reproduced X-direction sync bit sequence through the use of a digital phase locked loop to obtain corrected X-direction sync bit frequency and phase; and
    a seventh step of re-sampling said at least one X-direction information bit sequence in response to the corrected X-direction sync bit frequency and phase.

3. A method as recited in claim 1, further comprising:
    a fifth step, provided in the first step, of scanning a first X-direction line of the information bits and at least one second X-direction line of the information bits neighboring the first X-direction line of the information bits to reproduce a first X-direction information bit sequence and at least one second X-direction information bit sequence;
    a sixth step of re-sampling the reproduced first X-direction sync bit sequence through the use of a digital phase locked loop; and
    a seventh step of re-sampling said at least one reproduced second X-direction information bit sequence.

4. A method of reproducing information from an optical information recording medium including an information recording layer on which the information has been recorded through the use of holography, wherein the information recording layer in the optical information recording medium has an XY plane, and information bits and sync bits are arranged in the XY plane, the sync bits being in parallel X-direction-extending groups having an X-direction minimum inversion interval of 2 or more, the information bits being between the parallel X-direction-extending groups of the sync bits, the method comprising the steps of applying reproduction-purpose reference light to the XY plane of the information recording layer in the optical information recording medium, and detecting reproduction light caused in the information recording layer by the application of the reproduction-purpose reference light to reproduce the information, the method further comprising:
    a first step of collecting the reproduction light caused in the information recording layer by the application of the reproduction-purpose reference light, and detecting the collected reproduction light to reproduce the information;
    a second step, provided in the first step, of scanning one of the parallel X-direction-extending groups of the sync bits and ones of the information bits neighboring said one of the parallel X-direction-extending groups of the sync bits to reproduce an X-direction sync bit sequence and at least one X-direction information bit sequence;
    a third step of re-sampling the reproduced X-direction sync bit sequence through the use of a digital phase locked loop to obtain corrected X-direction sync bit frequency and phase; and
    a fourth step of re-sampling said at least one X-direction information bit sequence in response to the corrected X-direction sync bit frequency and phase.

* * * * *